April 10, 1962 R. M. BECK ET AL 3,029,023
DIGITAL DIFFERENTIAL ANALYZER
Filed Jan. 28, 1959 25 Sheets-Sheet 1
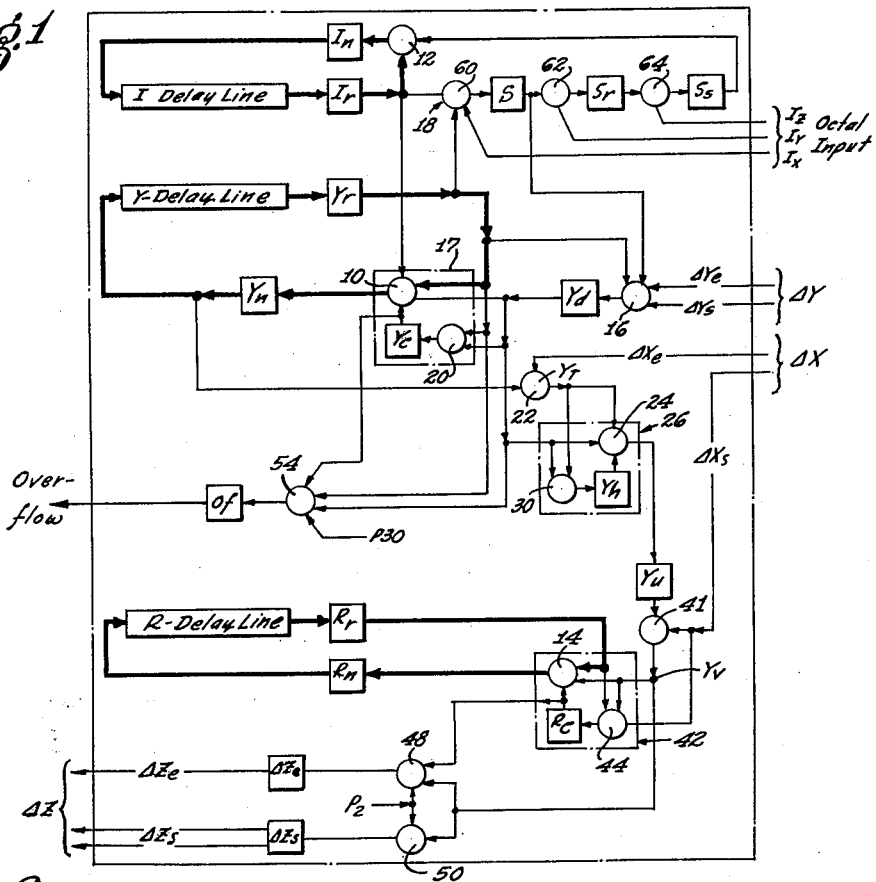
Fig. 1
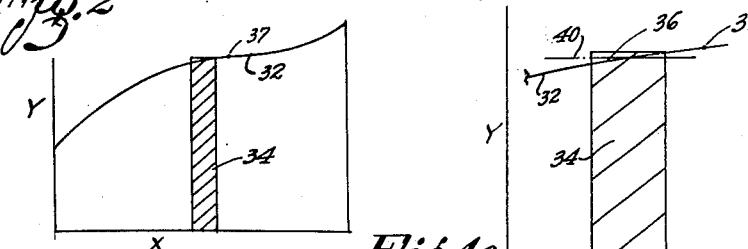
Fig. 2
Fig. 3
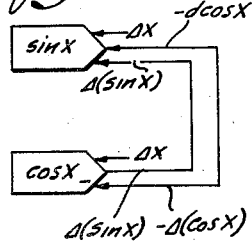
Fig. 4
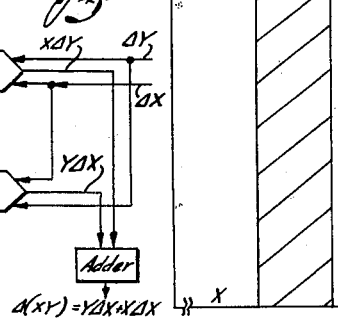
Fig. 4a
INVENTORS:
Robert M. Beck,
Jack M. Mitchell
Max Palevsky
Smil Ruhman
Attorneys

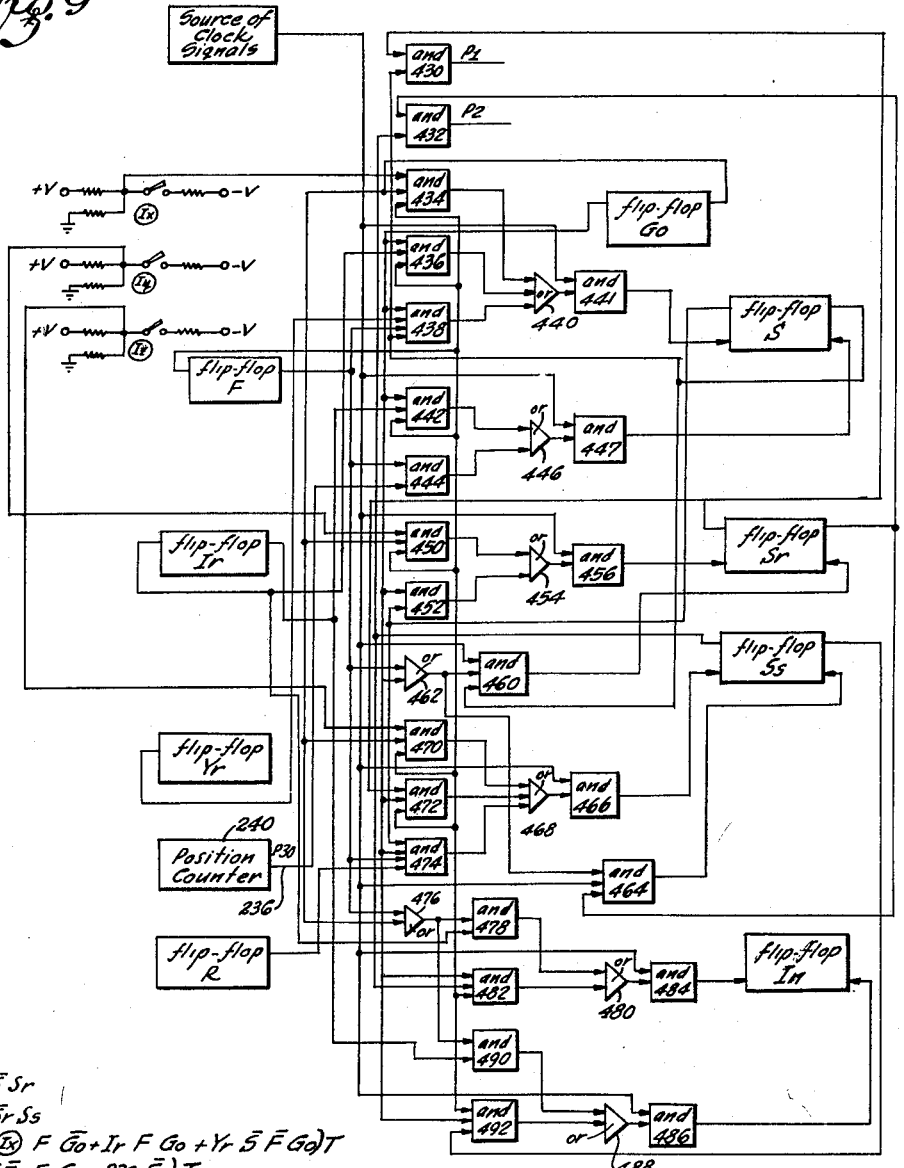

Fig. 9

$P_1 = \bar{S} Sr$
$P_2 = \bar{S}r Ss$
$\Delta = (\overline{I_x}\ F\ \bar{G_o} + Ir\ F\ Go + Yr\ \bar{S}\ \bar{F}\ G_o)T$
$o\Delta = (\overline{Ir}\ F\ Go + P30\ \bar{F})T$
$\Delta r = (\overline{I_x}\ F\ \bar{G_o} + S Go)T$
$o\Delta r = \bar{S}(Go + \bar{F})T$
$\Delta b = (\overline{I_z}\ F\ \bar{G_o} + Sr\ F\ Go + Sr Go\ \bar{F}\ \bar{R})T$
$o\Delta\Delta = \bar{S}r(Go + \bar{F})T$
$in = [Ir(\bar{F} + \bar{G_o}) + Ss\ F\ Go]T$
$oin = [\overline{Ir}(F + \bar{G_o}) + \bar{S}s\ F\ Go]T$ INVENTORS:
Robert M. Beck
Jack M. Mitchell
Max Palevsky
Smil Ruhman By Smyth & Roston
Attorneys

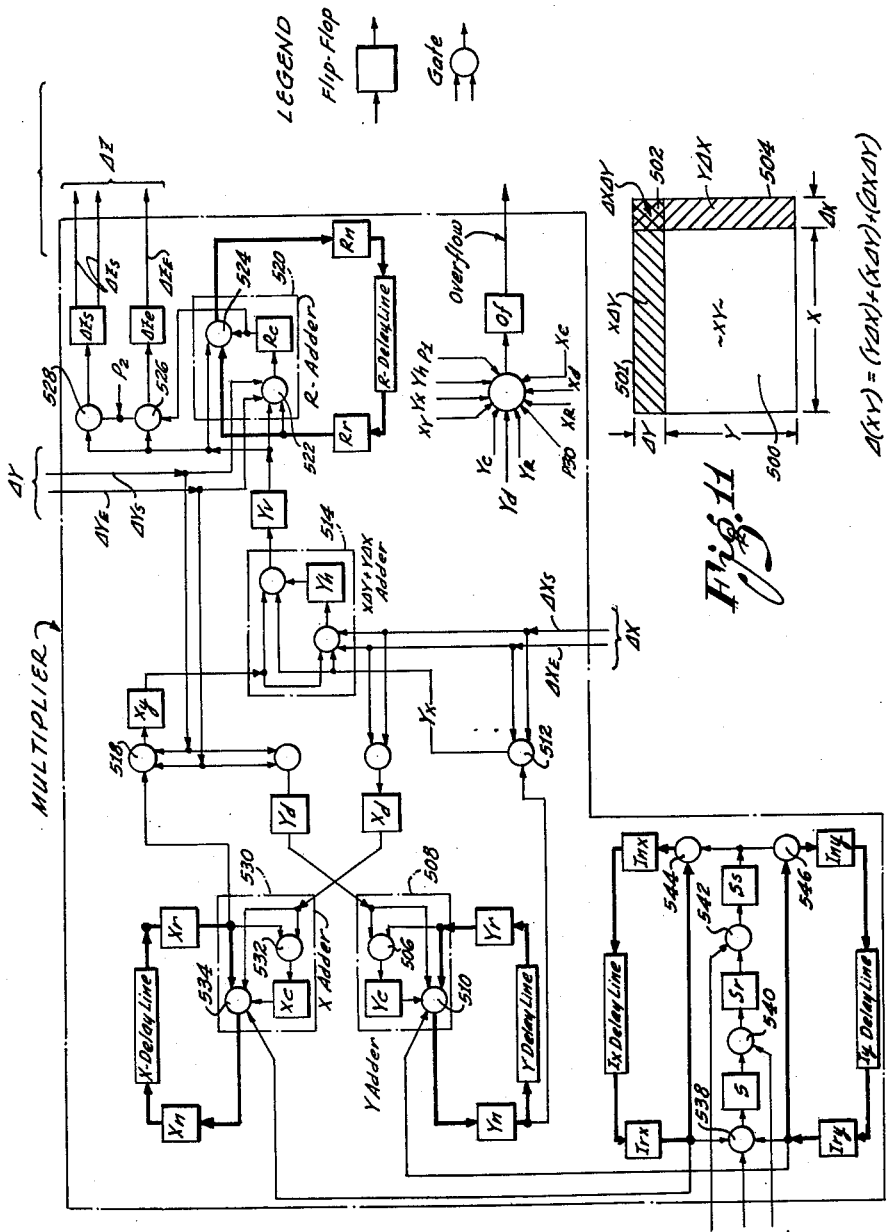

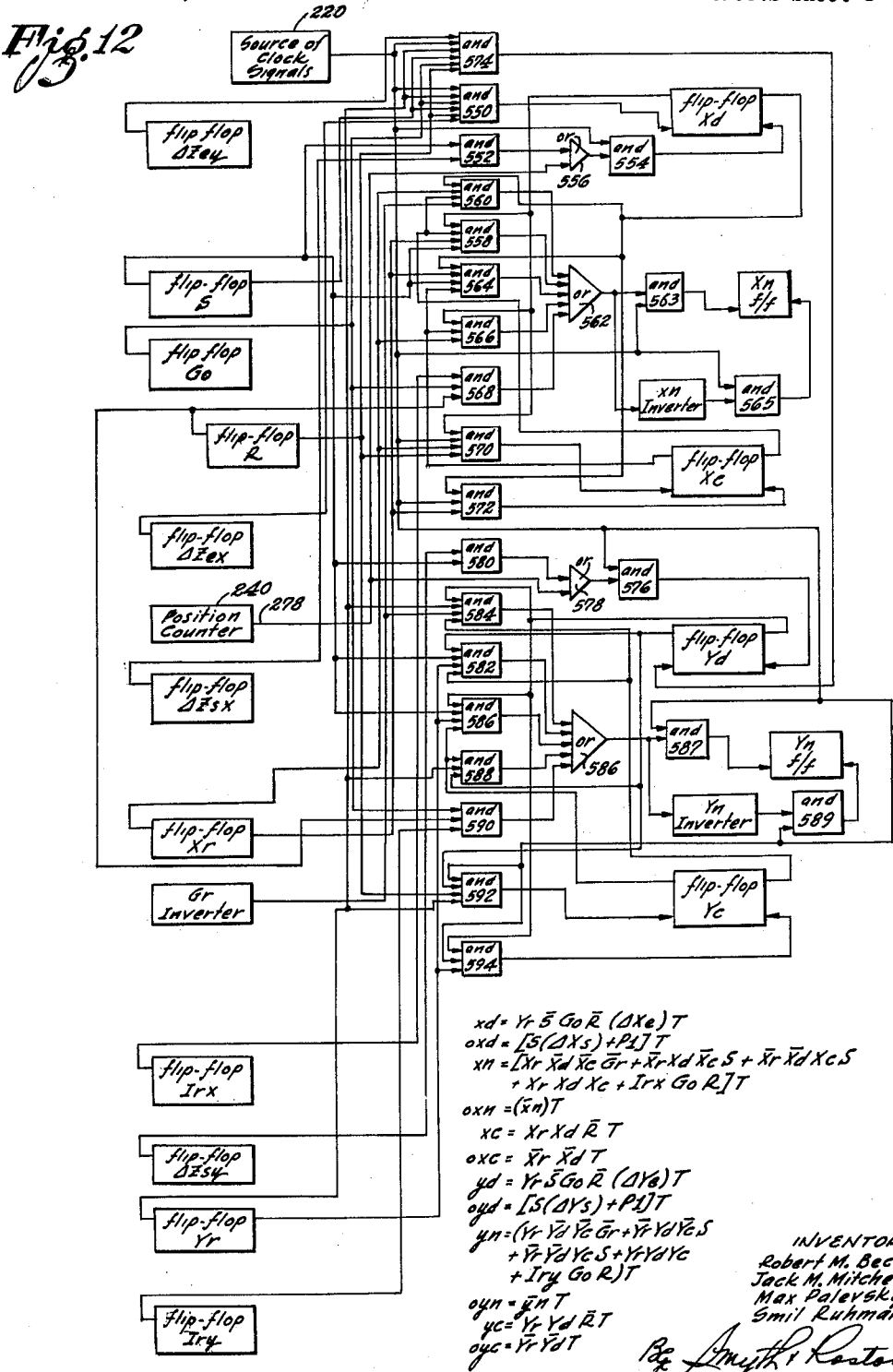

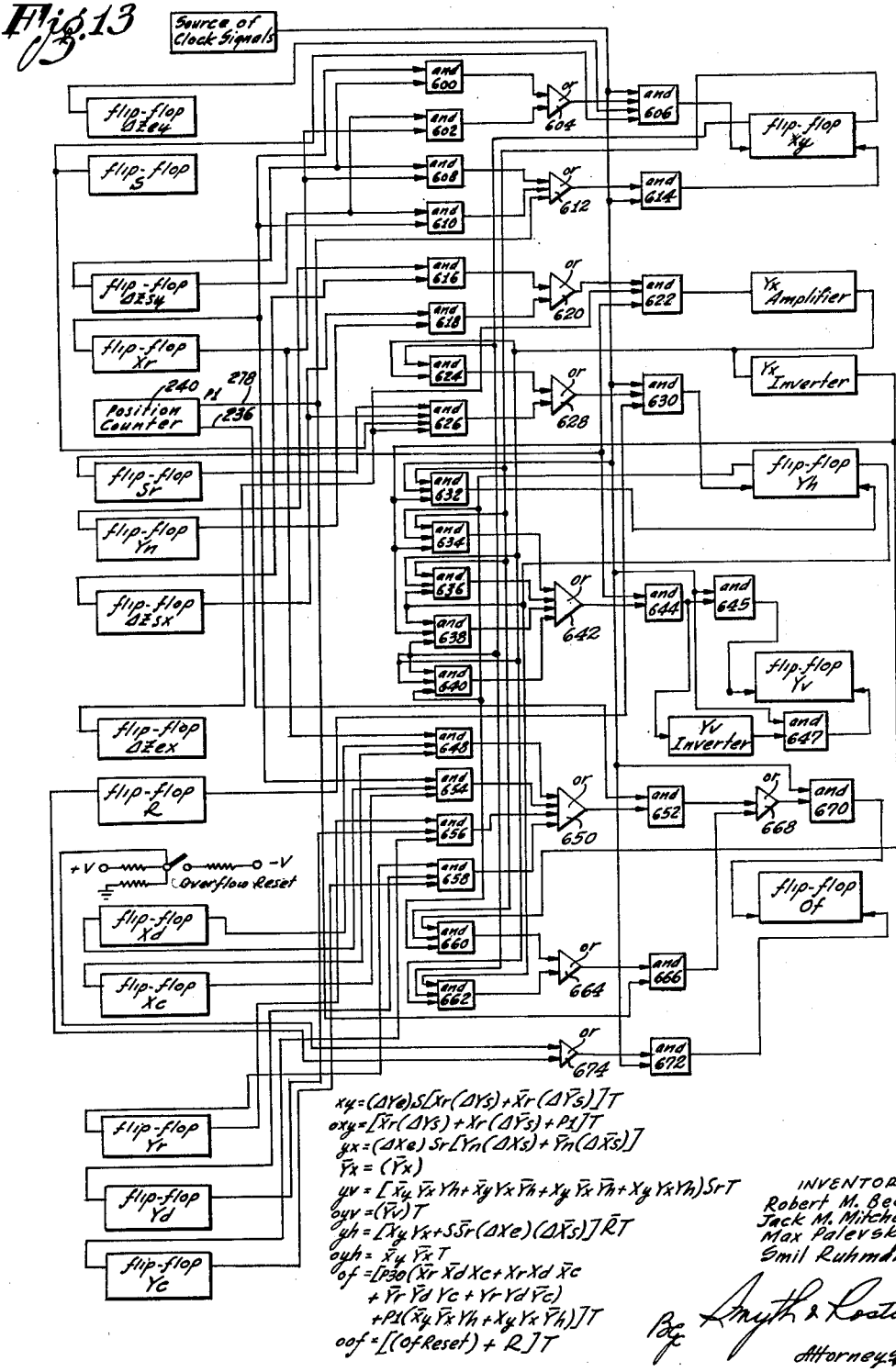

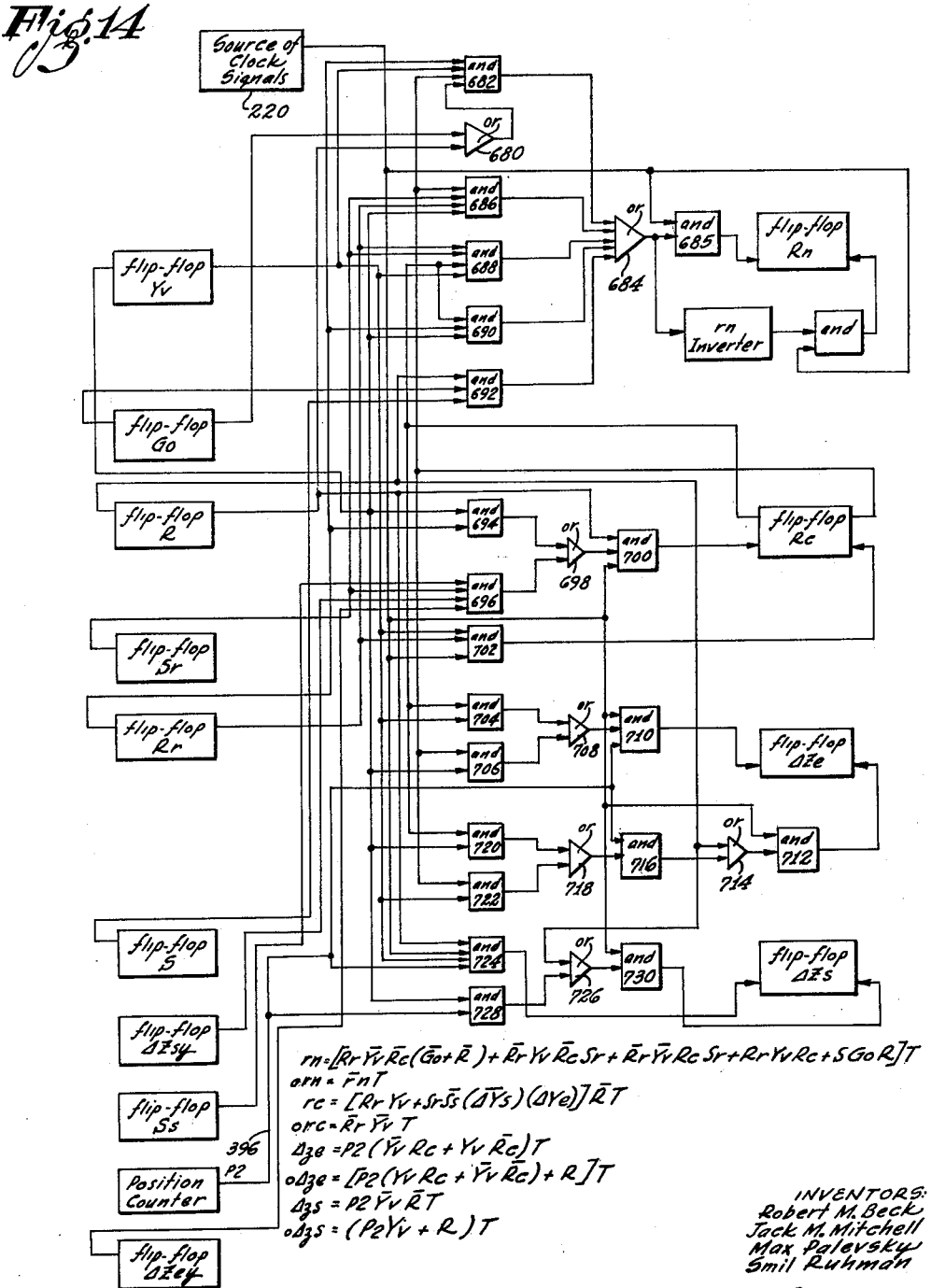

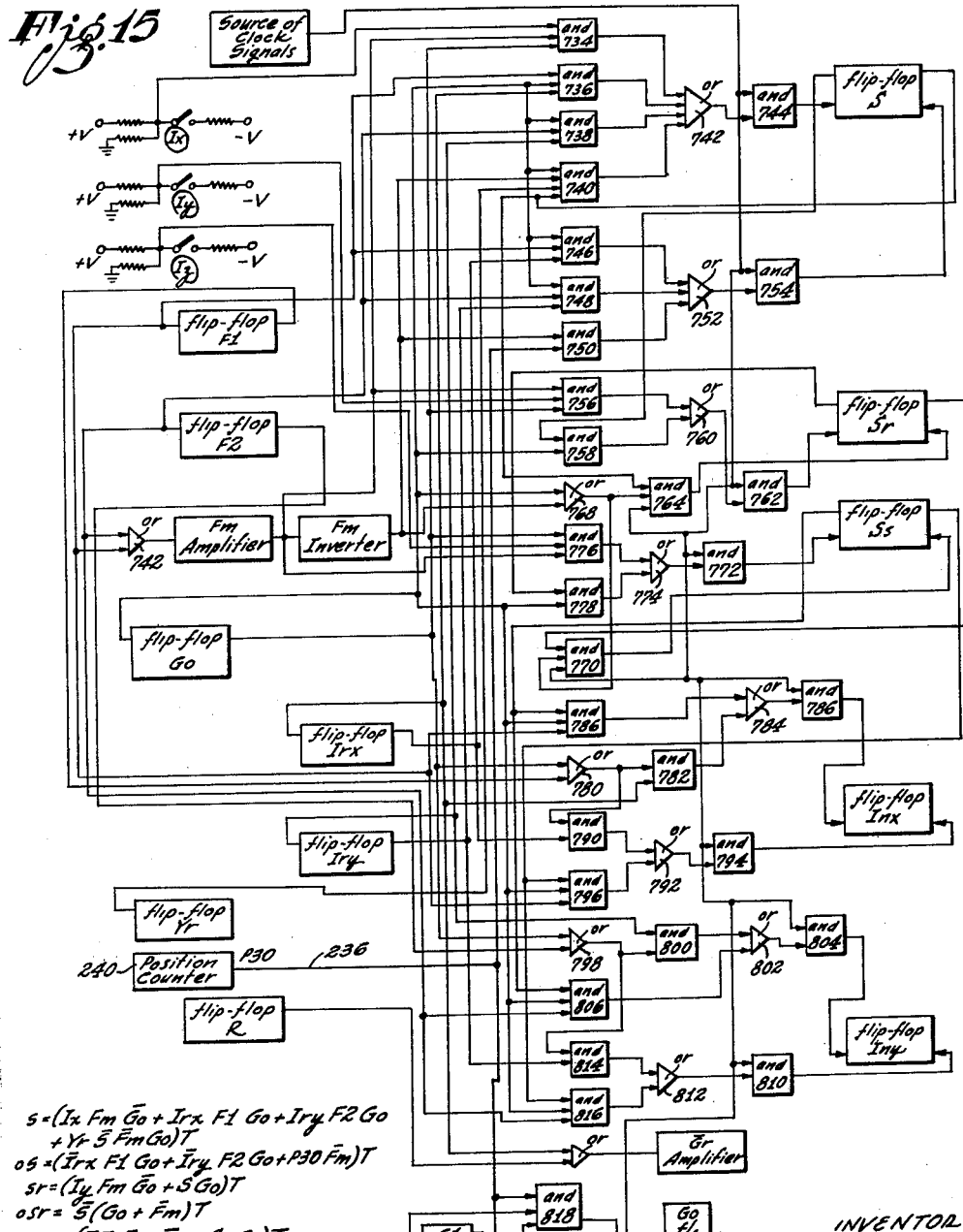

Fig. 15

$s = (I_x\, F_m\, \bar{G}_o + I_{rx}\, F_1\, G_o + I_{ry}\, F_2\, G_o + Y_r\, \bar{S}\, F_m G_o)T$
$o s = (\bar{I}_{rx}\, F_1\, G_o + \bar{I}_{ry}\, F_2\, G_o + P_{30}\, F_m)T$
$s_r = (I_y\, F_m\, \bar{G}_o + S\, G_o)T$
$o s_r = \bar{S}(G_o + \bar{F}_m)T$
$s_s = (I_z\, F_m\, \bar{G}_o + S_r\, G_o)T$
$o s_s = \bar{S}_r(G_o + \bar{F}_m)T$
$i_{nx} = [I_{rx}(\bar{F}_1 + \bar{G}_o) + S_s\, F_1\, G_o]T$
$o i_{nx} = [\bar{I}_{rx}(\bar{F}_1 + \bar{G}_o) + \bar{S}_s\, F_1\, G_o]T$
$i_{ny} = [I_{ry}(\bar{F}_2 + \bar{G}_o) + S_s\, F_2\, G_o]T$
$o i_{ny} = [\bar{I}_{ry}(\bar{F}_2 + \bar{G}_o) + \bar{S}_s\, F_2\, G_o]T$
$\bar{G}_r = (\bar{G}_o + R)$
$F_m = (F_1 + F_2)$ INVENTORS:
Robert M. Beck
Jack M. Mitchell
Max Palevsky
Smil Ruhman April 10, 1962 R. M. BECK ET AL 3,029,023
DIGITAL DIFFERENTIAL ANALYZER
Filed Jan. 28, 1959 25 Sheets-Sheet 13

INVENTORS:
Robert M. Beck
Jack M. Mitchell
Max Palevsky
Smil Ruhman

By Smyth & Roston
Attorneys

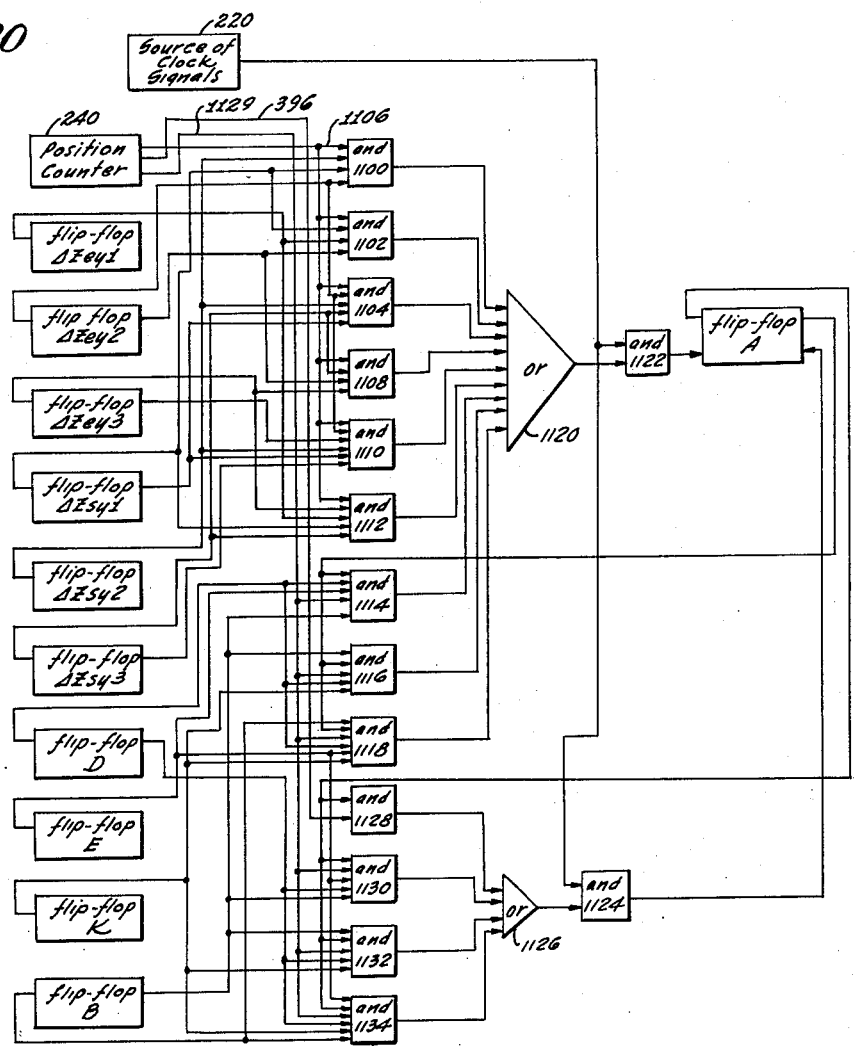

Fig. 20

$a = [P4 \Delta Y_{S1} \Delta Y_{e2} \Delta Y_{S2} + P4 \Delta Y_{e1} \Delta Y_{S1} \Delta \bar{Y}_{e2} + P4 \Delta \bar{Y}_{S1} \Delta Y_{e2} \Delta Y_{S2} \Delta Y_{S3}$
$+ P4 \Delta \bar{Y}_{e2} \Delta Y_{e3} \Delta Y_{S3} + P4 \Delta \bar{Y}_{S1} \Delta Y_{e2} \Delta Y_{S2} \Delta \bar{Y}_{e3} \Delta \bar{Y}_{S3}$
$+ P4 \Delta Y_{e1} \Delta Y_{S1} \Delta Y_{e3} \Delta Y_{S3} + P5 \bar{A} \bar{B} DE + P5 \bar{A} \bar{B} DK$
$+ P5 \bar{A} BD EK]T$
$oa = [P2A + P5 A \bar{B} \bar{D} E + P5 AB \bar{D} K + P5 ABD \bar{E} K]T$ INVENTORS:
Robert M. Beck
Jack M. Mitchell
Max Palevsky
Smil Ruhman Attorneys

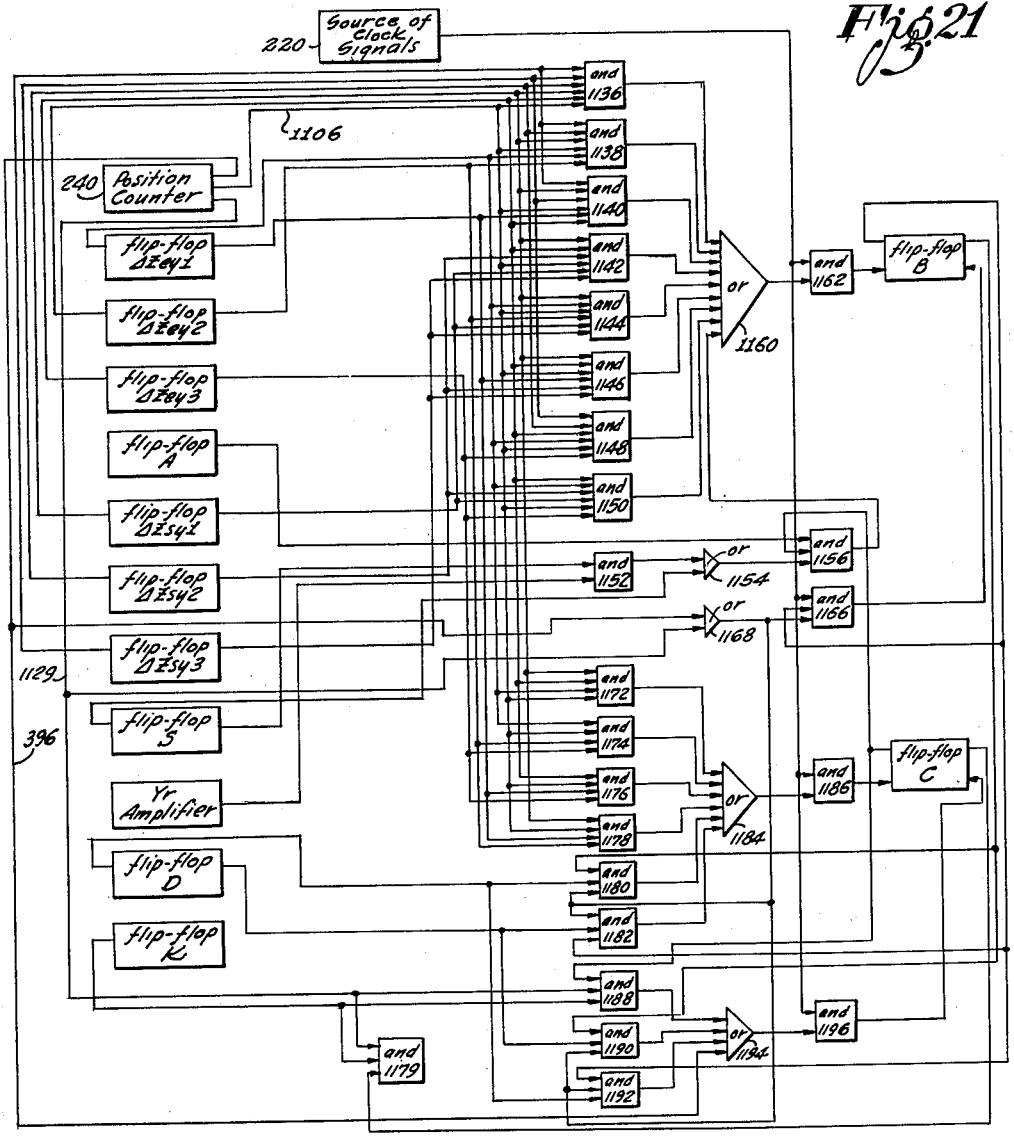

Fig. 21

$b = [P4\Delta Y_{S1} \Delta Y_{e2} \Delta Y_{S2} \Delta Y_{e3} \Delta Y_{S3} + P4\Delta Y_{e1} \Delta \overline{Y}_{S1} \Delta Y_{e2} \Delta Y_{e3} \Delta Y_{S3} + P4\Delta \overline{Y}_{e1}\Delta Y_{e2}\Delta Y_{S2}\Delta Y_{e3} \Delta Y_{S3}$
$+ P4\Delta Y_{S1}\Delta Y_{e2}\Delta \overline{Y}_{S2}\Delta Y_{e3} \overline{Y}_{S3} + P4\Delta \overline{Y}_{e1} \Delta \overline{Y}_{S1} \Delta Y_{e2} \Delta Y_{e3} \Delta \overline{Y}_{S3} + P4\Delta \overline{Y}_{e1} \Delta Y_{e2} \Delta \overline{Y}_{S2}\Delta Y_{e3}\Delta \overline{Y}_{S3}$
$+ P4\Delta Y_{e1}\Delta Y_{S1}\Delta \overline{Y}_{e2} \Delta \overline{Y}_{S2} \Delta Y_{e3} + P4\Delta Y_{e1} \Delta \overline{Y}_{S1} \Delta Y_{e2} \Delta \overline{Y}_{S2} \Delta \overline{Y}_{e3} + A(Y_r \overline{S} + S)C]T$
$ob = [(P2 + P5)B]T$
$c = [P4\Delta Y_{e1} \Delta Y_{e2} \Delta Y_{e3} + P4\Delta Y_{e1} \Delta \overline{Y}_{e2}\Delta \overline{Y}_{e3} + P4\Delta \overline{Y}_{e1}\Delta Y_{e2}\Delta \overline{Y}_{e3} + P4\Delta \overline{Y}_{e1}\Delta \overline{Y}_{e2}\Delta Y_{e3} + P5\overline{C}K$
$+ (Y_r \overline{S} + S)D\overline{B} + (Y_r \overline{S} + S)\overline{D}B]T$
$oc = [P2 + P5 CK + (Y_r \overline{S} + S)\overline{D}\overline{B} + (Y_r \overline{S} + S)DB]T$ INVENTORS:
Robert M. Beck
Jack M. Mitchell
Max Palevsky
Smil Ruhman

*Attorneys*

$od\ [P2D + P5BDE\bar{K} + P5\bar{A}CD\bar{E}\bar{K} + P5\bar{B}DE\bar{K} + P5\bar{A}BDEK + P5AB\bar{C}DEK$
$+ P5A\bar{B}\bar{C}DEK + P5\bar{A}\bar{B}D\bar{E}K + P5\bar{B}\bar{C}D\bar{E}K + P5ABCDEK + P5A\bar{C}D\bar{E}K$
$+ (Yr\bar{5} + S)\bar{K}]T$

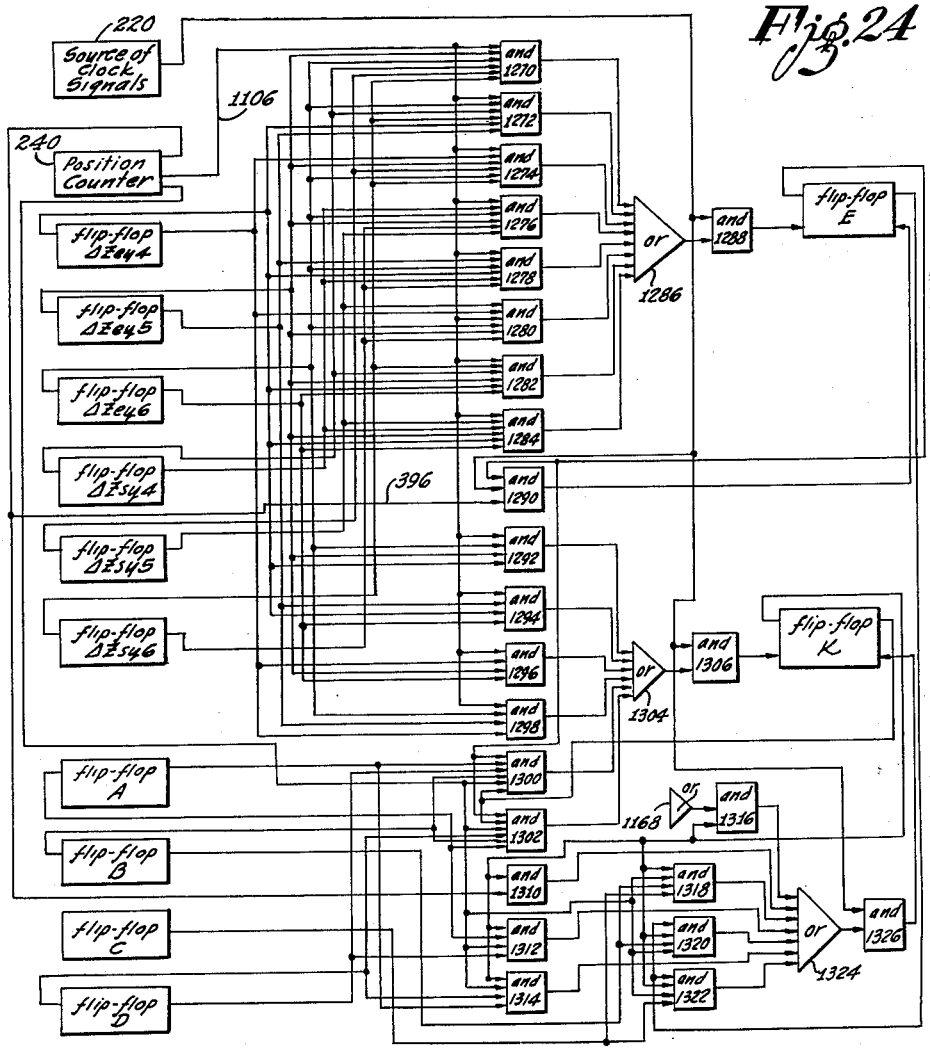

Fig. 24

$k = [P4 \Delta \bar{Y}e4 \Delta Ye5 \Delta Ye6 + P4 \Delta Ye4 \Delta \bar{Y}e5 \Delta Ye6 + P4 \Delta \bar{Y}e4 \Delta Ye5 \Delta \bar{Y}e6$
$\quad + P4 \Delta Ye4 \Delta \bar{Y}e5 \Delta \bar{Y}e6 + P5 \bar{K} \bar{A} \bar{B} \bar{D} E + P5 \bar{K} A B D E]T$ $ok = [P2K + P5 K A \bar{D} + P5 \bar{K} A D + P5 K B \bar{C}$
$\quad + P5 K \bar{E} \bar{B} + P5 K \bar{E} \bar{C} + (Y1 \bar{S} + S) K] T$ $e = (P4 \Delta Ys4 \Delta Ys5 \Delta Ye5 \Delta Ye6 \Delta Ys6 + P4 \Delta Ye4 \Delta Ys4 \Delta \bar{Y}e5 \Delta Ye6 \Delta Ys6$
$\quad + P4 \Delta Ye4 \Delta \bar{Y}e5 \Delta Ys5 \Delta Ye6 \Delta Ys6 + P4 \Delta \bar{Y}s4 \Delta Ye5 \Delta Ys5 \Delta Ye6 \Delta \bar{Y}s6$
$\quad + P4 \Delta \bar{Y}e4 \Delta \bar{Y}s4 \Delta Ye5 \Delta Ye6 \Delta \bar{Y}s6 + P4 \Delta \bar{Y}e4 \Delta Ye5 \Delta \bar{Y}s5 \Delta Ye6 \Delta \bar{Y}s6$
$\quad + P4 \Delta Ye4 \Delta Ys4 \Delta Ye5 \Delta Ys6 \Delta \bar{Y}e6 + P4 \Delta Ye4 \Delta \bar{Y}s4 \Delta Ye5 \Delta \bar{Y}s5 \Delta \bar{Y}e6) T$ $oe = P2ET$ INVENTORS:
Robert M. Beck
Jack M. Mitchell
Max Palevsky
Smil Ruhman

*Smyth & Roston*
Attorneys

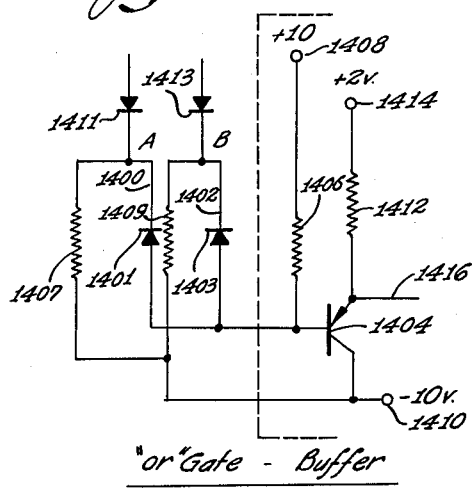
Fig. 26 "or" Gate - Buffer
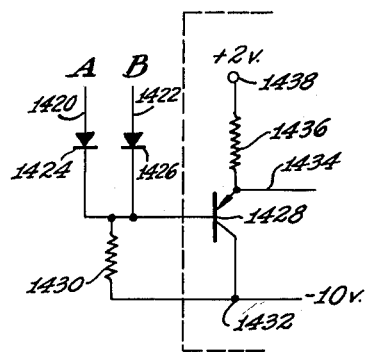
Fig. 27 "and" Gate - Buffer
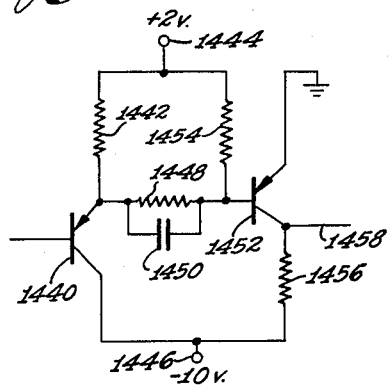
Fig. 28 Buffer Inverter
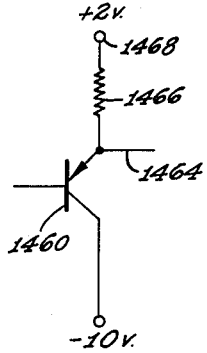
Fig. 29 Emitter Follower
INVENTORS.
Robert M. Beck
Jack M. Mitchell
Max Palevsky
Smil Ruhman
Attorneys.

April 10, 1962 R. M. BECK ET AL 3,029,023
DIGITAL DIFFERENTIAL ANALYZER
Filed Jan. 28, 1959 25 Sheets-Sheet 23

"flip-flop" Circuit

Read Amplifier

INVENTORS:
Robert M. Beck
Jack M. Mitchell
Max Palevsky
Smil Ruhman

Attorneys

April 10, 1962 R. M. BECK ET AL 3,029,023
DIGITAL DIFFERENTIAL ANALYZER
Filed Jan. 28, 1959 25 Sheets-Sheet 24

INVENTORS:
Robert M. Beck,
Jack M. Mitchell
Max Palevsky
Smil Ruhman

By Smyth & Roston
Attorneys

United States Patent Office 3,029,023
Patented Apr. 10, 1962

3,029,023
DIGITAL DIFFERENTIAL ANALYZER
Robert M. Beck, Jack M. Mitchell, Max Palevsky, and Smil Ruhman, Los Angeles, Calif., assignors to The Packard-Bell Computer Corporation, Los Angeles, Calif., a corporation of California
Filed Jan. 28, 1959, Ser. No. 789,561
15 Claims. (Cl. 235—152)

This invention relates to digital differential analyzers and more particularly to a new type of digital differential analyzer which is capable of solving mathematical problems with increased speeds and increased accuracy in comparison to the digital differential analyzers now in use.

Digital differential analyzers are digital computers which are constructed specifically to solve differential equations. The digital differential analyzers have the advantages of a differential machine in that they are relatively simple, compact and inexpensive. The digital differential analyzers also have the advantages of a digital computer in that they are able to solve problems with increased accuracy and increased speeds in comparison to the operation of differential analyzers operating on analogue voltages.

In a digital differential analyzer, a plurality of integrators are interconnected in accordance with the problem to be solved. Each integrator operates on a cyclic basis to generate increments in different quantities used by the integrator. One of these quantities represents increments in an independent quantity which may be designated as $\Delta X$. Another of the quantities represents the value of a dependent quantity such as $Y$. The value of $Y$ and the $\Delta X$ increments are combined in the integrator in each cycle of operation to obtain an increment which may be designated as the $Y\Delta X$ increment. These increments are then accumulated to obtain the value of an output quantity which may be designated as $R$.

The $\Delta X$ variations in the independent quantity for each integrator and the changes in the dependent quantity $Y$ for the integrator in each cycle of computation are dependent upon the value of $R$ for that integrator or for a different integrator in that cycle of computation. The variations in the independent and dependent quantities for each integrator are dependent upon the value of the output quantity $R$ for a particular one of the integrators in accordance with the inter-relationship which is provided between the integrators to obtain the solution of the particular mathematical problem.

Most of the digital differential analyzers now in use operate on a serial basis. In such analyzers, the values of the dependent quantity $Y$ and of the output quantity $R$ for each integrator are stored in separate channels on a memory member such as a drum. The drum is then rotated to present the values of $Y$ and $R$ for the different integrators in sequence so that incremental changes in the value of $Y$ and $R$ for each integrator can be made on a cyclic basis when the integrator is presented for computation. Logical circuitry such as "and" gates and "or" gates are included to operate successively on the different quantities for each integrator as the integrator is presented for computation.

The serial digital differential analyzer described in the previous paragraph has certain inherent disadvantages. Since each integrator is presented for computation only a small fraction of time dependent upon the number of integrators in the digital differential analyzer, each integrator operates at a relatively low efficiency. Furthermore, the use of movable members such as a rotating drum limits the speed of computation.

Because of the limitation in the speed of computation, the characteristics of input and output equipment associated with the digital differential analyzer are never fully challenged. This results from the fact that the input and output equipment operate at speeds considerably less than their optimum speed. The disadvantages of relatively low speed of operation for a serial machine has been especially pronounced in the solution of real time problems in which the variations in different quantities occur at a rate in excess of the speed of operation of the serial machines.

A parallel digital differential analyzer has also been proposed. In this type of analyzer, all quantities are stored in static registers such that no circulation of any information occurs. In the parallel type of digital differential analyzer, computations can occur at an increased speed but an excessive amount of equipment is required for each integrator. Although parallel types of digital differential analyzers have been proposed, no practical or successful embodiment of such an analyzer has actually ever been constructed.

This invention provides a digital differential analyzer which combines the desirable qualities of the parallel and serial types of machines. For example, the digital differential analyzer constituting this invention is essentially a parallel machine which operates at speeds considerably in excess of the serial machines and with somewhat increased accuracy relative to that obtained by the serial machines. However, the analyzer constituting this invention uses serial techniques in obtaining a circulation of the different quantities in each integrator and in operating upon the signal indications representing the successive digits for each quantity as the signal indications are serially presented for computation.

In the drawings:

FIGURE 1 is a block diagram somewhat schematically illustrating the inter-relationship between various stages to obtain the operation of one of the integrators in the digital differential analyzer constituting this invention in obtaining an integration of one quantity and successive increments in a second quantity.

FIGURE 2 is a curve schematically illustrating how the integrator shown in FIGURE 1 operates to obtain the area under the curve and particularly illustrating how the integrator operates on an incremental basis to obtain the area under the curve.

FIGURE 3 is an enlarged fragmentary representation of a portion of the curve shown in FIGURE 2 and specifically relates to the operation of the integrator shown in FIGURE 1 in anticipating the value of the curve shown in FIGURE 2 in each cycle of computation.

FIGURES 4 and 4a are block diagrams somewhat schematically illustrating the inter-relationship between a pair of integrators to obtain particular output quantities such as trigonometric functions and the product of two quantities.

FIGURES 5 to 9, inclusive are circuit diagrams illustrating in block form the detailed construction of the integrator shown in FIGURE 1.

FIGURE 10 is a block diagram somewhat schematically illustrating the inter-relationship between various stages to provide for the operation of two integrators in obtaining the product of two quantities.

FIGURE 11 is a curve somewhat schematically illustrating how the integrators shown in FIGURE 10 operate on an incremental basis to obtain the product of two quantities.

FIGURES 12 to 15, inclusive are block diagrams illustrating the detailed construction of the two inter-related integrators shown in FIGURE 10 to obtain the product of two quantities.

Figure 16:
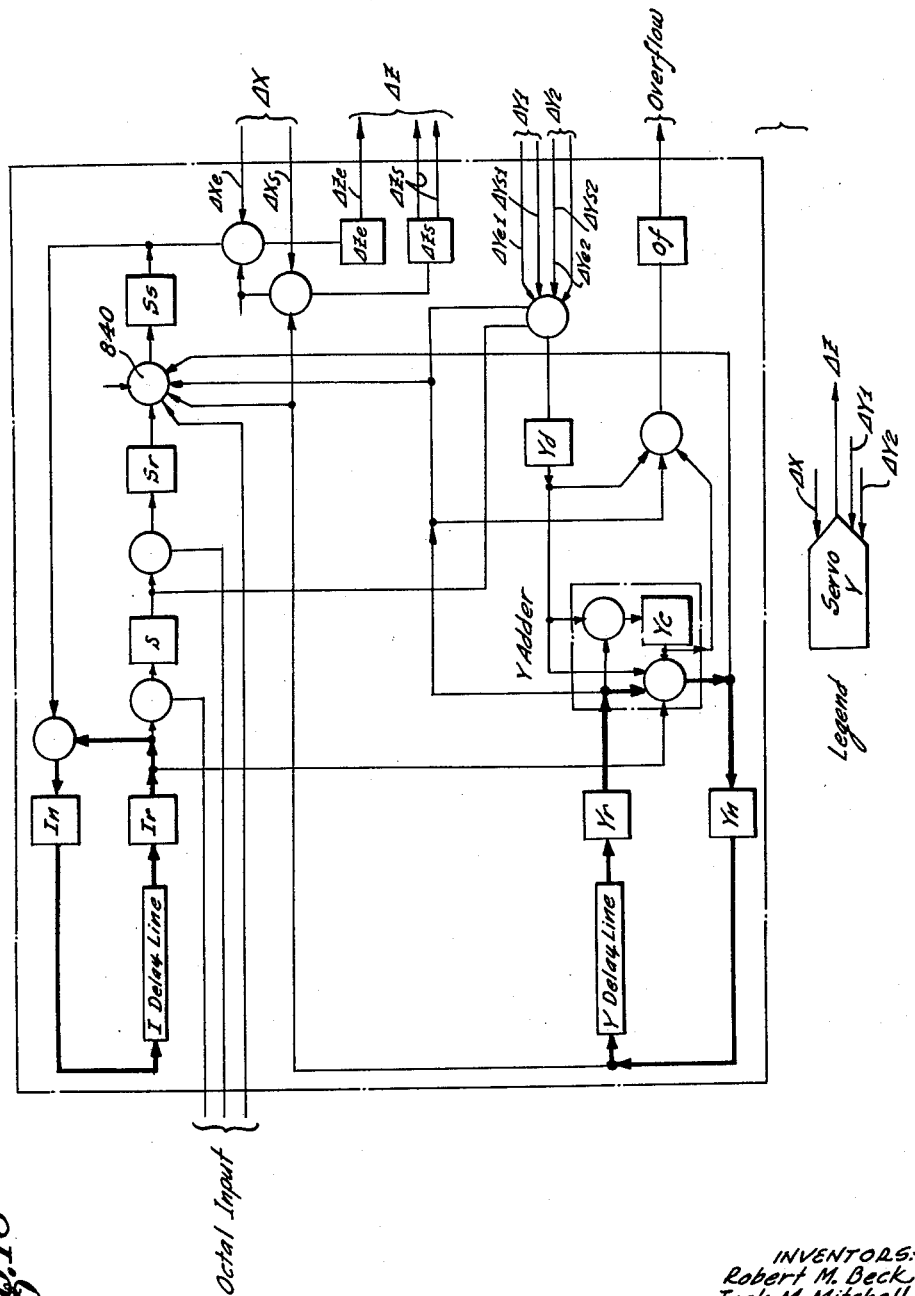

FIGURE 16 is a block diagram somewhat schematically illustrating the operation of an integrator as a servo member.

FIGURES 17 to 24, inclusive, are block diagrams illustrating in detail the construction of the servo integrator schematically shown in FIGURE 16.

Figure 25:
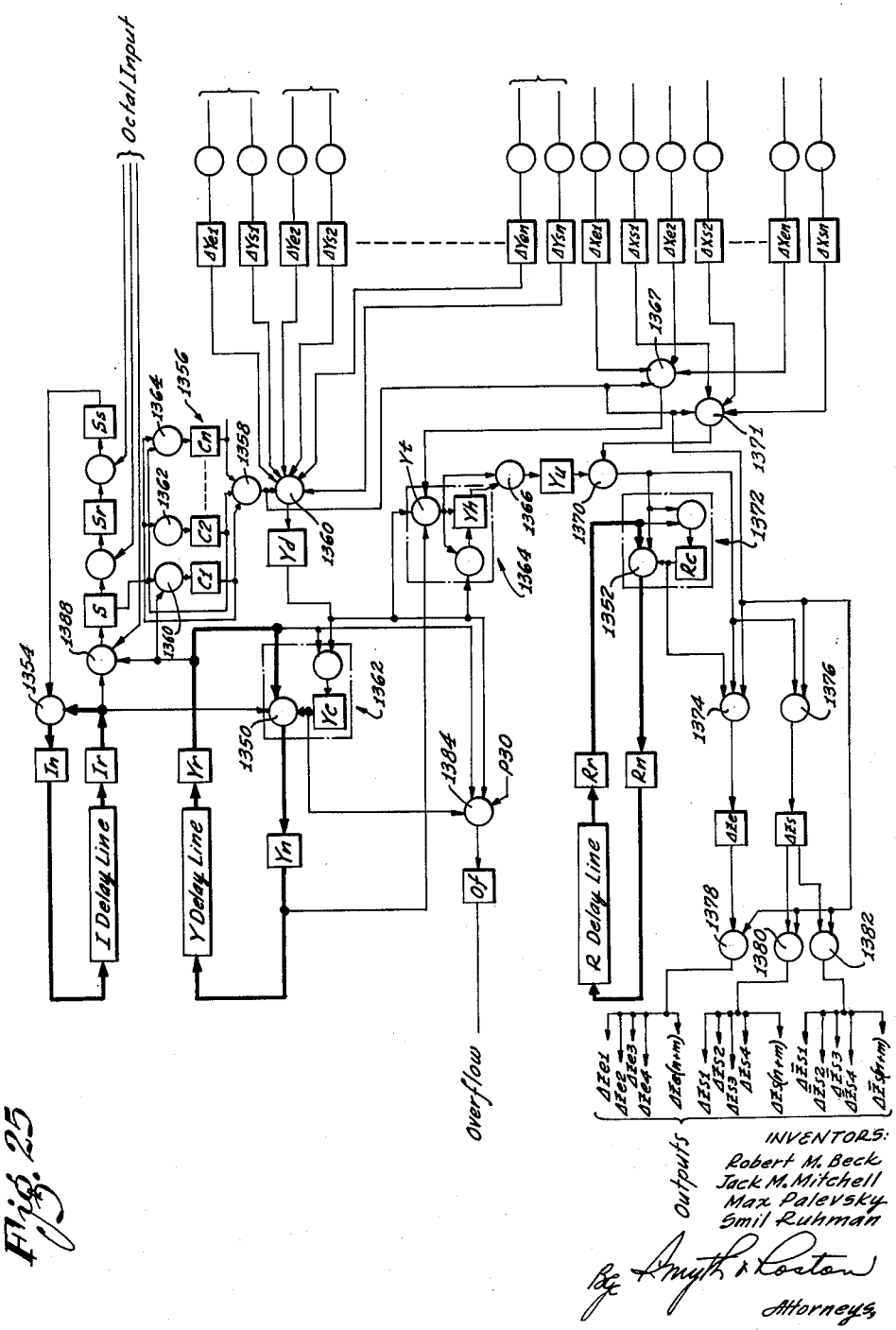

FIGURE 25 is a block diagram somewhat schematically illustrating the inter-relationship between the integrators in a digital differential analyzer constituting this invention and the integrators in a time-sharing digital differential analyzer.

And FIGURES 26 to 33, inclusive, show in detail various circuits used in constructing the digital differential analyzer constituting this invention and include detailed circuits of an "or" gate, an "and" gate, a buffer amplifier, a buffer inverter, a flip-flop, a read amplifier, a source of clock signals and switching circuitry.

*Simplified Block Diagram of Integrator*

The basic function of each block or integrator in the digital differential analyzer constituting this invention is to perform an integrating operation. The inter-relationship between the various components to produce an integrator forming an integrating operation is shown on a simplified basis in FIGURE 1. As shown in FIGURE 1, three delay lines respectively designated as the I delay line, the Y delay line and the R delay line are used. These delay lines may be made from any suitable material such as a magnetostrictive material or mercury and may even be made from a plurality of flip-flops disposed in cascade relationship. The delay line may also be made from an electrical delay line such as a coil with a shield over it to provide a distributed capacitance for producing an electrical delay.

The path of circulation of the signals in a closed loop through each delay line is shown in broadened lines in FIGURE 1. As will be seen, the signals from each delay line are introduced to a read flip-flop which then passes the signals to a gate. The flip-flops such as the read flip-flop are indicated by a rectangle in FIGURE 1 and the gates are indicated by circles in that figure. The signals passing through the gates are then introduced to a write flip-flop which is also shown in rectangular form in FIGURE 1. The signals passing into the write flip-flop are then introduced to the associated delay line for passage through the delay line.

By way of illustration, the signals from the Y delay line pass to a Yr read flip-flop and then to a gate 10 which controls the introduction of the signals to a Yn write flip-flop. Similarly, an Ir read flip-flop, a gate 12 and an In write flip-flop are included in a closed loop with the I delay line. An Rr read flip-flop, a gate 14 and an Rn write flip-flop are included in a closed loop with the R delay line.

The I, Y and R delay lines are constructed to provide a suitable delay such as 10 microseconds between the introduction of signals to the delay lines and the passage of signals from the delay lines. At a clock repetition rate of 3 megacycles per second, each of the delay lines is able to store 30 binary digits at any one instant. In this way, each integrator such as the integrator shown in FIGURE 1, may be provided with a length of 30 binary digits. It will be appreciated that the number of digits in each integrator may be varied by varying the parameters of the delay lines or the frequency of the signals introduced to the delay lines or both. The number of digits in each integrator controls the accuracy with which computations are made, as will become more apparent from the subsequent discussion.

At any instant, a value of a dependent quantity Y is stored in the Y delay line for circulation. During periods of computation, the value of Y circulated in the Y delay in each cycle of operation may be varied in accordance with the occurrence of $\Delta Y$ increments which are introduced through a gate 16. The $\Delta Y$ increment is indicated by two signals respectively designated as $\Delta Ye$ and $\Delta Ys$. The $\Delta Ye$ signal indicates the occurrence or lack of occurrence of a $\Delta Y$ increment and the $\Delta Ys$ signal indicates whether the increment is positive or negative.

The gate 16 can become opened only upon the occurrence of a "start" pulse in the signals circulating through the delay line to represent the value of the dependent quantity Y. This "start" pulse has a binary value of "1" and is the first value of "1" to occur in the value of Y in each cycle of computation. The "start" pulse occurs at a fixed position in each cycle of computation during the solution of a particular mathematical problem. Because of this, the scale factor for each digital position representing Y can be controlled by varying the position at which the "start" pulse occurs. For example, if the "start" pulse occurs in the 3rd of the 30 positions circulating through the Y delay line, the 14th digital position will have a considerably greater digital significance than if the "start" pulse occurs at the 12th position of the 30 positions circulating through the Y delay line.

Upon the occurrence of the first signal of "1" in the Y delay line in each cycle of computation, the signal passes through the gate 18 to the S flip-flop to trigger the S flip-flop into a state for activating the gate 16. This causes the signals representing the $\Delta Ye$ and $\Delta Ys$ indications controlling the occurrence and polarity of a $\Delta Y$ increment to pass through the gate 16 to a flip-flop designated as Yd. This flip-flop is provided with a controlled operation which represents the occurrence of the $\Delta Y$ increment in the position of least significance. The Yd flip-flop further represents the polarity of the $\Delta Y$ increment by its state of operation in the positions after the position of least significance.

The signals produced by the Yd flip-flop are introduced to the gate 10 for combination with the signals read by the Yr flip-flop to indicate the value of Y. The signals representing Y and $\Delta Y$ in each position are combined in an adder indicated in broken lines at 17, the combination of Y and $\Delta Y$ for each position being made with the carry Yc from the previous position. The carry Yc is indicated by a Yc flip-flop, the operation of which is controlled by signals passing through a gate 20 from the Yr read flip-flop and the Yd flip-flop. In this way, signal indications representing a new value of Y for each position are introduced through the Yn write flip-flop to the Y delay line for circulation through the delay line.

Signals passing through the Yn flip-flop to represent the new value of Y in each cycle of computation are also introduced to a gate 22. These signals are combined in the gate 22 with signals representing the existence of a $\Delta X$ increment in the independent quantity for the integrator. In this way, the signals representing the new value of Y are able to pass through the gate 22 only when a $\Delta X$ increment actually occurs. The signals passing through the gate 22 are then introduced to a gate 24 in an adder generally indicated in broken lines at 26.

The adder 26 operates to combine the signals representing a new value of Y for each position with the signals representing $\frac{1}{2}\Delta Y$ and the carry resulting from the addition of Y and $\frac{1}{2}\Delta Y$ in the previous position. The carry is indicated by a Yh flip-flop and is obtained for each position upon the occurrence of particular combinations of the values of Y and $\frac{1}{2}\Delta Y$ for the previous position. A gate 30 passes signals to trigger the Yh flip-flop only upon the occurrence of the particular combinations of Y and $\frac{1}{2}\Delta Y$ for each digital position.

The reasons for adding Y and $\frac{1}{2}\Delta Y$ in each position upon the occurrence of a $\Delta X$ increment may be seen from the following discussion with reference to the schematic showing in FIGURE 2. In FIGURE 2, the value of X is indicated along the horizontal axis and the value of Y for the different values of X is indicated along the vertical axis. The integrator shown in FIGURE 1 operates to determine the area under the curve represented by the value of Y. The area under the curve may be represented by a value of R and represents the $\int Y dX$ where the $\int$ sign represents an integrating operation and $dX$ represents infinitesimal changes in the value of X.

In order to obtain a completely accurate indication of the value of the area under the curve in the figure shown in FIGURE 2, the changes in X should be represented by the infinitesimal increments $dX$. However, an approximation can be obtained by making the variations in X finite, as presented by the symbol $\Delta X$. The accuracy in the computations is dependent in part upon the size of each $\Delta X$ increment. For example, the accuracy of computation is increased by decreasing the length of each $\Delta X$ increment. However, the amount of time required to complete a computation becomes correspondingly increased since an increased number of $\Delta X$ increments is required to move a particular distance along the horizontal axis of the curve shown in FIGURE 2.

The integrator shown in FIGURE 1 operates to determine the area of each $Y\Delta X$ increment. For example, one area is indicated in cross-hatched lines at 34 in FIGURE 2. This cross-hatched portion is shown on an enlarged scale in FIGURE 3. The portion of the curve traversing the cross-hatched portion is indicated at 36 in FIGURE 3. As will be seen, the cross-hatched portion is obtained by considering the new value of Y as the value of Y throughout the complete range of the $\Delta X$ increment. This new value of Y corresponds to the value of Y at the end of the $\Delta X$ increment. Another possibility might be to use the old value of Y, which is the value of Y at the beginning of the $\Delta X$ increment. In either case, the cross-hatched area does not truly represent the area under the portion 36 of the curve 32. This is especially true when it is considered that a finite time is required to obtain each cycle of computation and that the value of Y at the end of the cycle of computations may even be slightly old and inaccurate because of the finite time required to complete the cycle of computation.

One way of increasing the accuracy of measuring the $Y\Delta X$ increment is to anticipate at the end of each cycle of computation the true value of $Y\Delta X$ in the next cycle of computation. The anticipation may best be seen by considering that a fairly accurate value of Y in each cycle of computation is intermediate between the old value of Y at the beginning of the $\Delta X$ increment and the new value of Y at the end of the $\Delta X$ increment. In this way, the average value of Y throughout the $\Delta X$ increment may be considered to be at a level 40 in FIGURE 3 for the area under the portion 36 of the curve in that figure. By using a value of Y indicated at 40 in FIGURE 3, the errors in area in one-half of the curve position 36 become substantially compensated by the errors in area under the other half of the curve portion 36.

For example, the error in the area for the first half of $Y\Delta X$ increment is positive in that the value of Y indicated at 40 is greater than the corresponding portion of the curve 36 in the first half of the $\Delta X$ increment. In the second half of the $\Delta X$ increment, the value of the second portion 36 is greater than the value 40 of Y so that a negative error in area is produced. The positive error in area in the first half of the $\Delta X$ increment substantially balances the negative error in area for the second half of the $\Delta X$ increment. In this way, the error produced in the $Y\Delta X$ measurement for a value of 40 of Y is considerably less than would be produced by using a value of Y at the beginning or at the end of the $\Delta X$ increment.

The anticipated value of Y for each $\Delta X$ increment is obtained by adding a value of $\frac{1}{2}\Delta Y$ to the new value of Y. This causes a value of Y indicated at 37 in FIGURES 2 and 3 in each cycle of computation to anticipate the value of Y in the next cycle of computation. This value is produced in the adder 26 and is represented by the signals passing through the gate 24 and the $Yu$ flip-flop. The signals from the $Yu$ flip-flop are then introduced to a gate 41 which also receives signals representing the polarity of the $\Delta X$ increment. When the $\Delta X$ increment is positive, the signals from the $Yu$ flip-flop pass through the gate 41 without change. For a negative $\Delta X$ increment, the signals from the $Yu$ flip-flop are complemented as they pass through the gate 41. As will be seen, an anticipatory correction in the value of R is made whether or not a $\Delta X$ increment is actually produced.

The signals passing through the gate 41 digitally represent the value of the increment $\Delta R$ in the output quantity R. This $\Delta R$ increment is combined in each cycle of computation with the value of R circulating through the R delay line. The addition of R and $\Delta R$ occurs in an adder generally indicated in broken lines at 42 in FIGURE 1. The adder 42 includes the gate 14 which combines the values of R and $\Delta R$ for each position with the carry resulting from the addition of these quantities in the previous position. The carry is indicated by the $Rc$ flip-flop, the operation of which is controlled by the passage through a gate 44 of particular combinations of the R and $\Delta R$ signals. In this way, the signals passing through the gate 14 represent a new value of R in each cycle of computation. These values are recorded by $Rn$ write flip-flop in the R delay line for circulation through the delay line so as to be presented by the $Rr$ read flip-flop to the gate 14 in the next cycle of computation.

As will be seen from FIGURE 2, the value of R often increases at a rate considerably in excess of the rate at which the value of Y increases. The reason is that the value of R represents the cumulative area under the curve defined by the values of the dependent quantity Y for successive values of the independent quantity X. If the complete value of R were to be stored in the R delay line, the capacity of the R delay line would have to be quite large and actually would have to be considerably larger than the capacity required for the Y delay line. In order to synchronize the presentation of successive digits in the Y and R delay lines, the length of the Y delay line would have to be increased so as to correspond to that of the R delay line. This would increase the time required to perform each cycle of computation and accordingly would slow down the speed of computation in solving different mathematical problems.

In order to maintain the operation of the integrator shown in FIGURE 1 at an optimum speed, the capacity of the R delay line is shortened to that corresponding to the effective capacity required for the Y delay line to store the value of the dependent quantity Y. Because of the shortened capacity of the R delay line, overflows in the value of R occur in successive cycles of computation. For example, the R delay line may have a capacity of 9 binary digits so as to be able to store a decimal value of "511." In a particular cycle of computation the decimal value stored in the R delay line may actually be "507." Upon the introduction of a decimal value of "6" for the $\Delta R$ increment (as represented by $Y\Delta X$), an overflow in the value of R occurs such that the value of R now becomes "+2." This overflow may be designated as a $+\Delta Z$ increment. Actually, as will be seen from the subsequent discussion, the capacity of the R delay line is made relatively low so that overflows in the value of R can often occur.

Certain stages are included to indicate the occurrence of $\Delta Z$ overflows in the value of R and to indicate the polarity of each such increment. For example, a gate 48 is included to pass signals indicating the actual occurrence of a $\Delta Z$ increment for the integrator shown in FIGURE 1. The gate 48 becomes activated to pass a signal upon the simultaneous introduction of signals of particular polarity from the $Rc$ flip-flop and the gate 41 at position 2 in each cycle of computation. For example, a signal passes through the gate 48 at position 2 for a cycle of computation when the value of the $\Delta X$ increment is positive and when a carry simultaneously occurs from the $Rc$ flip-flop. As will be described subsequently, the occurrence of a carry from the $Rc$ flip-flop at position 2 for a cycle of computation having a positive $\Delta R$ increment indicates that a positive overflow has occurred in the value of R. A negative overflow in the value of R occurs when no carry is produced by the Rc flip-flop at position 2 in a cycle of computation having a negative ΔR increment. The signals passing through the gate 48 to indicate the occurrence of an overflow are introduced to the ΔZe flip-flop which stores this information for use in the next cycle of computation.

Just as the gate 48 passes a signal to indicate the occurrence of a ΔZ increment, the gate 50 passes a signal to indicate the polarity of the ΔZ increment. The gate 50 can become activated only at position 2 for an integrator since this is the time at which an overflow is produced. The gate 50 then passes the signal representing the polarity of the ΔZ increment. As described in the previous paragraph, any overflow in the value of R is directly dependent upon the value of the ΔR increment. For example, a positive overflow in the value of R can occur in a cycle of computation only for a positive ΔR increment and a negative overflow in the value of R can occur only for a negative ΔR increment. In this way, the ΔZs flip-flop shown in FIGURE 1 is triggered to a true state of operation to represent a positive ΔZ increment and is triggered to a false state to represent a negative ΔZ increment.

As described previously, the digital capacity of the R delay line is chosen so that periodic overflows will occur in the value of R stored in the delay lines. This causes ΔZe and ΔZs signals to be produced for indicating the existence of an overflow in the value of R as well as the polarity of each such overflow. However, no overflow can ever occur in the value of Y stored in the Y delay line. The reason is that any computations occurring after an overflow in the value of Y would not truly represent the area of each YΔX increment such as the area 34 shown in FIGURES 2 and 3.

An overflow in the value of Y is indicated by the simultaneous occurrence in particular signals representing values of ΔY and representing the combination of the values of Y and ΔY to obtain a new value of Y. For example, a carry by the Yc flip-flop may be produced in the most significant digit at the same time that signals are produced to indicate positive values for the ΔY increment and the dependent quantity Y. Since a carry is produced at such times, an overflow is indicated. This causes a signal to pass through the gate 54 at position 30, which is the most significant digit in the integrator in each cycle of computation. This signal triggers the Of flip-flop to a particular state such as the true state to indicate the occurrence of an overflow in the value of the dependent quantity Y.

In order to initiate a solution of any particular mathematical problem, the initial value of Y has to be properly shown. For example, it will be seen that the initial value of Y has a particular positive value in the example shown in FIGURE 2. This value of Y should be inserted into the Y delay line before computations leading to the solution of the mathematical problem can actually be commenced. The initial value of Y is inserted as a first step into the I delay line on an individual basis for successive digits and thereafter transferred from the I delay line into the Y delay line. This transfer from the I delay line to the Y delay line is made before computations leading to the solution of the mathematical problem are commenced.

The insertion of the digital information representing the initial value of Y is obtained on an octal basis. Information relating to the binary value of 3 successive digits is individual inserted into the S, Sr and Ss flip-flops. The insertion of information into the S, Sr and Ss flip-flops respectively occurs through gates 60, 62 and 64. The flip-flop Ss indicates the least significant of the 3 successive binary digits; the flip-flop Sr indicates the second least significant of the 3 binary digits; and the flip-flop S indicates the most significant of the 3 successive binary digits.

After the binary information relating to the 3 successive binary digits have been inserted into the Ss, Sr and S flip-flops, the information is transferred from these flip-flops into the I delay line. The transfer occurs in a stepping relationship such that in a first clock time the information from the Ss flip-flop is introduced through the gate 12 to the In write flip-flop for insertion into the I delay line. At the same time, the information from the Sr flip-flop is stepped into the Ss flip-flop, and the information from the S flip-flop is stepped into the Sr flip-flop. The gates 62 and 64 are operatively controlled so that the sequential stepping operations can occur to transfer the information from the Sr and S flip-flops into the Ss and Sr flip-flops, respectively, in the first clock time.

In the second clock time, the information transferred from the Sr flip-flop to the Ss flip-flop now becomes inserted into the I delay line by passing through the gate 12 to the In write flip-flop. At the same time, the information previously transferred from the S flip-flop into the Sr flip-flop now becomes transferred to the Ss flip-flop. In this way, the information originally in the S flip-flop is able to become inserted into the I delay line in a third clock time.

The information inserted from the Ss, Sr and S flip-flops into the I delay line circulates through a path including the I delay line, the Ir read flip-flop, the gate 12 and the In write flip-flop during the time that information relating to the next 3 positions is being inserted into the Ss, Sr and S flip-flops. In this shortened path, no delay or precession of the information in the I delay line occurs.

At a subsequent time, information may have become recorded in the Ss, Sr and S flip-flops to indicate the initial values of Y in the fourth, fifth and sixth least significant digits. After the recording of such information in the Ss, Sr and S flip-flops, the information becomes subsequently stepped into the I delay line in accordance with the operation of the gates 62 and 64. At the same time, the gate 60 becomes opened so that the information previously recorded in the I delay line can circulate through the S, Sr and Ss flip-flops.

By opening the gate 60 to the information read by the Ir flip-flop from the I delay line, the information previously recorded in the I delay line becomes sequentially stepped into the S, Sr and Ss flip-flops as the information in the S, Sr and Ss flip-flops becomes stepped into the I delay line. By stepping into the S, Sr and Ss flip-flops the information previously inserted into the I delay line, a delay is provided in such information so that the new information can be recorded in the I delay line. In this way, information is recorded on an octal basis into the I delay line until the complete value relating to the initial condition of Y has been recorded.

As will be apparent from the previous discussion, the output quantity R is represented by overflows in the value of R which is recorded in the R delay line in successive cycles of computation. Such overflows in the value of the output quantity R are represented by the state of operation of the ΔZe and ΔZs flip-flops in successive cycles of computation. These overflows are used to produce the ΔX and ΔY increment for various integrators in accordance with the inter-relationship required between the integrators to obtain the solution of the mathematical problem. Because of this, any value remaining in the R delay line at the end of a computation constitutes an error.

In order to minimize the error resulting from the value still remaining in the R delay line at the end of a computation, an initial value of R may be inserted into the R delay line before computation is commenced. On an average basis, the optimum value for insertion into the R delay line has an initial value of one-half of the capacity of the R delay line. This may be represented by a binary value of "1" in the most significant digit and all binary values of "0" in the other digits. It also may be represented by binary values of "1" for all of the digits except the most significant digit and by a binary value of "0" for the most significant digit.

The digital differential analyzer constituting this invention generally includes a plurality of integrators which are inter-related in accordance with the mathematical problem to be solved. These integrators are inter-related by introducing the $\Delta Z$ increments from each integrator to particular ones of the other integrators in successive cycles of computations. For example, the $\Delta Z$ increment from a first integrator may be introduced to a second integrator to represent the $\Delta X$ increments for the second integrator. Similarly, the $\Delta Z$ increments from the second integrator may be introduced to a third integrator to represent the $\Delta Y$ increments for the third integrator.

FIGURES 4 and 4a indicate how two integrators similar to those shown in FIGURE 1 may be inter-related to obtain particular output quantities. As will be seen, each integrator is represented by an enlarged hollow arrow which points toward the right. The $\Delta X$ input to an integrator is indicated by an arrow extending toward the left and intersecting the integrator at the upper portion of the enlarged arrow representing the integrator. The $\Delta Y$ input to the integrator is indicated by an arrow extending toward the left and intersecting the enlarged arrow representing the integrator at the position near the bottom of the large arrow. The output from each integrator is indicated by a line extending from the tip of the enlarged arrow representing the integrator.

To obtain trigonometric functions such as sines and cosines, two integrators are interrelated in a manner similar to that shown in FIGURE 4. As will be seen, the $\Delta Z$ outputs from each integrator are introduced to the other integrator as the $\Delta Y$ inputs for the other integrator. Timing signals may be introduced to the integrators to serve as the $\Delta X$ increment to the integrators. These timing signals may be timing signals which occur with precise regularity to represent the actual passage of time or they may be $\Delta X$ increments in an output quantity from another integrator or they may be increments in an external quantity such as that obtained from a measuring instrument. The $\Delta X$ increments may also be obtained from a direct voltage of constant magnitude. The output from each integrator is then introduced to the other integrator to serve as the $\Delta Y$ increment for the other integrator. By providing a relationship in this manner, one of the integrators indicates the sine function and the other integrator indicates the cosine function.

*Detailed Control Circuitry*

Figure 5:
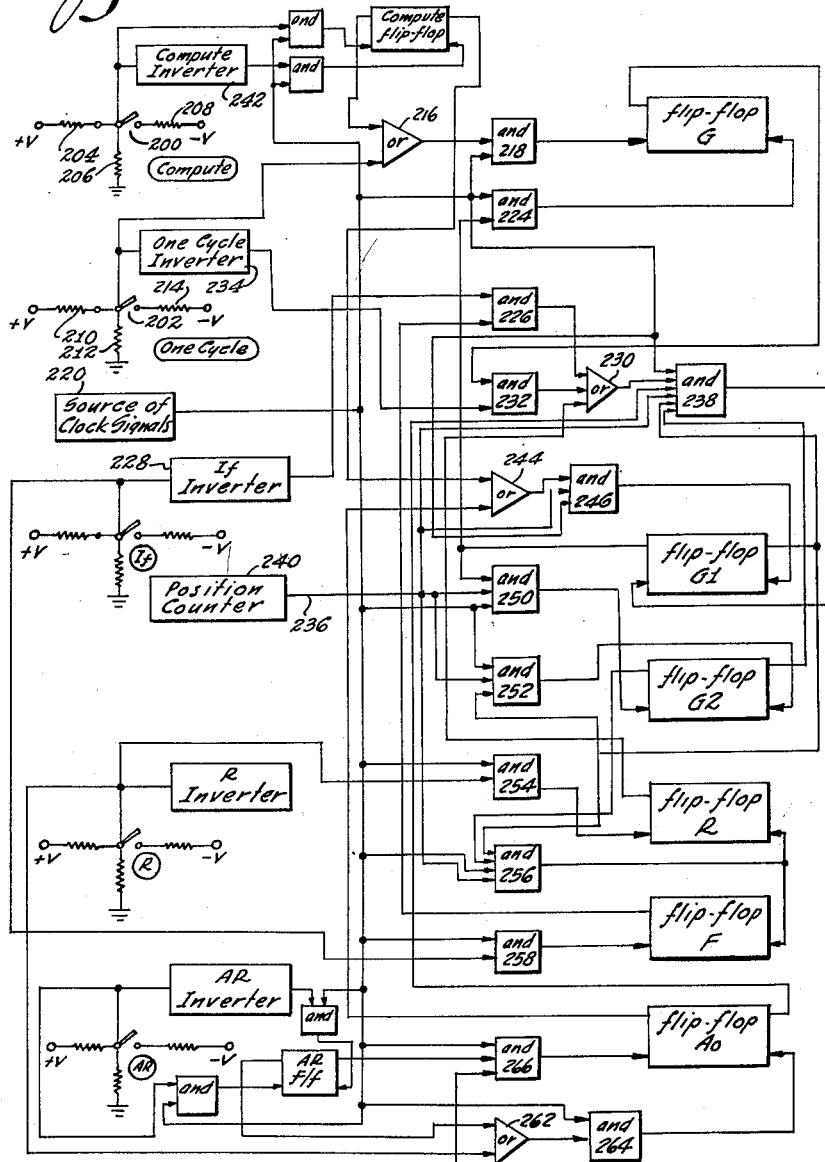

FIGURE 5 illustrates in detail the circuitry which is included to provide a control over the operation of the digital differential analyzer constituting this invention. FIGURE 5 also indicates the logical equations by which the circuitry shown in FIGURE 5 is constructed. The circuitry shown in FIGURE 5 includes a pair of spring-loaded push buttons 200 and 202 which are normally open and which are closed only during the time that the switches are manually depressed. The switch 200 may be designated as the "Compute" switch and is adapted to be closed when a computing operation through a plurality of successive cycles is to be produced. The switch 202 may be designated as the "One Cycle" switch and is adapted to be closed when only a single cycle of computation is to be obtained.

The movable arm of the switch 200 is connected to first terminals of resistances 204 and 206. The second terminal of the resistance 206 is connected to a reference potential such as ground, and the second terminal of the resistance 204 is connected to a source of positive potential which may be designated as V. Connection is made from the stationary contact of the "Compute" switch 200 to one terminal of a resistance 208 having a second terminal connected to a source of negative potential which may be designated as —V. The "One Cycle" switch 202 is electrically associated with resistances 210, 212 and 214 in a manner similar to the association between the "Compute" switch 200 and the resistances 204, 206 and 208.

In this way, a positive potential approaching V+ is produced on the movable arms of the "Compute" and "One Cycle" switches when the switches are maintained in their open state. The potentials on the movable arms of the "Compute" and "One Cycle" switches increase in a negative direction toward V— when the switches become closed. It will be appreciated that the circuit representations for varying the potentials on the movable arms of the different switches such as the "Compute" and "One Cycle" switches are only by way of illustration and that other representations may also be used. For example, a preferred embodiment will be discussed subsequently.

The movable arms of the switches 200 and 202 are connected to the left input terminals of flip-flops which may be designated as "Compute" and "One Cycle." The left output terminals of these flip-flops are in turn connected to input terminals of an "or" network 216 having its output terminal connected to an input terminal of an "and" network 218. A second input terminal of the "and" network 218 is connected to a source 220 of clock signals. The signals passing through the "and" network 218 are introduced to the left input terminal of a flip-flop designated hereafter as the "G" flip-flop.

The construction of "or" gates corresponding to the "or" gate 216 of "and" gates corresponding to the "and" gate 218 and of flip-flops corresponding to the "G" flip-flop will be described in detail subsequently. The construction of the source 220 of clock signals will also be described in detail subsequently. For purposes of the subsequent discussion, an "or" network such as the network 216 passes a signal when a signal of particular characteristics such as a signal of relatively low amplitude is introduced to one or more of its input terminals. An "and" network such as the network 218 passes a signal only when signals of particular characteristics such as signals of relatively low amplitude are simultaneously introduced to all of its input terminals. The source of clock signals 220 is adapted to provide signals at precisely defined periodic intervals such as at a rate of three megacycles per second.

Each flip-flop such as the "G" flip-flop is provided with two stages so inter-related that one stage is conductive while the other stage is non-conductive at any instant. Each stage in the flip-flop has an input terminal and an output terminal. These input terminals may be respectively designated as the "left" and "right" input terminals, and the output terminals may be correspondingly designated as the "left" and "right" output terminals. In this way, the designation of the input and output terminals corresponds to the showing in the drawings. When a signal is introduced to one of the input terminals in the flip-flop, it triggers into a state of non-conductivity the stage associated with that input terminal. This lowers the potential on the associated output terminal so that a signal of relatively low amplitude is produced on the output terminal. The introduction of a triggering signal to the left input terminal of a flip-flop causes the flip-flop to be triggered to the "true" state. In like manner, the flip-flop becomes triggered to a "false" state upon the introduction of a triggering signal to the right input terminal of the flip-flop.

An "and" network 224 has input signals applied to it from the clock source 220 and from the left output terminal of a flip-flop which may be designated as the "G1" flip-flop. The output signals from the "and" network 224 are introduced to the right input terminal of the G flip-flop.

The operation of the G1 flip-flop is controlled by certain stages including an "and" network 226. Input terminals of the "and" network 226 are connected to an inverter 228 and to the left output terminal of a flip-flop which may be designated as the "F" flip-flop. The inverter 228 is adapted to receive signals produced on the movable arm of a single-pole single-throw switch which may be designated as the "If" switch. The If switch is electrically associated with a plurality of resistances in a manner similar to that described above for the "Compute" switch 200. In this way, the If inverter produces a relatively positive signal in the opened position of the If switch and produces a relatively negative signal upon a closure of the If switch.

The signals passing through the "and" network 226 are introduced to an "or" network 230, as are the signals on the left output terminal of a flip-flop which may be designated as the "R" flip-flop. The "or" network 230 also receives from an "and" network 232 having its input terminals connected to the left output terminal of the G flip-flop and to an inverter 234 which inverts the signals on the movable arm of the switch 202.

The signals passing through the "or" network 230 are introduced to an input terminal of an "and" network 238. Connections are made to other input terminals of the "and" network 238 from the clock source 220, from an output line 236 of a position counter 240 and from the right output terminals of flip-flops which may be designated as the "Ao," "G1" and "G2" flip-flops. The signals from the "and" network 238 are introduced to the left input terminal of the G1 flip-flop.

An inverter 242 is connected to the movable arm of the switch 200 to invert the signals on the movable arm of the switch. The signals from the inverter 242 are introduced to the right input terminal of the "Compute" flip-flop to trigger the flip-flop to the false state. The signals on the right output terminal of the "Compute" flip-flop and on the left output terminal of the Ao flip-flop pass through an "or" network 244 to an input terminal of "and" network 246. Other input terminals of the "and" network 246 are connected to the line 236 from the counter 240 and to the clock source 220. The signals from the "and" network 246 are introduced to the right input terminal of the G1 flip-flop.

The position counter 240 is not shown in detail since it may be constructed in accordance with techniques now well known to persons skilled in the art. For example, the counter may be constructed in a manner similar to that disclosed on pages 397 to 427, inclusive, of Digital Computer and Component Circuits, by R. K. Richards (published by D. Van Nostrand Company in 1957). The counter may be constructed with five flip-flops which are so inter-related that the counter counts between "1" and "30" inclusive on a cyclic basis. The signals are produced on the line 236 every time that the count in the counter has a decimal value of "30."

Although the counter 240 is shown in block form, applicants are submitting logical equations illustrating how the counter may be built. These logical equations are set forth below:

$$t1 = \overline{T}1T$$
$$ot1 = T1T$$
$$t2 = (T1\overline{T}2 + \overline{T}1T2T3T4T5)T$$
$$ot2 = T1T2T$$
$$t3 = T1T2\overline{T}3T$$
$$ot3 = T1T2T3T$$
$$t4 = T1T2T3\overline{T}4T$$
$$ot4 = T1T2T3T4T$$
$$t5 = T1T2T3T4\overline{T}5T$$
$$ot5 = T1T2T3T4T5T$$

In the above equations, T1, T2, T3, T4 and T5 indicate binary values of progressive digital significance; a bar over an indication represents a false state of operation of the corresponding flip-flop; and a plus (+) sign indicates an "or" representation. As will be seen, five flip-flops normally provide a count between decimal values of "1" and "32" on a binary basis. However, the second term in the equation for triggering the T2 flip-flop to the true state is included to shorten the count to the decimal values between "1" and "30" inclusive, by skipping the decimal numbers "2" and "3."

Signals from "and" network 250 and 252 are respectively introduced to the left and right input terminals of the G2 flip-flop. The "and" network 250 has signals applied to it from the left output terminal of the G1 flip-flop, the line 236 and the clock source 220. The "and" network 252 receives signals on its input terminals from the right output terminal of the G1 flip-flop, the clock source 220 and the line 236.

Connections are respectively made to the left and right input terminals of the R flip-flop from "and" networks 254 and 256. The "and" network 254 is connected to receive signals from the clock source 220 and from the movable arm of a single-pole, single-throw switch which may be designated as the "R" switch. This switch is spring-loaded in a manner similar to that described above for the switches 200 and 202 and in a manner similar to that provided for all of the other switches which will be described subsequently. The R switch may also be connected to a plurality of resistances in a manner similar to that described above for the switches 200 and 202.

The "and" network 256 is operatively controlled by signals from the clock source 220, the line 236, the left output terminal of the G2 flip-flop and the right output terminal of the G1 flip-flop. The signals passing through the "and" network 256 are also introduced to the right input terminal of the F flip-flop. The left input terminal of the F flip-flop has signals applied to it from an "and" network 258, the operation of which is controlled by signals from the clock source 220 and the movable arm of the If switch.

A switch designated as the "AR" switch is also shown in FIGURE 5 and is electrically associated with a plurality of resistances in a manner similar to that described above for the other switches including the switches 200 and 202. The movable arm of the AR switch is connected to an AR inverter and to the left input terminal of an AR flip-flop. The left output terminal of the AR flip-flop is connected to an input terminal of an "or" network 262. A second input terminal of the "or" network 262 receives the signals on the left output terminal of the R flip-flop. The signals passing through the "or" network 262 are applied to an input terminal of an "and" network 264 having a second input terminal connected to the clock source 220. The signals from the "and" network 264 are in turn applied to the right input terminal of the Ao flip-flop.

The left input terminal of the Ao flip-flop has signals applied to it from an "and" network 266, connections being made to the input terminals of the "and" network from the right output terminal of the AR flip-flop, the clock source 220, and an inverter which may be designated as the "$\overline{Ofi}$" inverter. The $\overline{Ofi}$ inverter inverts the signals from an $\overline{Ofi}$ amplifier. The $\overline{Ofi}$ amplifier has signals applied to it from an "and" network 268 which is operatively controlled by signals from the right output terminals of a plurality of flip-flops. These flip-flops may be respectively designated as "Of1," Of2," "Of3" etc. Each of the flip-flops Of1, Of2, Of3, etc., is respectively associated with a different one of the integrators in the digital differential analyzer to indicate an overflow in the value of the dependent quantity Y for the associated integrator.

During the time that the switch 200 is open, the movable arm of the switch receives a positive voltage through the resistance 204 from the terminal designated as +V. This voltage causes the "Compute" flip-flop to be in the false state such that a signal is unable to pass through the "or" network. In like manner, a positive potential is produced on the switch 202 during the time that the switch is open to maintain the "One Cycle" flip-flop in the false state. This false state of the "One Cycle" flip-flop also prevents a signal from passing through the "or" network 216.

One of the switches 200 and 202 is closed to institute a computing operation. The switch 200 is closed to obtain a computing operation through a plurality of cycles, and the switch 202 is closed to obtain a computation through a single cycle of operation. A single cycle of operation corresponds to 30 digital positions when each of the I, Y and R delay lines shown in FIGURE 1 has a capacity of 30 positions.

Upon the closure of one of the switches 200 and 202, the associated flip-flop becomes triggered to the true state so that a signal passes the "or" network 216 to the "and" network 218. This signal is synchronized in time with the passage of signals through other logical networks because of the introduction of a signal to the "and" network from the source 220. The signal passing through the "and" network 218 triggers the G flip-flop to the true state. The triggering of the G flip-flop to the true state may be indicated by the logical equation:

$$g = (\text{Compute} + \text{One Cycle})T \qquad (1)$$

where $g$ = the introduction of a triggering signal to the left input terminal of the G flip-flop;
Compute = a true state of the "Compute" flip-flop upon a closure of the switch 200;
One Cycle = a true state of the "One Cycle" flip-flop upon a closure of the switch 202;
$T$ = a signal from the clock source 220; and
$(+)$ = an "or" representation.

Upon the triggering of the G flip-flop to the true state in accordance with Equation 1 set forth above, a relatively high potential is introduced from the left output terminal of the G flip-flop to the "and" network 232. Both the G1 and G2 flip-flops are in their false states at this time. Furthermore, the Ao flip-flop is in the false state since no overflow has yet occurred in the value of the dependent quantity Y for any of the integrators. This causes the "and" network 238 to be prepared for the passage of the signal upon the introduction of a signal from the "or" network 230. A signal passes through the "or" network 230 from the "and" network 232 during periods of computation of more than one cycle.

A signal also passes through the "or" network 230 when one of two other conditions exists. One of these two conditions occurs when the R flip-flop has been triggered to a true state upon a closure of the R switch to obtain a transfer of the initial conditions from the I delay lines in each integrator to the Y delay line in that integrator. The other of the two conditions exists when the I$f$ switch is closed to trigger the F flip-flop to the true state so that the initial conditions for the value of the dependent quantity Y can be inserted into the I delay line in a manner similar to that described previously.

The G1 flip-flop is triggered to the true state upon the passage of a signal through the "and" network 238. The logical equation for triggering the G1 flip-flop to the true state may be expressed as:

$$g_1 = P30\overline{G2}\,\overline{G1}[\,\widehat{(\textit{If})}\,F + (\overline{\text{One Cycle}})G + R]\overline{Ao}T \qquad (2)$$

where $g_1$ = the introduction of a triggering signal to the left input terminal of the G1 flip-flop;
$\overline{G2}$ = a relatively low voltage on the right output terminal of the G2 flip-flop to indicate a false state of operation of the flip-flop;
$\overline{G1}$ = a relatively low voltage on the right output terminal of the G1 flip-flop to indicate a false state of operation of the flip-flop;
$\widehat{(\textit{If})}$ = the open state of the I$f$ switch;
$F$ = a relatively low voltage on the left output terminal of the F flip-flop to indicate a true state of operation of the flip-flop;
$G$ = a relatively low voltage on the left output terminal of the G flip-flop to indicate a true state of operation of the flip-flop;
$R$ = a relatively low voltage on the left output terminal of the R flip-flop to indicate a true state of operation of the flip-flop;
$\overline{Ao}$ = a relatively low voltage on the right output terminal of the Ao flip-flop to indicate a false state of operation of the flip-flop; and
$\overline{\text{One Cycle}}$ = a relatively low voltage on the right output terminal of the One Cycle flip-flop to indicate a false state of operation of the flip-flop.

It will be seen from the previous discussion that the G1 flip-flop becomes triggered to the true state in either the fill or re-set operations and in a computing operation. When the G1 flip-flop becomes triggered to the true state, the G flip-flop becomes triggered to the false state by the passage of a signal through the "and" network 224. The triggering of the G flip-flop to the false state may be represented as:

$$og = G1T \qquad (3)$$

The G1 flip-flop remains in the true state as long as a computing operation is taking place provided that no overflow occurs in the value of the dependent quantity Y stored in the Y delay line for each integrator. When this occurs, a signal flows from the "or" network 244 through the "and" network 246 at position 30 of a cycle of computation and triggers the G1 flip-flop to the false state of operation. The logical equation for controlling the triggering of the G1 flip-flop to the false state may be represented as:

$$og1 = P30[(\overline{\text{Compute}}) + Ao]T \qquad (4)$$

The G2 flip-flop follows the operation of the G1 flip-flop after a delay of one cycle of operation. In this way, the G2 flip-flop is triggered to the true state at position 30 of the next cycle of operation after the G1 flip-flop has been triggered to the true state. This occurs as a result of the passage of a signal through the "and" network 250. In like manner, a signal passes through the "and" network 252 and triggers the G2 flip-flop to the false state at position 30 in the cycle of computation after the triggering of the G1 flip-flop to the false state. The G2 flip-flop becomes respectively triggered to the true and false states in accordance with the logical equations set forth below:

$$g2 = G1P30T \qquad (5)$$
$$og2 = \overline{G1}P30T \qquad (6)$$

The R flip-flop is triggered to the true state when the R switch is closed. The closure of the R switch causes the potential on the movable arm of the R switch to change in a negative direction so that a signal is able to pass through the "and" network 254. The R flip-flop becomes triggered to the true state in accordance with the following logical equation:

$$r = \widehat{(R)}\,T \qquad (7)$$

where $\widehat{(R)}$ = the closure of the R switch.

The R flip-flop becomes triggered to the true state to indicate that the initial values of Y are to be inserted from the I delay line into the Y delay line in a manner similar to that described previously. This causes the G1 flip-flop to be triggered to the true state upon the simultaneous occurrence of certain other conditions indicated above in Equation 2. The R flip-flop remains true as long as the G1 flip-flop remains true. However, in a reset operation the G1 flip-flop becomes triggered false after a single cycle of operation. This single cycle is sufficient for the initial value of the dependent quantity Y to be transferred from the I delay line to the Y delay line for each integrator.

In the first cycle of operation after the triggering of the G1 flip-flop back to the false condition, the G2 flip-flop is true because of the one cycle delay between the operation of the G1 and G2 flip-flops. Since the G2 flip-flop is true and the G1 flip-flop is false at position 30 of this cycle of operation, the R flip-flop becomes triggered back to the false state in accordance with the following logical equation:

$$or = P30G2\overline{G1}T \tag{8}$$

The F flip-flop is triggered to the true state upon the closure of the (f) switch just as the R flip-flop is triggered to the true state upon the closure of the (R) switch. The triggering of the F flip-flop initiates an operation by which information can be inserted selectively into each digital position of the I delay line for an integrator. The fill operation represented by the true state of the F flip-flop occurs when information in the $Ss$, $Sr$ and S flip-flops are sequentially stepped into the I delay line in a manner similar to that described previously in connection with FIGURE 1. As previously described, this information is inserted into the $Ss$, $Sr$ and S flip-flops before the closure of the (f) switch.

The triggering of the F flip-flop to the true state may be represented by the following logical equation:

$$f = (f)T \tag{9}$$

After one cycle of operation the F flip-flop is triggered to the false state in accordance with the following logical equation:

$$of = P30G2\overline{G1}T \tag{10}$$

As will be seen, Equation 10 corresponds to Equation 8 set forth above for controlling the triggering of the R flip-flop to the false state.

A signal of high amplitude is produced by the $\overline{Ofi}$ amplifier in FIGURE 5 when no overflow in the value of the dependent quantity Y occurs in any of the Y delay lines. During the time that a relatively high voltage is produced by the $\overline{Ofi}$ amplifier, no signal is able to pass through the "and" network 266 to trigger the Ao flip-flop to the true state. Since the Ao flip-flop provides an alarm in the true state, an alarm is not produced as long as no overflow occurs in the value of the dependent quantity Y for any integrator. Because of this, computation can proceed during the time that the Ao flip-flop is maintained in the false state. This is indicated by the fact that the G1 flip-flop remains in the true state while the Ao flip-flop is in the false state, as may be seen from Equation 2 set forth above.

The Ao flip-flop becomes triggered to the true state in accordance with the following logical equation:

$$ao = \overline{AR}(Ofi)T \tag{11}$$

When the Ao flip-flop has become triggered to the true state, it remains in that state until either the alarm reset switch (AR) or the reset switch (R) is closed. The alarm reset switch (AR) is closed when computation is desired without resetting the initial values of Y into the Y delay line for each integrator and even though an overflow in the dependent quantity Y has been produced for an integrator. The reset switch (R) is closed when it is desired to begin computations from the beginning, possibly to check whether the digital differential analyzer is producing an overflow in the value of the dependent quantity Y for an integrator. Upon a closure of either the (R) switch or the (AR) switch, the associated flip-flop becomes true so that a signal passes through the "or" network 262. This causes the Ao flip-flop to become triggered to the false state in accordance with the following logical equation:

$$oao = (AR + R)T \tag{12}$$

*Detailed Diagram of Integrator*

Detailed circuitry for the operation of an integrator to perform an integration of a dependent quantity and variations in an independent quantity is shown in FIGURES 6, 7, 8 and 9. The circuitry shown in FIGURE 6 includes an "and" network 270 which receives signals from the clock source 220, the right output terminal of the S flip-flop, the left output terminals of the $Yr$ and $\Delta Zey$ flip-flops and the right output terminal of the R flip-flop. The signals from the $\Delta Zey$ flip-flop represent the $\Delta Ze$ signals from the integrator being described or from another integrator and serve as the signals representing the occurrence of a $\Delta y$ increment for the integrator being described. The signals from the "and" network 270 are introduced to the left input terminal of the $Yd$ flip-flop to trigger the flip-flop to the true state.

The right input terminal of the $Yd$ flip-flop has signals introduced to it from an "and" network 272, the operation of which is controlled by signals from an "or" network 274 and from the clock source 220. Signals pass through the "or" network 274 from an "and" network 276 and from an output line 278 of the position counter 240. The "and" network 276 is electrically coupled to the left output terminals of the S flip-flop and of the $\Delta Zsy$ flip-flop of that integrator or a different integrator dependent upon the problem to be solved.

The signals on the right output terminal of the $Yd$ flip-flop are introduced to an "and" network 280, as are the signals from the left output terminal of the $Yr$ read flip-flop and from the right output terminal of a $Yc$ flip-flop and the signals from an "or" network 282. The "or" network 282 passes signals of relatively high positive potential from the left output terminal of the R flip-flop and the right output terminal of a Go flip-flop. The signals from the "and" network 280 and from an "and" network 284 pass through an "or" network 286 to an input terminal of an "and" network 287. Input terminals of the "and" network 284 are connected to the left output terminals of the S and $Yd$ flip-flops and the right output terminals of the $Yc$ and $Yr$ flip-flops.

Signals from "and" networks 286, 288 and 290 also pass through the "or" network 286 to an input terminal of an "and" network 287, another input terminal of which is connected to the clock source 220 and the output terminal of which is connected to the left input terminal of the $Yn$ flip-flop. The signals from the "or" network 286 are also inverted by a $yn$ inverter and introduced in inverted form to an input terminal of an "and" network 289, the operation of which is synchronized by the signals from the clock source 220. The signals from the "and" network 289 in turn trigger the $Yn$ flip-flop to the false state.

The "and" network 286 is operatively controlled by signals from the left output terminals of the S and $Yc$ flip-flops and the right output terminals of the $Yr$ and $Yd$ flip-flops. The "and" network 288 has input signals applied to it from the left output terminals of the $Yr$, $Yd$ and $Yc$ flip-flops. Connections are made to the input terminals of the "and" network 290 from the left output terminals of the R, $Ir$ and Go flip-flops.

The signals passing through "and" networks 292 and 294 are respectively introduced to the left and right input terminals of the $Yc$ flip-flop. The "and" network 292 has input terminals connected to the clock source 220, the left output terminal of the $Yd$ and $Yr$ flip-flops and the right output terminal of the R flip-flop. Input terminals of the "and" network 294 are connected to the clock source 220 and the right output terminals of the R, $Yr$ and $Yd$ flip-flops.

Figure 6:
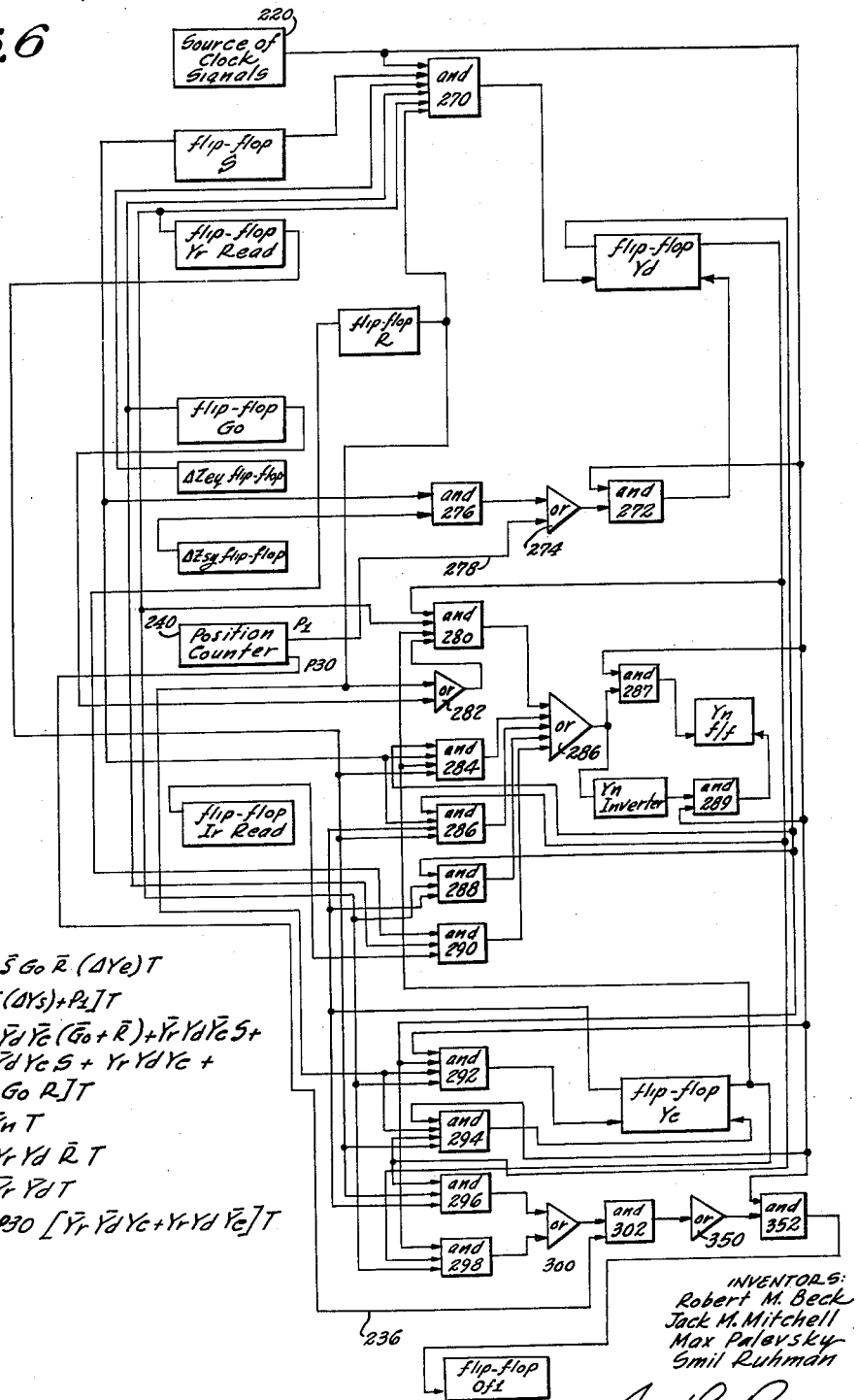

"And" networks 296 and 298 are also included in FIGURE 6. The "and" network 296 receives input signals from the left output terminal of the $Yd$ flip-flop and the right output terminals of the $Yc$ and $Yr$ flip-flops. The "and" network 298 has signals applied to it from the left output terminals of the $Yr$ and $\Delta Ze$ flip-flops and the right output terminal of the Yc flip-flop. The signals from the "and" networks 296 and 298 pass through an "or" network 300 to one input terminal of an "and" network 302 having another input terminal connected to the output line 236 of the counter 240. The signals from the "and" network 302 in turn pass through an "or" network 350 and an "and" network 352 (also shown in FIGURE 7) to the left input terminal of a particular flip-flop. This flip-flop may be designated as the $Of1$ flip-flop to indicate its use in a first integrator in the plurality.

Figure 7:
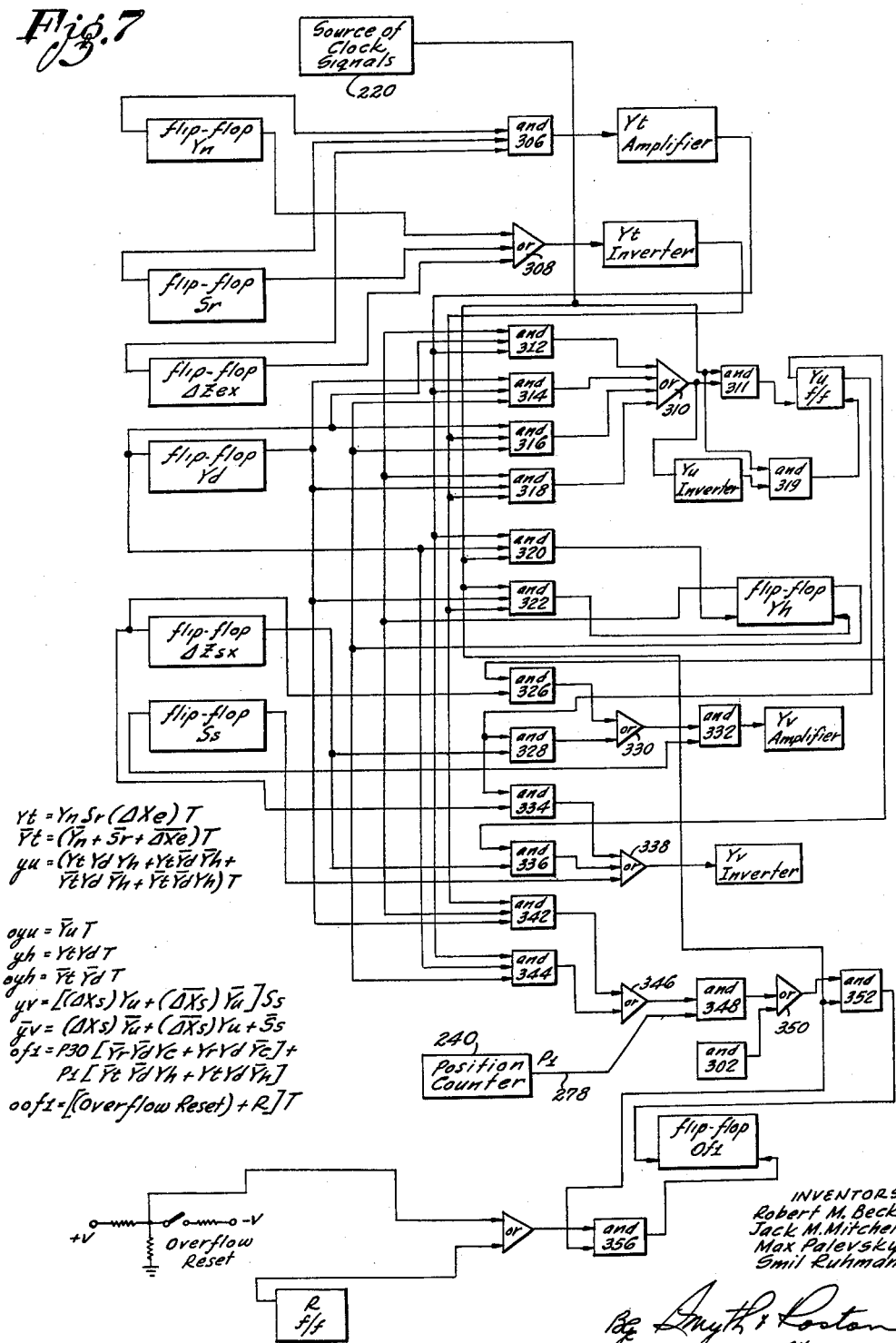

FIGURE 7 includes a $Yt$ amplifier and a $Yt$ inverter which respectively become activated by signals passing through an "and" network 306 and an "or" network 308. The "and" network 306 is operatively controlled by signals from the left output terminals of the $Yn$, $Sr$ flip-flops and a $\Delta Zex$ flip-flop. The $\Delta Zex$ flip-flop shown in FIGURE 7 is generally not the same flip-flop as the $\Delta Zey$ flip-flop shown in FIGURE 6 since the flip-flop shown in FIGURE 6 relates to the existence of a $\Delta Y$ increment and the flip-flop shown in FIGURE 7 relates to the existence of a $\Delta X$ increment. Signals are introduced to the "and" network 309 from the clock source 220 and from an "or" network 308. Signals in turn pass through the "or" network 308 from the right output terminals of the $Sr$, $Yn$ and $\Delta Zex$ flip-flops.

The operation of a $Yu$ flip-flop is controlled by signals passing through "and" networks 312, 314, 316 and 318. The "and" network 312 is operatively controlled by signals from the left output terminals of the $Yt$, $Yd$ and $Yh$ flip-flops. The "and" network 314 has signals applied to it from the $Yt$ amplifier and the right output terminals of the $Yd$ and $Yh$ flip-flops. The "and" network 316 has input terminals connected to the $Yk$ inverter, left output terminal of the $Yd$ flip-flop and the right output terminal of the $Yh$ flip-flop. Connections are made to input terminals of the "and" network 318 from the $Yt$ inverter, the left output terminal of the $Yh$ flip-flop and the right output terminal of the $Yd$ flip-flop.

The signals from the "and" networks 312, 314, 316 and 318 pass through an "or" network 310 to an input terminal of an "and" network 311, another input terminal of which is connected to the clock source 220. The signals from the "and" network 311 trigger the $Yu$ flip-flop to the true state. The signals from the "and" networks 312, 314, 316 and 318 also pass through the "or" network 310 to a $yu$ inverter which inverts the signals and introduces the inverted signals to an "and" network 319. Another input terminal of the "and" network 319 is connected to the clock source 220 and the output terminal of the "and" network is connected to the right input terminal of the $Yu$ flip-flop.

Signals from "and" networks 320 and 322 respectively pass to the left and right input terminals of the $Yh$ flip-flop. Signals are introduced to the "and" network 320 from the clock source 220, the $Yt$ amplifier and the left output terminal of the $Yd$ flip-flop. In like manner, the "and" network 322 has signals introduced to it from the clock source 220, the $Yt$ inverter and the right output terminal of the $Yd$ flip-flop.

The signals introduced to a $Yv$ amplifier are dependent upon in part on the operation of "and" networks 326 and 328. Input terminals of the "and" network 326 are connected to the left output terminals of the $Yu$ and $\Delta Zsx$ flip-flop. The $\Delta Zxs$ flip-flop shown in FIGURE 7 is generally not the same as the $\Delta Zsy$ flip-flop shown in FIGURE 6 since the $\Delta X$ increment for each integrator is generally obtained from a different integrator than the $\Delta Y$ increment for the integrator. The $\Delta Zsy$ flip-flop shown in FIGURE 6 controls the sign of the $\Delta Y$ increment introduced to the integrator and the $\Delta Zsx$ flip-flop shown in FIGURE 7 controls the sign of the $\Delta X$ increment introduced to the integrator.

The signals on the right output terminal of the $\Delta Zsx$ flip-flop shown in FIGURE 7 are introduced to an input terminal of the "and" network 328, another input terminal of which is connected to the right output terminal of the $Yu$ flip-flop. The signals from the "and" networks 326 and 328 pass through an "or" network 330 to an input terminal of an "and" network 332 having another input terminal connected to the left output terminal of the $Ss$ flip-flop. The signals from the "and" network 332 in turn pass to the $Yv$ amplifier.

"And" networks 334 and 336 control in part the signals introduced to the $Yv$ inverter. Input terminals of the "and" network 334 are electrically coupled to the right output terminal of the $Yu$ flip-flop and to the left output terminal of the $\Delta Zsx$ flip-flop shown in FIGURE 7. Connections are made to the input terminals of the "and" network 336 from the left output terminal of the $Yu$ flip-flop and the right output terminal of the $\Delta Zsx$ flip-flop shown in FIGURE 7. The signals from the "and" networks 334 and 336 and the signals on the right output terminal of the $Ss$ flip-flop in the false state of the flip-flop pass through an "or" network 338 to the $Yv$ inverter.

Input terminals of an "and" network 342 are connected to the $Yt$ inverter, the left output terminal of the $Yh$ flip-flop and the right output terminal of the $Yd$ flip-flop. An "and" network 344 has input terminals connected to the $Yt$ amplifier, the left output terminal of the $Yd$ flip-flop and the right output terminal of the $Yh$ flip-flop. The signals from the "and" networks 342 and 344 pass through an "or" network 346 to an input terminal 348 having another input terminal connected to the line 278 of the position counter 240. The signals from the "and" network 348 and from the "and" network 302 shown in FIGURE 6 in turn pass through an "or" network 350 and to an input terminal of an "and" network 352, another input terminal of which is connected to the clock source 220. The signals from the "and" network 352 are in turn introduced to the left input terminal of the $Of1$ flip-flop.

The signals of particular characteristics on the left output terminal of the R flip-flop and on the movable arm of the overflow reset switch pass through an "or" network 354 to an input terminal of an "and" network 356. A second input terminal of the "and" network 356 is connected to the clock source 220 and the output terminal of the "and" network 356 is connected to the right input terminal of the $Of1$ flip-flop. The R flip-flop is triggered true when the Ⓡ switch is closed to reset the initial values in the I delay lines into the Y delay lines. The Ⓡ switch may be closed whether or not an overflow in the dependent quantity Y has occurred. The Overflow Reset switch is closed to reset the Overflow Reset flip-flop so that computation can be resumed without introducing the information in the I delay line into the Y delay line.

Figure 8:
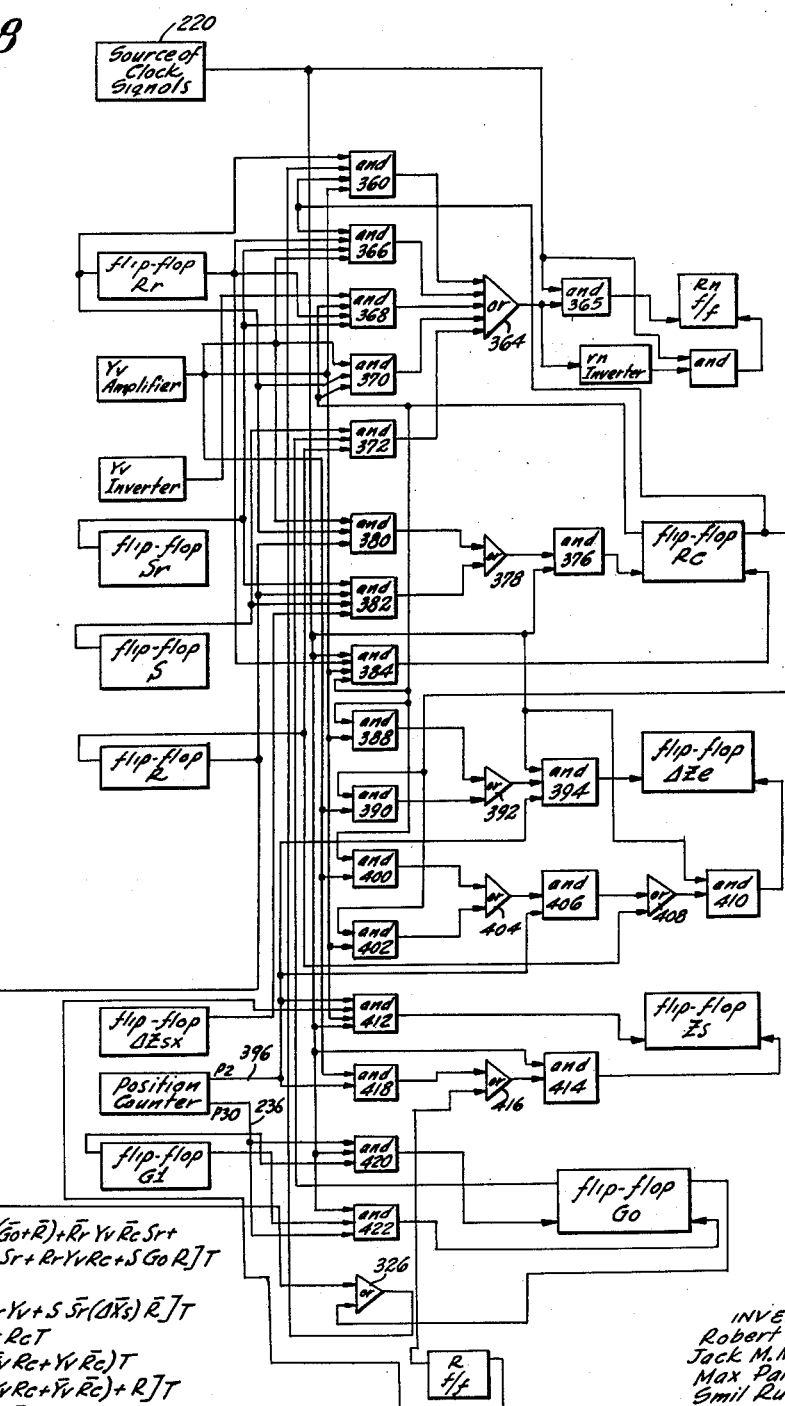

An "and" network 360 shown in FIGURE 8 has signals applied to it from the left output terminal of the $Rr$ read flip-flop, the $Yv$ inverter, the right output terminal of the $Rc$ flip-flop and an "or" network 362. The "or" network 362 passes the signals of high amplitude from the right output terminals of the $Go$ and R flip-flops. The signals from the "and" network 360 and from an "and" network 366 pass through an "or" network 364 to an input terminal of an "and" network 365, another input terminal of which is connected to the clock source 220 and the output terminal of which is connected to the left input terminal of the $Rn$ flip-flop. Connections are made to the "and" network 366 from the $Yv$ amplifier, the left output terminal of the $Sr$ flip-flop and the right output terminals of the $Rr$ and $Rc$ flip-flops.

Signals from "and" networks 368, 370 and 372 also pass through the "and" network 364 to the "and" network 365. The "and" network 368 is operatively controlled by signals from the $Yv$ inverter, the left output terminals of the $Rc$ and $Sr$ flip-flops and the right output terminal of the $Rr$ flip-flop. The "and" network 370 has signals applied to it from the $Yv$ amplifier and the left output terminals of the R$r$ and R$c$ flip-flops. Input terminals of the "and" network 372 are connected to the left output terminals of the S, R and G$o$ flip-flops.

Input signals are introduced to the left input terminal of the R$c$ flip-flop from an "and" network 376 having input terminals connected to the clock source 220 and to an "or" network 378. The "or" network 378 in turn passes signals from "and" networks 380 and 382. Connections are made to the "and" network 380 from the left output terminals of the Y$r$ and R$r$ flip-flops and the right output terminal of the R flip-flop. The "and" network 382 has input terminals connected to the left output terminal of the S flip-flop and the right output terminals of the R, S$r$ and ΔZ$sx$ flip-flops (also shown in FIGURE 7). Signals from an "and" network 384 are applied to the right input terminal of the R$c$ flip-flop upon the simultaneous introduction of signals of high amplitude from the clock source 220, the Y$v$ amplifier, left output terminal of the R$c$ flip-flop and the right output terminal of the R$r$ flip-flop.

"And" networks 388 and 390 control the introduction of signals to the left input terminal of the ΔZ$e$ flip-flop. The "and" network 388 receives the signals from the Y$v$ inverter and the left output terminal of the R$c$ flip-flop. The "and" network 390 has signals applied to it from the Y$v$ amplifier and the right output terminal of the R$c$ flip-flop. The signals from the "and" networks 388 and 390 pass through the "or" network 392 to an input terminal of an "and" network 394 having other input terminals connected to the clock source 220 and to a line 396 from the position counter 240. The signals passing through the "and" network 394 are introduced to the left input terminal of the ΔZ$e$ flip-flop.

"And" networks 400 and 402 are associated with each other. The "and" network 402 has input terminals connected to the Y$v$ amplifier and left output terminal of the R$c$ flip-flop, and the "and" network 402 has input terminals connected to the Y$v$ inverter and right output terminal of the R$c$ flip-flop. The signals from the "and" networks 400 and 402 pass through an "or" network 404 to an input terminal of an "and" network 406 having another input terminal connected to the line 396 from the counter 240. The signals from the "and" network 406 and from the left output terminal of the R flip-flop are in turn introduced through an "or" network 408 to the input terminal of an "and" network 410, another input terminal of which is connected to the clock source 220. The signals from the "and" network 410 in turn pass to the right input terminal of the ΔZ$e$ flip-flop.

Signals are introduced to input terminals of an "and" network 412 from the clock source 220, the line 396 and the right output terminals of the R$c$ and Y$v$ flip-flops. The signals from the "and" network 412 in turn pass to the left input terminal of the ΔZ$s$ flip-flop. The right input terminal of the ΔZ$s$ terminal has signals applied to it from an "and" network 414, the input terminals of which are connected to the clock source 220 and to an "or" network 416. The "or" network 416 receives the signals from an "and" network 418 and from the left output terminal of the R flip-flop. The operation of the "and" network 418 is controlled by the signals on the output line 396 of the position counter 240 and the signals from the Y$v$ amplifier.

The left input terminal of the G$o$ flip-flop receives the signals from the output terminal of an "and" network 420 having its input terminals connected to the clock source 220, the output line 236 of the counter 240 and the left output terminal of the G1 flip-flop. Signals are applied to the right input terminal of the G$o$ flip-flop from an "and" network 422, the operation of which is controlled by signals from the clock source 220, the output line 236 of the counter 240 and the right output terminal of the G1 flip-flop.

As will be described in detail subsequently, signals on the output lines 278 and 396 of the counter 240 respectively indicate positions one and two in each cycle of computation. Signals representing positions 1 and 2 in each cycle of computation may also be respectively obtained on a simplified basis from "and" networks 430 and 432 in a manner similar to that set forth in FIGURE 9. The "and" network 430 passes a signal upon the simultaneous introduction of signals of particular characteristics from the left output terminal of the S$r$ flip-flop and the right output terminal of the S flip-flop. The "and" network 432 is activated to pass a signal when signals of particular characteristics are simultaneously produced on the right output terminal of the S$r$ flip-flop and the left output terminal of the S$s$ flip-flop.

An "and" network 434 receives signals from the movable arm of an (I$x$) switch, the left output terminal of the F flip-flop and the right output terminal of the G$o$ flip-flop. The (I$x$) switch is closed during the fill operation to trigger the S flip-flop to the true state so that a binary indication of "1" can be recorded in the I delay line in the most significant of three successive digits.

The "and" network 434 is associated with "and" networks 436 and 438. Input terminals of the "and" network 436 are connected to the left output terminals of the G$o$, I$r$ and F flip-flops. Connections are made to the input terminals of the "and" network 438 from the left output terminals of the Y$r$ and G$o$ flip-flops and the right output terminals of the F and S flip-flops. The signals from the "and" networks 434, 436 and 438 pass through an "or" network 440 to an input terminal of an "and" network 441. The output terminal of the "and" network 441 is connected to the left input terminal of the S flip-flop.

"And" networks 442 and 444 are electrically coupled to pass signals through an "or" network 446 and an "and" network 447 to the right input terminal of the S flip-flop. The "and" network 442 has input signals applied to it from the left output terminals of the F and G$o$ flip-flops and the right output terminal of the I$r$ flip-flop. The "and" network 444 receives signals from the right output terminal of the F flip-flop and the output line 236 of the counter 240.

"And" networks 450 and 452 are included to control the introduction of signals to the left input terminal of the S$r$ flip-flop. The "and" network 450 becomes activated upon the simultaneous introduction of signals of particular characteristics from the movable arm of the (I$y$) switch, the left output terminal of the F flip-flop and the right output terminal of the G$o$ flip-flop. The (I$y$) switch is adapted to be closed when a binary value of "1" is to be inserted in the I delay line in the second least significant of three successive digits. The "and" network 452 becomes operative when signals of particular characteristics are simultaneously introduced to its input terminals from the left output terminals of the G$o$ and S flip-flops. The signals from the "and" networks 450 and 452 pass through an "or" network 454 to one input terminal of an "and" network 456 having another input terminal connected to the clock source 220. The signals from the "and" network 456 are introduced to the left input terminal of the S$r$ flip-flop.

The right input terminal of the S$r$ flip-flop has signals applied to it from an "and" network 460, the input terminals of which are connected to an "or" network 462, the clock source 220 and the right output terminal of the S flip-flop. Signals pass through the "or" network 462 from the right output terminal of the F flip-flop and the left output terminal of the G$o$ flip-flop.

The signals from the "or" network 462 pass to the input terminal of an "and" network 464 as well as to the input terminal of the "and" network 460. Other input terminals of the "and" network 464 are connected to the clock source 220 and to the right output terminal of the S$r$ flip-flop. The signals from the "and" network 464 are introduced to the right input terminal of the S$s$ flip-flop.

The left input terminal of the S$s$ flip-flop has signals applied to it from an "and" network 466, the input terminals of which are connected to the clock source 220 and to an "or" network 468. Signals pass through the "or" network 468 from "and" networks 470, 472 and 474. The "and" network 470 receives signals at its input terminals from the movable arm of an (I$z$) switch, the left output terminal of the F flip-flop and the right output terminal of the G$o$ flip-flop. The (I$z$) switch corresponds to the (I$x$) and (I$y$) switches in controlling the insertion of a binary "1" into the I delay line in the least significant of three successive binary digits. The "and" network 472 has signals applied to it from the left output terminals of the F, G$o$ and S$r$ flip-flops. Input terminals of the "and" network 474 are connected to the right output terminals of the F and R flip-flops and to the left output terminals of the S and G$o$ flip-flops.

Signals pass through an "or" network 476 from the right output terminals of the F and G$o$ flip-flops. The signals from the "or" network 476 and from the left output terminal of the I$r$ flip-flop are introduced to input terminals of an "and" network 478, the output terminal of which is connected to an input terminal of an "or" network 480. The "or" network 480 also receives signals from an "and" network 482 having input terminals connected to the left output terminals of the F, S$s$ and G$o$ flip-flops. The signals passing through the "or" network 480 are in turn introduced to an "and" network 484 having another input terminal connected to the clock source 220. The output signals from the "or" network 484 trigger the I$n$ flip-flop to the true state.

The right input terminal of the I$n$ flip-flop has signals applied to it from an "and" network 486, the input terminals of which are connected to the clock source 220 and to an "or" network 488. Signals pass through the "or" network 488 from "and" networks 490 and 492. The operation of the "and" network 490 is controlled by signals from the "or" network 476 and from the right output terminal of the I$r$ flip-flop. The "and" network 492 becomes activated upon the simultaneous introduction of signals from the left output terminals of the F and G$o$ flip-flops and the right output terminal of the S$s$ flip-flop.

The G$o$ flip-flop shown in FIGURE 8 becomes triggered true at substantially the same time as the G2 flip-flop shown in FIGURE 5 and described above. In this way, the G$o$ flip-flop becomes triggered true at position 30 in the cycle of computation after the triggering of the G1 flip-flop to the true state. This is indicated by the logical equation:

$$go = P30G1T \quad (13)$$

The G$o$ flip-flop remains true until position 30 in the cycle of computation after the G1 flip-flop has become false. This is indicated by the logical relationship set forth in the following equation:

$$ogo = P30\overline{G}1T \quad (14)$$

As previously described in connection with the somewhat schematic block diagram shown in FIGURE 1, the value of the dependent quantity Y does not appear in the Y delay line in each cycle of computation until after the first appearance of a binary "1" in one of the positions. This first appearance of a binary "1" in the Y delay line constitutes a "start" pulse for indicating that the value of Y will appear in the subsequent positions. At the time that the "start" pulse appears in the Y delay line in each cycle of computation, the S flip-flop is in its false state. Because of this, a signal passes through the stages 438, 440 and 441 in FIGURE 9 to trigger the S flip-flop to the true state. The signal is able to pass through these stages during operations other than "fill" because of the introduction of a signal from the right output terminal of the F flip-flop to the "and" network 438. Since the signals in the left output terminal of the G$o$ flip-flop are also introduced to the "and" network 438, the S flip-flop can be triggered true during operations of compute and reset in accordance with logical Equation 2 set forth above for the G1 flip-flop. The triggering of the S flip-flop to the true state by the passage of signals through the stages 438, 440 and 441 can be represented logically as:

$$s = Yr\overline{S}FGoT \quad (15)$$

The S flip-flop is triggered true in each cycle of computation upon the occurrence of the "start" pulse in the Y delay line. The S flip-flop is then allowed to remain true during the remainder of the cycle of computation and is triggered false at the last position in the cycle for any type of operation other than "fill." This occurs as the result of the passage of signals through the "and" networks 444, 446 and 447 in FIGURE 9. Signals pass through these stages in accordance with the logical equation:

$$os = P30\overline{F}T \quad (16)$$

The S$r$ flip-flop becomes triggered true in the digital position immediately following the triggering of the S flip-flop to the true state. This results from the passage of signals through the stages 452, 454 and 456 in FIGURE 9. A triggering signal passes through these stages in accordance with the logical equation:

$$sr = SGoT \quad (17)$$

The S flip-flop remains true until the first position in the next cycle of computation. The S$r$ flip-flop becomes triggered false in the position 1 of the next cycle of computation as a result of the passage of signals through the stages 462 and 460, the operation of which can be logically expressed as:

$$osr = \overline{S}(Go + \overline{F})T \quad (18)$$

The S$s$ flip-flop also becomes triggered true in each cycle of computation in the digital position immediately following the triggering of the S flip-flop to the true state. This can occur only during periods of computation since the signals from the right output terminals of F and R flip-flops are introduced to the "and" network 482. The triggering of the S$s$ flip-flop to the true state in this manner can be logically represented as:

$$ss = SGo\overline{F}\overline{R}T \quad (19)$$

The S$s$ flip-flop then remains true until position 2 in the next cycle of computation in accordance with the logical equation:

$$oss = \overline{S}r(Go + \overline{F})T \quad (20)$$

The reason for this is that the S$s$ flip-flop becomes triggered to the false state in the position immediately following the triggering of the S$r$ flip-flop to the false state.

As will be seen from the subsequent discussion, the start position in each cycle of computation can be represented as Y$r\overline{S}$. At this position in periods of computation, a signal passes through the "and" network 270 upon the occurrence of a ΔY increment in that cycle of computation. The occurrence of such a ΔY increment is indicated by a signal of high amplitude on the left output terminal of the ΔZ$ey$ flip-flop in FIGURE 6. The signal passing through the "and" network 270 triggers the Y$d$ flip-flop to the true state in accordance with the following logical equation:

$$yd = Yr\overline{S}Go\overline{R}\Delta YeT \quad (21)$$

where

ΔYe = a signal of low amplitude on the left output terminal of the ΔZ$ey$ flip-flop in FIGURE 6.

The Y$d$ flip-flop not only indicates the ΔY increment but also indicates the polarity of this increment. This may be seen from the fact that a positive increment can be represented in binary form as 0001, where the least significant digit is at the right and where only four positions are illustrated by way of example. On the other hand, a negative ΔY increment can be represented by a binary value of "1" for every digital position such that the representation will be 1111, where only four digital positions are illustrated by way of example.

In view of the discussion in the previous paragraph, the $Yd$ flip-flop is triggered to the false state in the digital position immediately following its triggering to a true state when the polarity of the $\Delta Y$ increment is positive. This is obtained by the passage of a signal through the stages 276, 274 and 272 in FIGURE 6. Signals pass through these stages only when a relatively low voltage is produced on the left input terminal of the $\Delta Zsy$ flip-flop in FIGURE 6 to indicate that the $\Delta Y$ increment has a positive polarity. Furthermore, a signal is able to pass through the "and" network 276 only after the S flip-flop has been triggered to the true state. The triggering of the $Yd$ flip-flop to the false state by the passage of signals through the stages 276, 274 and 272 may be logically represented as:

$$oyd = S\Delta YsT \qquad (22)$$

In this way, the $Yd$ flip-flop remains true for each digital position in a word after the start position when the value of the $\Delta Y$ increment is negative. The $Yd$ flip-flop initially becomes triggered true and immediately thereafter becomes triggered false when the $\Delta Y$ increment is positive. When the $Yd$ flip-flop is true at the end of a word for a negative $\Delta X$ increment, it becomes reset to the false state at position 1 of the next cycle of computation in accordance with the logical equation:

$$oyd = P1T \qquad (23)$$

The signal indications representing $\Delta Y$ in each cycle of computation are combined with the signal indications representing the value of the dependent quantity Y from the Y delay line to obtain a new value of Y in each cycle of computation. The new value of Y is obtained by combining the value of $\Delta Y$ and Y for each digital position with the carry resulting from the combination of Y and $\Delta Y$ in the previous digital position. A binary value of "1" is obtained for the new value of Y in a position when only one of the quantities $\Delta Y$, Y and the carry Yc from the previous position has a binary value of "1" or when all three of these quantities have binary values of "1." In this way, the $Yn$ flip-flop in FIGURE 6 produces signals representing a binary "1" in the new value of Y for a position when signals pass through one of the "and" networks 280, 284, 286 and 288. The passage of signals through these stages can be represented as:

$$yn = [Yr\overline{Y}dYc(\overline{G}o + \overline{R}) + \overline{Y}rYd\overline{Y}cS \qquad (24)$$
$$+ \overline{Y}r\overline{Y}dYcS + YrYdYc]T$$

In Equation 24, Yr represents the value of Y obtained from the Y delay line; Yd represents the $\Delta Y$ increment and Yc represents the carry from the previous position. As will be seen, the term S has been included in certain "and" relationships so that a binary value of "0" for Yr cannot be inverted to a binary value of "1" during such times as the recirculation of information in the Y register without performing any computations on such information. The "or" representation $(\overline{G}o + \overline{R})$ has also been included to modify the "and" representation $Yr\overline{Y}d\overline{Y}c$ so that information can be duplicated in the Yr delay line in successive cycles of computation during periods of information recirculation, such as when no computation is taking place or no resetting operation is occurring.

As will be seen from the above discussion, signals of low amplitude pass through the "or" network 286 in those digital positions in which the $Yn$ flip-flop is to be triggered to the true state. In the other digital positions, the "or" network produces a signal of high amplitude. These signals are inverted by the $yn$ inverter and are applied as signals of low amplitude to the "and" network 289. The "and" network 289 synchronizes these signals with the clock signals and introduces the signals to the $Yn$ flip-flop to trigger the flip-flop to the false state of operation. The $Yn$ flip-flop becomes triggered to the false state in accordance with the following logical equation:

$$oyn = \overline{y}nT \qquad (24a)$$

where $\overline{y}n =$ a signal of high amplitude from the $yn$ inverter.

The Yc carry is initially triggered true when both the $\Delta Y$ increment and the dependent quantity Y have binary indications of "1" for a position. The Yc flip-flop is triggered true a this time since the addition of a binary "1" for $\Delta Y$ and a binary "1" for Y causes a decimal value of "2" to be obtained for the position. This decimal value of "2" is equivalent in binary form to a binary value of "0" and a binary carry of "1" to the next position. The Yc flip-flop is triggered true by the passage of a signal through the "and" network 292 in accordance with the logical equation:

$$yc = Yr Yd\overline{R}T \qquad (25)$$

When the Yc flip-flop has been triggered to the true state, it remains in the true state as long as either $\Delta Y$ or Y has a binary value of "1" or both $\Delta Y$ and Y have binary values of "1." This may be seen from the fact that the addition of a binary carry of "1" and binary value of "1" for either $\Delta Y$ or Y causes a value of "2" to be obtained, this being equivalent to a value of "0" and a binary carry of "1" to the next position. Upon the simultaneous occurrence of binary values of "0" for both Y and $\Delta Y$, the Yc flip-flop is triggered to the false state by the passage of a signal through the "and" network 294. A signal passes through the "and" network 294 in accordance with the logical equation:

$$oyc = \overline{Y}r\overline{Y}dT \qquad (26)$$

The signals of high amplitude on the left output terminal of the $Yn$ flip-flop correspond to binary values of "1" for the different digital positions in the new value of $Yn$. The signals produced by the $yn$ inverter correspond to binary values of "0" in the different digital positions for the new value of Y. These signals are combined with signals representing $\frac{1}{2}\Delta Y$ to obtain the correction discussed previously in connection with FIGURES 1, 2 and 3. This correction may be considered as an anticipatory correction since it is intended to project the true value of $Y\Delta X$ in the next cycle of computation from the values of Y and $\Delta Y$ in each cycle of computation. The anticipatory value of $Y\Delta X$ is determined from a projected value of Y by initially extending an oblique line between the old value of Y at the beginning of each $\Delta X$ increment and the new value of Y at the end of the $\Delta X$ increment to obtain an intermediate value of Y. The intermediate value of Y is then added to the $\Delta Y$ increment to obtain the projected value of Y. The projected value of Y is also obtained by adding $\frac{1}{2}\Delta Y$ to the value of Y at the end of each cycle of computation.

The combination of the new value of Y and $\frac{1}{2}\Delta Y$ to obtain the anticipatory value of $Y\Delta X$ is provided by certain circuits shown in FIGURE 7. These circuits include the "and" network 306 in FIGURE 7. As will be seen from the subsequent discussion, the "and" network 306 passes the signals representing $Yn$ upon the occurrence of a $\Delta X$ increment, as represented by a relatively low voltage on the left output terminal of the $\Delta Zex$ flip-flop. The signals representing $Yn$ pass through the "and" network 306 only in the digital positions after the occurrence of the start pulse because of the introduction of a signal to the "and" network from the left output terminal of the $Sr$ flip-flop. The logical equation controlling the introduction of signals to the $Yt$ amplifier may be expressed as:

$$yt = YnSr(\Delta Xe) \qquad (27)$$

The $Yt$ inverter produces signals representing a binary value of "0" whenever one or more of the terms set forth in Equation 27 is false. At such times, a signal passes through the "or" network 308 in accordance with logical equation:

$$\overline{yt} = \overline{Yn} + \overline{Sr} + \overline{\Delta Xe} \qquad (28)$$

Because of the operation of the Yn flip-flop, the signals representing the new value of Y are shifted one position in the direction of increased digital significance relative to the Yd signals representing ΔY. This shift causes the signals representing ½ΔY to be presented at the same time that the signals representing Y are presented. The combination of Y and ½ΔY is obtained by the passage of signals through the stages 312, 314, 316, 318 and 310 in FIGURE 7. This combination is similar to that previously set forth in Equation 24 for ΔY and the old value of Y. The combination of ½ΔY and the new value of Y to obtain an anticipatory value may be expressed as:

$$yu = (YtYdYh + Yt\overline{Yd}\overline{Yh} + \overline{Yt}Yd\overline{Yh} + \overline{Yt}\overline{Yd}Yh)T \qquad (29)$$

In like manner, the Yu flip-flop becomes triggered false in accordance with the following logical equation:

$$oyu = \overline{y}uT \qquad (29a)$$

As will be seen, Equation 29a is derived in a manner similar to that described above for Equation 24a.

The values of ½ΔY and the new value of Y are actually combined in each digital position with the value of the carry produced in the previous digital position. The carry is obtained in a manner similar to that described above and set forth in Equations 25 and 26. Thus a signal representing a binary carry of "1" is produced by the Yh flip-flop when both Yt and Yd simultaneously have a binary value of "1," as set forth in the following logical equation:

$$yh = YtYdT \qquad (30)$$

The binary carry of "1" then continues to be produced until both Yt and Yd are simultaneously false. At such time, a binary carry of "0" is produced in accordance with the following logical equation:

$$oyh = \overline{Yt}\overline{Yd}T \qquad (31)$$

The signals representing Yu=Yt+½ΔY are converted to a differential combination by taking into account the polarity of the ΔX increment. For example, when the ΔX increment is positive, the value of Yu=Yt+½ΔY is passed without change and is subsequently combined with the value stored in the R delay line. However, when the value of ΔX is negative, the value of Yu=Yt+½ΔY is complemented, and the complemented value is combined with the value stored in the R delay line to obtain a new value of R. The value of Yu is converted into a value of Yv when the polarity of the ΔX increment is taken into account.

The "and" network 326 passes the signals representing Yv when a relatively high voltage is produced on the left output terminal of the ΔZsx flip-flop to indicate a positive ΔX pulse. These signals pass through the "or" network 330 and the "and" network 332 during the times that the Ss flip-flop is true. The Ss flip-flop is used to provide a control because of the shift of two positions produced by the operation of the Yn and Yu flip-flops relative to the information read by the Yr flip-flop. The activation of the Yv amplifier by the passage of signals through the stages 326, 330 and 332 in FIGURE 7 is obtained in accordance with the following logical equation:

$$yv = (\Delta Zsx)YuSsT \qquad (32)$$

The "and" network 328 passes signals representing Yu when a relatively high voltage is produced on the right output terminal of the ΔZsx flip-flop to represent a negative ΔX increment. Since the signals representing $\overline{Yu}$ activate the Yv amplifier, signals having a binary value of "0" in effect become inverted to binary signals having a value of "1." This inversion occurs in accordance with the following logical equation:

$$yv = (\Delta \overline{Z}xs)\overline{Yu}SsT \qquad (33)$$

In like manner, the signals representing $\overline{Yu}$ activate the Yv inverter for a positive ΔX increment. Furthermore, the signals representing Yu become inverted by the activation of the Yv inverter when the ΔX increment is negative. The Yv inverter also becomes activated during the times that the Ss flip-flop is in the false state. This insures that only the differential combination of (YuΔXe+½ΔY) can be instrumental in activating the Yv amplifier to represent a binary value of "1" at the different digital positions. The Yv inverter becomes activated in accordance with the logical equation:

$$\overline{yv} = [(\Delta Xs)\overline{Yu} + (\Delta \overline{Xs})Yu + \overline{Ss}]T \qquad (34)$$

As will be seen from the above discussion, the new value of Y is able to pass through the Yt amplifier and inverter in each cycle of computation only upon the actual occurrence of a ΔX increment in that cycle of computation. This may be seen from Equations 27 and 28 above. However, the ½ΔY increment is introduced to the Yu adder whether or not there is a ΔX increment in a cycle of computation. This may be seen from the logic set forth in Equations 29 and 29a. In addition, the Yv amplifier and inverter become activated only in accordance with the operation of the flip-flop indicating the polarity of the ΔX increment, whether or not there is actually a ΔX increment in a cycle of computation. This may be seen from the logic set forth above in Equations 32, 33 and 34.

In view of the discussion set forth in the previous paragraph, the value of ΔR in a cycle of computation is equal to Y+½ΔY when there is a ΔX increment in a cycle of computation. However, a value of ½ΔY is still obtained as a value of ΔR and is added to R in a cycle of computation in which no ΔX increment is obtained. The value of ΔR may thus be expressed as:

$$\Delta R = [Yi|\Delta Xi| + \frac{1}{2}\Delta Yi]\, \text{sign}\, (\Delta Xi)$$

where the subscript i indicates the ith cycle of computation. The value of the ΔR increment produced by the Yv amplifier and inverter and the value of the output quantity R stored in the R delay line are combined by the stages 360, 366, 368, 370, 372 and 364 in FIGURE 8. This combination occurs in a manner similar to that set forth above in Equation 24 for the value of ΔY and the value stored in the Y delay line for the dependent quantity Y. The logic controlling the combination of ΔR and R to obtain binary values of "1" for the different digital positions may be expressed as:

$$rn = [Rr\overline{Yv}\overline{Rc}(\overline{Go} + \overline{R}) + \overline{Rr}Yv\overline{Rc}Sr$$
$$+ \overline{Rr}\overline{Yv}RcSr + Rr\overline{Yv}Rc]T \qquad (35)$$

In like manner, binary values of "0" are obtained for the different digital positions in accordance with the following logical equation:

$$orn = \overline{rn}T \qquad (35a)$$

Equation 35a is obtained from Equation 35 in a manner similar to the relationship described above for Equations 24 and 24a.

A carry indication is produced in each digital position in the combination of ΔR and R for combination with the values of ΔR and R in the next position. This carry indication is produced in the manner similar to that discussed above and set forth in Equations 25 and 26 for Yc. A binary carry of "1" is initially produced in accordance with the equation set forth below in Equation 36 and is maintained in successive positions until the occurrence of the logic set forth in Equation 37. Upon the occurrence of the logic set forth in Equation 37, a binary carry of "0" is produced. This binary carry of "0" continues until the next simultaneous occurrence of the values set forth in Equation 36 for Rr and Yv. Equations 36 and 37 are set forth below:

$$rc = RrYv\bar{R}T \tag{36}$$

$$orc = \bar{R}r\bar{Y}vRcT \tag{37}$$

When the value of $Yu$ is inverted because of a negative $\Delta X$ increment, a binary value of "1" must be added in the least significant digit in order for the new value to be a complemented value of $Yu$. For example, when a number having only three digital positions is considered, a decimal value of "3" may be represented in binary form as 011, where the least significant digit is at the right. Inversion of this digital indication gives 100, which is equal to a decimal value of "4." As will be seen, a decimal value of "4" is not an accurate complementation since the complementary value of "3" should be "5" on an octal basis. As will be seen, a value of "1" must be added to the least significant digit to obtain the correct complemented value. In the example above, the true complementary value would then become 101, where the least significant digit is at the right.

Complementation for a negative value of $\Delta X$ is obtained in the digital differential analyzer constituting this invention by initially triggering the $Rc$ carry to a true state. This occurs in the position of least significance, which may be defined as the position in which the $S$ flip-flop has become true while the $Sr$ flip-flop is still false. The carry is obtained for any operation other than a reset operation. By setting the $Rc$ carry to the true state in the position of least significance, an additional binary value of "1" is added into the combination of $\Delta R$ and $R$ so that the new value of $R$ will reflect the true complemented value of $\Delta R$. The $Rc$ carry is initially set to the true state for a negative $\Delta X$ increment in accordance with the following logical equation:

$$rc = S\bar{S}r(\Delta \bar{X}s)\bar{R}T \tag{37a}$$

As has been described above, delays of two digital positions occur in obtaining the combination of $R$ and $\Delta R$. A delay of one digital position results from the operation of the $Yn$ flip-flop, and a delay of a second digital position results from the operation of the $Yu$ flip-flop. Because of this, an overflow in the value of $R$ stored in the $R$ delay line is not obtained until position 2 in the next cycle of computation. The sign of each such overflow is dependent upon the value of the $\Delta R$ increment. A positive $\Delta R$ increment in a cycle of computation is represented by a binary value of "0" for $Yv$ at position 2 for the next cycle of computation. This increment is able to be produced in each cycle of computation except when a resetting operation is occurring. The production of a positive $\Delta Z$ increment may be represented as:

$$\Delta zs = P2\bar{Y}v\bar{R}T \tag{38}$$

In like manner, the $\Delta Zs$ flip-flop is triggered to the false state upon the occurrence of a negative $\Delta R$ increment, as represented by a binary value of "1" for $Yv$ at position 2 in the next cycle of computation. The $\Delta Zs$ flip-flop is also triggered to the false state in a resetting operation since it is desirable to maintain the $\Delta Zs$ flip-flop false at such a time. The $\Delta Zs$ flip-flop should be maintained in a resetting operation to prevent any possibility of errors from being transferred from the $\Delta Zs$ flip-flop to the stages which receive the polarity of $\Delta X$ or $\Delta Y$ increments from the $\Delta Zs$ flip-flop in an actual period of computation. The $\Delta Zs$ flip-flop is triggered false in accordance with the logical equation:

$$o\Delta zs = (P2Yv + R)T \tag{39}$$

The occurrence of an actual overflow in the value of $R$ stored in the $R$ delay line is dependent in each cycle of computation upon the binary values of $Yv$ and the $Rc$ carry at position 2 of the next cycle of computation. For example, a binary carry of "1" for $Rc$ at position 2 indicates that an overflow in the value of $R$ has actually occurred when the $\Delta R$ increment is positive. A positive value of $\Delta R$ is indicated by a binary value of "0" for $Yv$ at position 2. This causes the $\Delta Ze$ flip-flop to be triggered to the true state in accordance with the logical equation:

$$\Delta ze = P2\bar{Y}vRcT \tag{40}$$

The value of $R$ stored in the $R$ delay line may be considered as varying between the value of "0" and "−1." Because of this, a negative overflow in the value of $R$ occurs when no carry is produced for $Rc$ at position 2 in a cycle of computation in which the $\Delta R$ increment is negative. This overflow may be represented as:

$$\Delta ze = P2Yv\bar{R}cT \tag{41}$$

As will be seen from the above discussion, no overflow should be produced when a binary carry of "1" for $Rc$ is produced at position 2 in a cycle of computation in which the value of $\Delta R$ is negative. Similarly, the combination of a positive value of $\Delta R$ and a lack of carry for $Rc$ at position 2 prevents an overflow from occurring in the value of $R$ stored in the $R$ delay line. Furthermore, the $\Delta Ze$ flip-flop is maintained false during a setting operation in a manner similar to that described above for the $\Delta Zs$ flip-flop so as to prevent any errors from occurring. Because of this, the triggering of the $\Delta Ze$ flip-flop to the false state may be represented as:

$$o\Delta ze = [P2(YvRc + \bar{Y}v\bar{R}c) + R]T \tag{42}$$

As described previously in connection with FIGURE 1, overflows may often be obtained in the value of $R$ but an overflow should normally not be obtained in the value of the dependent quantity $Y$. The reason is that any subsequent computations do not accurately reflect the value of $Y$. Because of this, such subsequent computations cannot give accurate indications as to the incremental area under the $Y$ curve for successive increments of $\Delta X$. The overflows in the value of $Y$ are determined by the operation of certain stages shown in FIGURES 6 and 7. The stages shown in FIGURE 6 operate to determine whether any carry is obtained from the addition of $Y$ and $\Delta Y$ in the position of greatest digital significance. An overflow occurs in the value of $Y$ when a carry is obtained at position 30 in the addition of positive values for $Y$ and $\Delta Y$ in the most significant digit. This can be represented as:

$$of = P30\bar{Y}r\bar{Y}dYcT \tag{43}$$

Similarly, an overflow occurs when no carry is obtained in the position of greatest digital significance as a result of the addition of negative values for $Y$ and $\Delta Y$. This overflow indication is produced in accordance with the following logical equation:

$$of = P30Yr Y d\bar{Y}cT \tag{44}$$

In order to make certain that no overflow occurs in the value of the dependent quantity $Y$ in each cycle of computation, a check is made as to the combination of the new value $Y$ and $\frac{1}{2}\Delta Y$ to obtain an anticipatory value. This check is made for each cycle of computation at position 1 for the next cycle of computation because of the delay of one digital position provided by the $Yu$ flip-flop in the value of $Yu$. The check as to the combination of $Y$ and $\frac{1}{2}\Delta Y$ is similar to that set forth in Equations 43 and 44 and may be expressed as:

$$of = P1(\bar{Y}t\bar{Y}dYn + Yt Y d\bar{Y}h)T \tag{45}$$

As has been described previously, the $Ao$ flip-flop is triggered true upon the occurrence of an overflow in the dependent quantity $Y$ for one of the integrators. The triggering of the $Ao$ flip-flop to the true state in turn causes the $G1$ flip-flop to be triggered to the false state so as to prevent any computations from subsequently proceeding. An inability on the part of the digital differential analyzer to make computations continues until the depression of the $Or$ switch or the ⓡ switch. At such time the $Of$ flip-flop is triggered to the false state in accordance with the logical equation:

$$oof=[(\text{Overflow Reset})+R]T \quad (46)$$

This in turn causes the Ao flip-flop to be triggered to the false state so that the G1 flip-flop can subsequently become automatically triggered to the true state.

As previously described in connection with FIGURE 1, information representing the initial value of Y is inserted into the I delay line in each integrator and is subsequently transferred to the Y delay line. The information is inserted into the I delay line on an octal basis corresponding to three successive digits. The information relating to these three successive digits is first inserted into the S, Sr and Ss flip-flops. The insertion is made during the time that the F flip-flop is true but while the Go flip-flop is still false.

An indication of a binary value of "1" is inserted into the S flip-flop by depressing the $(I_x)$ switch shown in FIGURE 9. Similarly, indications representing binary values of "1" are inserted into the Sr and Ss flip-flops by respectively closing the $(I_y)$ and $(I_z)$ switches shown in FIGURE 9. In this way, the Ss, Sr and S flip-flops retain information relating to three successive digits of progressively increasing significance. The S, Sr and Ss flip-flops become triggered to the true state in accordance with the following logical equations:

$$s=(I_x)F\overline{G}oT \quad (47)$$
$$sr=(I_y)F\overline{G}oT \quad (48)$$
$$ss=(I_z)F\overline{G}oT \quad (49)$$

After the information relating to the three successive digits has been inserted into the S, Sr and Ss flip-flops, the information relating to these digits is transferred into the I delay line during the filling operation. This insertion is obtained by the transfer of information from the Ss flip-flop during the time that the Go flip-flop is true during a filling operation as represented by the true state of the F flip-flop. In this way, a binary indication of "1" passes through the stages 482, 480 and 484 in FIGURE 9 to trigger the In flip-flop to the true state. The In flip-flop becomes triggered to the true state in this manner until the Ss flip-flop becomes triggered false to indicate a binary value of "0." The In flip-flop becomes triggered true in accordance with the logical equation:

$$in=SsFGoT \quad (50)$$

The In flip-flop becomes triggered false to insert a value of "0" in the I delay line when the Ss flip-flop is false. This is represented by the logical equation:

$$oin=\overline{S}sFGoT \quad (51)$$

During the time that the information in the Ss flip-flop is being inserted into the I delay line, the information in the Sr flip-flop is stepped into the Ss flip-flop and the information in the S flip-flop is stepped into the Sr flip-flop. The information in the Sr flip-flop is stepped into the Ss flip-flop in accordance with the following logical equations:

$$ss=SrFGoT \quad (52)$$
$$oss=\overline{S}rGoT \quad (53)$$

In like manner the Sr flip-flop simultaneously has information stepped into it from the S flip-flop in accordance with the logical equations:

$$sr=SGoT \quad (54)$$
$$osr=\overline{S}GoT \quad (55)$$

In view of the above discussion, the binary information originally set into the Sr flip-flop in accordance with Equation 48 becomes transferred in the second stepping operation from the Ss flip-flop to the In flip-flop for insertion into the I delay line. In the next clock time, the information originally inserted into the S flip-flop becomes transferred from the Ss flip-flop to the In flip-flop for insertion into the I delay line.

The information in the Ir register circulates directly from the Ir read flip-flop to the In flip-flop during the times when a fill operation is not being performed. The information in the I register should also circulate directly from the Ir flip-flop to the In flip-flop during the times that information is being transferred from the $(I_x)$, $(I_y)$ and $(I_z)$ switches to the S, Sr and Ss flip-flops in accordance with the logic expressed in Equations 47, 48 and 49. This is accomplished by including stages constructed in accordance with the following logical equations:

$$in=Ir(\overline{F}+\overline{G}o)T \quad (56)$$
$$oin=\overline{I}r(\overline{F}+\overline{G}o)T \quad (57)$$

The information representing the initial condition in the I delay line is transferred into the Yn flip-flop upon the depression of the reset switch. This causes the information in the I delay line to become available for use as the initial value of the dependent quantity Y. This transfer occurs in accordance with the following logical equation:

$$yn=IrGoRT \quad (58)$$

As previously described in connection with FIGURE 1, a value of R corresponding approximately to one-half the capacity of the R delay line is initially inserted into the R delay line. This insertion is made to minimize any errors resulting from the remainder in the R delay line at the end of the computation for solving a mathematical problem. This insertion of one-half of the capacity of the R register is made by recording a value of one in each of the digital positions in the R register after the start position except for the position of greatest digital significance. The insertion is made in accordance with the following logical equation:

$$rn=SGoRT \quad (59)$$

*Schematic Diagram of Multiplier*

FIGURE 10 illustrates a schematic diagram of a multiplier which is constructed in accordance with the concepts of this invention to obtain the product of two quantities X and Y. FIGURE 11 illustrates how the stages shown in FIGURE 10 operate to obtain the product of two quantities X and Y in each cycle of computation. As shown in FIGURE 11, the product of the two quantities X and Y at the beginning of each cycle of computation is represented by an unshaded area 500 which is defined by the X and Y axes and by shaded portions 501, 502 and 504 at the periphery of the area 500. The shaded portions 501, 502 and 504 represent the increment in the value of the product XY which is obtained in each cycle of computation.

As will be seen from FIGURE 11, the shaded area 501 can be represented as $X\Delta Y$ where $\Delta Y$ represents the increment in the dependent quantity Y in each cycle of computation and X represents the value of the independent quantity at the beginning of the cycle of computation. Similarly, the shaded area 504 represents the product of the dependent quantity Y at the beginning of each cycle of computation and the increment $\Delta X$ in the independent quantity for that cycle of computation. It will be appreciated from the subsequent discussion that the term "independent quantity" for X and "dependent quantity" for Y are not strictly true in a multiplier since both X and Y serve as independent quantities and dependent quantities. However, the terminology of "independent quantity" for X and "dependent quantity" for Y is maintained to make the terminology consistent with other portions of the application.

If both the values of X and Y at the beginning of cycles of computation were to be used in determining the product XY at the end of the cycle of computation, the value obtained would be less than the proper value by an amount corresponding to the area 502. Similarly, if both the value of X and Y at the end of a computation were to be used in determining the product XY at the end of the cycle of computation, the value obtained would be greater than the proper value by an amount corresponding to the area 502.

In order to obtain the proper value for the product of XY at the end of each cycle of computation, the value of X at the beginning of the cycle and the value of Y at the end of the cycle are used. In this way, the XΔY increment represents the area 501 and the YΔX increment represents the combined areas 502 and 504. The value of the area 501 is combined with the composite value of the areas 502 and 504 to produce a resultant increment. This resultant increment is then added in each cycle of computation to the area 500 stored in the R delay line at the beginning of the cycle of computation to obtain a new value for the product XY. This new value is inserted into the R delay line to serve as the equivalent of the area 500 in the next cycle of computation.

As will be seen from FIGURE 10, the value stored in the Y delay line is read by the Yr flip-flop and is introduced to a gate 506 for combination with the signals representing the occurrence and sign of the ΔY increment in that cycle of computation. The gate 506 is included in an adder indicated in broken lines at 508 for controlling the triggering of the Yc carry flip-flop. The signals representing ΔY and Y for each digital position are combined in a gate 510 with the signals representing the carry Yc from the previous position to obtain a new value in each for the dependent quantity Y. This new value of Y is obtained by the Yn flip-flop and is inserted by that flip-flop into the Y delay line for use in the next cycle of computation.

The new value for the dependent quantity Y is also introduced from the Yn flip-flop to a gate 512 for combination with the signals representing the occurrence of a ΔX increment in each cycle of computation and representing the sign of each such increment. The signals representing Y and ΔX are combined by the gate 512 to obtain signals representing the combined areas 502 and 504 in FIGURE 11. These signals are passed by the gate 512 to an adder indicated in broken lines at 514 in FIGURE 10. The adder 514 combines the signals from the gate 512 with the signals representing XΔY to obtain signals representing the combined value of the areas 501, 502 and 504 in FIGURE 11. The signals representing the combined value of the areas 501, 502 and 504 in FIGURE 11 are indicated by a Yv flip-flop.

The signals representing the XΔY increment are obtained by the combination in a gate 518 of ΔY and the value of X at the beginning of each cycle of computation. The use of this value X may be seen from the fact that the gate 518 receives the signals read by the Xr flip-flop rather than the signals introduced to the Xn flip-flop. The signals passed by the gate 518 are introduced to an Xy flip-flop, which indicates the value of XΔY in successive digital positions. The signals from the Xy flip-flop are then introduced to the adder 514, which produces signals for introduction of the Yv flip-flop to represent the cumulative values of the areas 501, 502 and 504 in FIGURE 11.

The signals produced by the Yv flip-flop in each cycle of computation to represent the composite value of the areas 501, 502 and 504 are combined in an adder 520 with the signals stored in the R delay line to represent the area 500. The adder 520 includes a gate 522 which produces signals to control the triggering of the Rc carry flip-flop in accordance with the occurrence of the signals representing the area 500 and the signals representing the composite areas 501, 502 and 504. The gate 524 is also included to combine the signals representing the area 500, the carry signals from the Rc flip-flop and the signals representing the composite areas 501, 502 and 504 to produce signals representing a new value of the product XY.

The signals representing the new value of the product XY in each cycle of computation may represent a value greater than the capacity of the R delay line. In such an event, an overflow occurs in the value of R. As has been described in detail previously, this overflow is dependent upon the carry produced by the Rc flip-flop and upon the polarity of the increment represented by the signals from the Yv flip-flop. Upon the occurrence of particular combinations of signals from the Rc and Yv flip-flops, a signal passes through a gate 526 and triggers a ΔZe flip-flop to indicate the actual occurrence of an overflow in the value of R. The sign of such an overflow is indicated by a signal simultaneously passing through a gate 528 to trigger a ΔZs flip-flop. The sign of each such overflow is directly related to the signals produced by the Yv flip-flop to represent the increment in the product.

Stages are also included for obtaining a new value of the independent quantity X in each cycle of computation. These stages include an adder which is indicated in broken lines at 530 and which is operative to combine the signals representing X and ΔX in each cycle of computation. The adder 530 includes a gate 532 for controlling the operation of an Xc carry flip-flop. A gate 534 is constructed to pass signals in accordance with the particular combinations of the signals representing X and ΔX for each digital position and the signals representing the carry from the previous position.

Since the cumulative value of both the independent quantity X and the dependent quantity Y are stored in a computation to obtain the product XY, both X and Y may have initial values different from zero. Because of this, initial values X and Y may have to be inserted into the X and Y delay lines. The initial value of X may be stored in an Ix delay line, and the initial value of Y may be stored in an Iy delay line. Values may be inserted at any one time into either the Ix delay line or the Iy delay line from three flip-flops which may be designated as the S, Sr and Ss flip-flops to correspond to the flip-flops shown in FIGURE 1.

The S, Sr and Ss flip-flops receive values corresponding to three successive digits in accordance with the operation of gates 538, 540 and 542. The insertion into the Ix delay line of the signals stored in the S, Sr and Ss flip-flops is controlled by the operation of a gate 544. The gate 544 is also operative to control the recirculation of the signals in the Ix delay line through a path which includes only the Irx read flip-flop and the Inx write flip-flop. Similarly, a gate 546 controls the insertion of information from the S, Sr and Ss flip-flops through the Iny flip-flop into the Iy delay line. The gate 546 further controls the recirculation of signals through a path including only the Iry read amplifier, the Iny flip-flop and the Iy delay line.

*Detailed Discussion of Multiplier*

The construction of a multiplier is shown in detail in FIGURES 12 to 15, inclusive. The multiplier includes an Xd flip-flop 511, the operation of which is controlled by "and" networks 550, 552 and 554 and an "or" network 556. The "and" network 550 receives input signals from the clock source 220, the left output terminals of the Yr and Go flip-flops and of a ΔZex flip-flop and the right output terminals of the S and R flip-flops. The "and" network 552 has signals applied to it from the left output terminals of the Go and ΔZxs flip-flops. The signals from the "and" network 552 and the signals on the line 278 from the position counter 240 pass through the "or" network 556 to an input terminal of an "and" network 554, a second input terminal of which is connected to the clock source 220. The signals from the "and" network 554 are introduced to the right input terminal of the Xd flip-flop.

The signals on the left and right output terminals of the Xd flip-flop are respectively introduced to "and" networks 558 and 560. Other input terminals of the "and" network 558 are connected to the left output terminal of the S flip-flop and the right output terminals of the Xr and Xc flip-flops. Other input terminals of the "and" network 560 are connected to the $\overline{Gr}$ inverter, the left output terminal of the Xr flip-flop and the right output terminal of the Xc flip-flop.

The signals from the "and" networks 558 and 500 pass through an "or" network 562 to an input terminal of an "and" network 563, another input terminal of which is connected to the clock source 220. The signals from the "and" network 563 trigger the Xn flip-flop to the true state. The signals from the "or" network 563 also pass through an xn inverter to an input terminal of an "and" terminal 565, another input terminal of which is connected to the clock source 220. The signals from the "and" network 565 are in turn introduced to the right input terminal of the Xn flip-flop to trigger the flip-flop to the false state.

Signals from "and" networks 564, 566 and 568 also pass through the "or" network 562. The "and" network 564 is operatively controlled by signals from the left output terminals of the S and Xc flip-flops and the right output terminals of the Xr and Xd flip-flops. The "and" network 566 has input terminals connected to the left output terminals of the Xr, Xd and Xc flip-flops. The operation of the "and" network 568 is dependent upon the characteristics of the signals introduced to the input terminals of the "and" network from the left output terminals of the R, Irx and Go flip-flops.

Signals from "and" networks 570 and 572 are respectively introduced to the left and right input terminals of the Xc flip-flop. The "and" network 570 has signals introduced to its input terminals from the clock source 220, the left output terminals of the Xd and Xr flip-flops and the right output terminal of the R flip-flop. The "and" network 572 becomes activated upon the simultaneous introduction of signals of particular characteristics from the clock source 220 and the right output terminals of the Xd and Xr flip-flops.

Signals from an "and" network 574 pass to the left input terminal of the Yd flip-flop. Connectons are made to input terminals of the "and" network 574 from the clock source 220, the left output terminals of the Yr, Go and ΔZey flip-flops and the right output terminals of the R and S flip-flops. The right output terminal of the Yd flip-flop receives signals from an "and" network 576 having input terminals connected to the clock source 220 and to an "or" network 578. Input terminals of the "or" network 578 are connected to an "and" network 580 and to the line 278 extending from the position counter 240. The "and" network 580 passes a signal when signals of particular characteristics are simultaneously introduced to its input terminals from the left output terminals of the S and ΔZsy flip-flops.

The signals on the left and right input terminals of the Yd flip-flop are respectively introduced to "and" networks 582 and 584. Other input terminals of the "and" network 582 receive signals from the left output terminal of the S flip-flop and the right output terminals of the Yr and Yc flip-flops. Connections are made to other input terminals of the "and" network 584 from the Gr inverter, the left output terminal of the Yr flip-flop and the right output terminal of the Yc flip-flop.

The signals from the "and" networks 582 and 584 pass through an "or" network 586 to an input terminal of an "and" network 587 having another input terminal connected to the clock source 220. The signals from the "and" network 587 in turn trigger the Yn flip-flop to the true state. The signals from the "or" network 586 also pass through a yn inverter to an input terminal of an "and" network 589, another input terminal of which is connected to the clock source 220. The signals from the "and" network 589 are introduced to the right input terminal of the Yn flip-flop to trigger the flip-flop to the false state.

Signals from "and" networks 586, 588 and 590 also pass through the "or" network 586. The "and" network 586 is operatively controlled by signals from the left output terminals of the S and Yc flip-flops and the right output terminals of the Yr and Yd flip-flops. The "and" network 588 becomes activated upon the simultaneous introduction of signals of particular characteristics from the left output terminals of the Yr, Yd and Yc flip-flops. The "and" network 590 has input terminals connected to the left output terminals of the R and Go flip-flops and of an Iry flip-flop.

Signals from "and" networks 592 and 594 are respectively introduced to the left and right input terminals of the Yc flip-flop. The "and" network 592 passes a signal when signals of particular characteristics are simultaneously introduced to its input terminals from the clock source 220, the left output terminals of the Yr and Yd flip-flops and the right output terminal of the R flip-flop. The "and" network 594 becomes activated in accordance with the introduction of signals from the clock source 220 and the right output terminals of the Yr and Yd flip-flop.

The stages shown in FIGURE 13 include those controlling the operation of the Xy flip-flop. These stages include a pair of "and" networks 600 and 602. The "and" network 600 receives signals from the left output terminals of the Xr and ΔZsy flip-flops, and the "and" network 602 has signals applied to it from the right output terminals of the Xr and ΔZsy flip-flop. The signals from the "and" networks 600 and 602 pass through an "and" network 604 to an input terminal of an "and" network 606, other input terminals of which are connected to the left output terminals of the ΔZey and S flip-flops. The signals from the "and" network 606 control the triggering of the Xy flip-flop to the true state.

"And" networks 608 and 610 control the introduction of signals to the right input terminal of the Xy flip-flop. The "and" network 608 has input terminals connected to the left output terminal of the ΔZsy flip-flop and to the right output terminal of the Xr flip-flop. In like manner, an "and" network 610 is connected to the left output terminal of the Xr flip-flop and the right output terminal of the ΔZsy flip-flop. The signals from the "and" network 608 and 610 and the signals on the output line 278 of the counter 240 pass through an "or" network 612 to an input terminal of the "and" network 614 having another input terminal connected to the clock source 220. The signals from the "and" network 614 are introduced to the right input terminal of the Xy flip-flop.

"And" networks 616 and 618 are associated with each other to control the passage of signals to the Yx amplifier. The "and" network 616 receives signals from the left output terminals of the Yn and ΔZsx flip-flops. The "and" network 618 has signals applied to it from the right output terminals of the Yn and ΔZxs flip-flops. The signals from the "and" networks 616 and 618 pass through an "or" network 620 to an input terminal of an "and" network 622, other terminals of which are connected to left output terminals of the Sr and ΔZex flip-flops. The signals from the "and" network 622 pass through the Yx amplifier.

The signals from the Yx amplifier are introduced to an "and" network 624 as are the signals on the left output terminal of the Xy flip-flop. The signals from the "and" network 624 and from an "and" network 626 pass through an "or" network 628 to an input terminal of "and" network 630. The "and" network 626 has input terminals connected to the left output terminals of the S and ΔZex flip-flops and to the right output terminals of the Sr and ΔZsx flip-flops.

In addition to having an input terminal connected to the "or" network 628, the "and" network 630 has input terminals connected to the clock source 220 and to the right output terminal of the R flip-flop. The signals from the "and" network 630 are introduced to the left input terminal of the Yh flip-flop to trigger the flip-flop to the true state. The Yh flip-flop becomes triggered to the false state by signals from an "and" network 632, input terminals of which are connected to a clock source 220, the Yx inverter and the right output terminal of the Xy flip-flop.

Signals from "and" networks 634, 636, 638 and 640 pass through an "or" network 642 to an input terminal of an "and" network 644 having a second input terminal connected to the left output terminal of the Sr flip-flop. The signals from the "and" network 644 are synchronized in time in an "and" network 645 with the clock signals from the source 220 and are then introduced to the left input terminal of the Yv flip-flop. The signals from the "and" network 644 are also inverted by a yv inverter and are introduced to an "and" network 647 for synchronization with the signals from the clock source 220. The synchronized signals from the "and" network 647 trigger the Yv flip-flop to the false state.

The "and" network 634 is operatively controlled by signals from the Yx inverter, the left output terminal of the Yh flip-flop and the right output terminal of the Xy flip-flop. The operation of the "and" networwk 636 is dependent upon the characteristics of the signals introduced to its input terminals from the Yx amplifier and the right output terminals of the Xy and the Yh flip-flops. The "and" network 638 has signals applied to it from the Yx inverter, the left output terminal of the Xy flip-flop and the right output terminal of the Yh flip-flop. The "and" network 640 becomes activated upon the simultaneous introduction of signals of particular characteristics from the Yx amplifier and the left output terminals of the Xy and Yh flip-flops.

An "and" network 648 has input terminals connected to the left output terminal of the Xc flip-flop and the right output terminals of the Xr and Xd flip-flops. The signals from the "and" network 648 pass through an "or" network 650 to an input terminal of an "and" network 652 having another input terminal connected to the output line 236 of the counter 240. Signals from "and" networks 654, 656 and 658 also pass through the "or" network 650.

The "and" network 654 becomes activated upon the simultaneous introduction of signals from the left output terminals of the Xr and Xd flip-flops and the right output of the Xc flip-flop. The operation of the "and" network 656 is dependent upon the characteristics of the signals introduced to the input terminals of the network from the left output terminal of the Yc flip-flop and the right output terminals of the Yr and Yd flip-flops. The "and" network 658 receives signals from the left output terminals of the Yd and Yr flip-flops and the right output terminal of the Yc flip-flop.

The stages 648, 650, 652, 654, 656 and 658 are associated with "and" networks 660 and 662. The "and" network 660 has input terminals connected to the Yx inverter, the left output terminal of the Yh flip-flop and the right output terminal of the Xy flip-flop. Signals are introduced to the "and" network 662 from the Yx amplifier, the left output terminal of the Xy flip-flop and the right output terminal of the Yh flip-flop. The signals from the "and" networks 660 and 662 pass through an "or" network 664 to an input terminal of an "and" network 666, another input terminal of which is connected to the output line 278 of the counter 240.

The signals from the "and" networks 652 and 666 are introduced through an "or" network 668 to the input terminal of an "and" network 670, the operation of which is synchronized with signals from the clock source 220. The signals from the "and" network 670 in turn control the triggering of the Of flip-flop to the true state. The triggering of the Of flip-flop to the false state is dependent upon signals from an "and" network 672, the operation of which is controlled by signals from the clock source 220 and from an "or" network 674. The "or" network 674 has input signals introduced to it from the left output terminal of the R flip-flop and from the movable arm of the Overflow Reset switch.

The stages for controlling the operation of the Rn flip-flop are shown in FIGURE 14. These stages include an "or" network 680, the input terminals of which are connected to the right output terminals of the Go and R flip-flops. The signals from the "or" network 680 are introduced to an input terminal of an "and" network 682, other input terminals of which are connected to the left output terminal of the Rr flip-flop and the right output terminals of the Yv and Rc flip-flops. The signals from the "and" network 682 pass through an "or" network 684 to an "and" network 685, the operation of which is synchronized by the clock signals from the source 220. The signals from the "and" network 685 in turn trigger the Rn flip-flop to the true state. The Rn flip-flop becomes triggered to the false state by signals from an "and" network 687 having input terminals connected to the clock source 220 and an rn inverter. The rn stage inverts the signals from the "or" network 684.

Signals from an "and" network 686 also pass through the "or" network 684. The operation of the "and" network 686 is controlled by signals from the left output terminals of the Sr and Yv flip-flops and the right output terminals of the Rc and Rr flip-flops. Signals from the "and" networks 688, 690 and 692 also pass through the "or" network 684. The "and" network 688 has input terminals connected to the left output terminals of the Rc and Sr flip-flops and the right output terminals of the Rn and Yv flip-flops. The "and" network 690 is operatively controlled by signals from the left output terminals of the Rr, Rc and Yv flip-flops. The operation of the "and" network 692 is dependent upon the signals introduced to the network from the left output terminals of the R, S and Go flip-flops.

"And" networks 694 and 696 are operatively associated with each other. The operation of the "and" network 694 is dependent upon the characteristics of signals introduced to the "and" network from the left output terminals of the Rr and Yv flip-flops. The "and" network 696 becomes activated upon the simultaneous introduction of signals of particular characteristics from the left output terminals of the Sr and ΔZey flip-flops and the right output terminals of the Ss and ΔZsy flip-flops.

The signals from the "and" networks 694 and 696 pass through an "or" network 698 to an input terminal of an "and" network 700 having other input terminals connected to the clock source 220 and to the left output terminal of the R flip-flop. The signals from the "and" network 700 are introduced to the left input terminal of the Rc flip-flop to trigger the flip-flop to the true state. The Rc flip-flop becomes triggered to the false state by signals from an "and" network 702, input terminals of which are connected to the clock source 220 and the right output terminals of the Yv and Rr flip-flops.

Input terminals of an "and" network 704 are connected to the right output terminal of the Yv flip-flop and to the left output terminal of the Rc flip-flop. In like manner, an "and" network 706 has input terminals connected to the left output terminal of the Yv flip-flop and to the right output terminal of the Rc flip-flop. The signals from the "and" networks 704 and 706 are introduced through an "or" network 708 to an input terminal of an "and" network 710, other input terminals of which are connected to the clock source 220 and to the output line 396 of the counter 240. The signals from the "and" network 710 are in turn introduced to the ΔZey flip-flop to trigger the flip-flop to the true state.

The ΔZey flip-flop becomes triggered to the false state by signals passing through an "and" network 712. The operation of the "and" network 712 is controlled by signals from the clock source 220 and by signals passing through an "or" network 714 from an "and" network 716 and from the left output terminal of the R flip-flop. The operation of the "and" network 716 is dependent upon the characteristics of the signals introduced to the "and" network from an "or" network 718 and from the output line 396 of the counter 240. The "or" network 718 is connected to receive signals from "and" networks 720 and 722. The "and" network 720 is connected to the left output terminals of the Yv and Rc flip-flops, and the "and" network 722 is connected to the right output terminals of the Yv and Rc flip-flops.

An "and" network 724 has signals introduced to its input terminals from the clock source 220, the line 396 and the right output terminals of the R and Yv flip-flops. The signals from the "and" network 724 trigger the ΔZs flip-flop to the true state. In like manner, the signals from an "and" network 726 trigger the ΔZs flip-flop to the false state. The "and" network 726 receives the signals from the clock source 220 and the signals passing through an "or" network 726 from an "and" network 728 and from the left output terminal of the R flip-flop. Connections are made to input terminals of the "and" network 728 from the line 396 and from the left output terminal of the Yv flip-flop.

Stages including "and" networks 734, 736, 738 and 740 are shown in FIGURE 15 for controlling the operation of the S flip-flop. The "and" network 734 has signals applied to it from the movable arm of an $\text{(Ix)}$ switch, an Fm amplifier and the right output terminal of the Go flip-flop. The Fm amplifier receives signals through an "or" network 742 from the left output terminals of the F1 and F2 flip-flops. In like manner, signals are introduced to the "and" network 736 from the left output terminals of the Go, F1 and Irx flip-flops.

The "and" network 738 is operatively controlled by signals from the left output terminals of the F2, Iry and Go flip-flops. Connections are made to the input terminals of the "and" network 740 from the Fm inverter, the left output terminals of the Go and Yr flip-flops and the right output terminal of the S flip-flop. The signals from the "and" networks 738 and 740 and from the "and" networks 734 and 736 pass through an "or" network 742 to an input terminal of an "and" network 744 having another input terminal connected to the clock source 220. The signals from the "and" network 744 are in turn introduced to the left input terminal of the S flip-flop.

The "and" networks 746, 748 and 750 control the introduction of signals to the right input terminal of the S flip-flop. The "and" network 746 has input terminals connected to the left output terminals of the F1 and Go flip-flops and the right output terminal of the Irx flip-flop. In like manner, the "and" network 748 is connected to receive signals from the left output terminals of the F2 and Go flip-flops and the right output terminal of the Iry flip-flop. Connections are made to the input terminals of the "and" network 750 from the line 236 and the Fm inverter. The signals from the "and" networks 746, 748 and 750 pass through an "or" network 752 to an input terminal of an "and" network 754, another terminal of which is connected to the clock source 220. The signals from the "and" network 754 trigger the S flip-flop to the false state.

An "and" network 756 is operatively controlled by signals from the Fm amplifier, the movable arm of the $\text{(Iy)}$ switch and the right output terminal of the Go flip-flop. An "and" network 758 becomes activated in accordance with the introduction of signals from the left output terminals of the S and Go flip-flops. The signals from the "and" networks 756 and 758 pass through an "or" network 760 to an input terminal of an "and" network 762, another input terminal of which is connected to the clock source 220. The signals from the "and" network 762 in turn trigger the Sr flip-flop to the true state.

The Sr flip-flop becomes triggered to the false state by signals from an "and" network 764, input terminals of which are connected to the clock source 220, an "or" network 768 and the right output terminal of the S flip-flop. The "or" network 768 receives signals from the Fm inverter and the left output terminal of the Go flip-flop.

The signals from the "or" network 768 are also introduced to an input terminal of an "and" network 770, other input terminals of which are connected to the clock source 220 and to the right output terminal of the Sr flip-flop. The signals from the "and" network 770 pass to the right input terminal of the Ss flip-flop to trigger the flip-flop to the false state. The signals from an "and" network 772 trigger the Ss flip-flop to the true state. The "and" network 772 receives signals from the clock source 220 and through an "or" network 774 from "and" networks 776 and 778. The "and" network 776 has input terminals connected to the Fm amplifier, the movable arm of an $\text{(Iz)}$ switch and the right output terminal of the Go flip-flop. The input terminals of the "and" network 778 are connected to the left output terminals of the S and Go flip-flops.

Signals pass through an "or" network 780 to an "and" network 782 from the right output terminals of the F1 and Go flip-flops. Another input terminal of the "and" network 782 is connected to the left output terminal of the Inx flip-flop, and the output terminal of the "and" network 782 is connected to an input terminal of an "or" network 784. Signals are also introduced to the "or" network 784 from an "and" network 786 having input terminals connected to the left output terminals of the F1, Ss and Go flip-flops. The signals from the "or" network 784 in turn pass to an input terminal of an "and" network 786, another input terminal of which is connected to the clock source 220. The signals from the "and" network 786 trigger the Inx flip-flop to the true state.

The signals from the "or" network 780 are also introduced to an input terminal of an "and" network 790, another input terminal of which is connected to the right output terminal of the Inx flip-flop. The signals from the "and" network 790 pass through an "or" network 792 to the input terminal of an "and" network 794, another input terminal of which is connected to the clock source 220. Signals from an "and" network 796 also pass through the "or" network 792 to the "and" network 794, input terminals of the "and" network 796 being connected to the left output terminals of the F1 and Go flip-flops and the right output terminal of the Ss flip-flop. The signals from the "and" network 794 are introduced to the right input terminal of the Inx flip-flop.

An "or" network 798 receives signals from the right output terminals of the F2 and Go flip-flops. Signals pass through the "or" network 798 to an input terminal of an "and" network 800 having another input terminal connected to the left output terminal of the Iry flip-flop. The output signals from the "and" network 800 pass through an "or" network 802 to an input terminal of an "and" network 804, a second input terminal of which is connected to the clock source 220. The signals from the "and" network 804 trigger the Iny flip-flop to the true state. The "and" network 804 also has signals introduced to it through the "or" network 802 from an "and" network 806, the operation of which is controlled by signals from the left output terminals of the F2, Go and S flip-flops.

The Iny flip-flop is triggered to the false state by signals from an "and" network 810 having input terminals connected to an "or" network 812 and the clock source 220. The "or" network 812 receives signals from "and" networks 814 and 816. The input terminals of the "and" network 814 are connected to the "or" network 798 and the Iry flip-flop. Connections are made to the input terminals of the "and" network 816 from the left output terminals of the F2 and Go flip-flops and the right output terminal of the Ss flip-flop.

The Go flip-flop becomes respectively triggered to the true and false states by signals from "and" networks 818 and 820. The "and" network 818 is operatively controlled by signals from the clock source 220, the output line 236 of the counter 240 and the left output terminal of the G1 flip-flop. In like manner, the "and" network 820 receives at its input terminals signals from the clock source 220, the output line 236 and the right output terminal of the G1 flip-flop.

As previously described, the signals relating to the cumulative value of the independent quantity X are stored in the X delay line in each cycle of computation. The signals relating to the independent quantity X are combined in each cycle of computation with the signals relating to the ΔX increment so as to obtain a new value of the independent quantity X for the next cycle of computation. The ΔX increment is indicated in each cycle of computation by the operation of the Xd flip-flop in FIGURE 12. Upon the occurrence of an actual ΔX increment as indicated by signals of particular characteristics on the left output terminal of the ΔZex flip-flop, the Xd flip-flop becomes triggered to the true state at the "start" position in each cycle of computation. The Xd flip-flop becomes triggered true in a similar manner to that set forth in Equation 21 above. The Xd flip-flop becomes triggered true in accordance with the following logical equation:

$$xd = Yr\overline{S}Go\overline{R}(\Delta Xe)T \qquad (60)$$

The stages for controlling the operation of the Xd flip-flop are shown in FIGURE 12.

The Xd flip-flop remains true during the remaining digital positions in each cycle of computation when the sign of the ΔX increment is negative. However, the Xd flip-flop becomes triggered false in the digital position immediately following the "start" position when the ΔX increment is positive. This occurs in a manner similar to that set forth in Equation 22 for the Yd flip-flop. The Xd flip-flop also becomes reset to the false state at the end of each cycle of computation so as to be prepared to be initially triggered true for the ΔX increment in the next cycle of computation. The logic controlling the triggering of the Xd flip-flop to the false state may be expressed as:

$$oxd = [S(\Delta Xs) + Pl]T \qquad (61)$$

The Xn flip-flop combines the signals representing the independent quantity X and the signals representing the ΔX increment in each cycle of computation to obtain signals representing a new value of X. These signals are inserted into the X delay line so as to be presented as the value of X in the next cycle of computation. The combination of ΔX and X in each cycle is obtained in a manner similar to the combination of ΔY and Y in each cycle as set forth above in Equations 24 and 24a. The operation of the Xn flip-flop is controlled in accordance with the following logical equations:

$$xn = [Xr\overline{X}d\overline{X}c\overline{G}r + \overline{X}rXd\overline{X}cS + \overline{X}rdXcS + xrXdXc]T \qquad (62)$$

$$oxn = (\overline{x}n)T \qquad (63)$$

The values of X and ΔX in each digital position are actually combined with the carry resulting from the combination of these quantities in the previous digital position. The carry is indicated by the Xc flip-flop, which operates in a manner similar to that set forth in Equations 25 and 26 for the Yc flip-flop. The Xc flip-flop operates in accordance with the following logical equations:

$$xc = XrXd\overline{R}T \qquad (64)$$

$$oxc = \overline{X}r\overline{X}dT \qquad (65)$$

Just as the Xd flip-flop functions in a multiplying operation to indicate the value of the ΔX increment in each cycle of computation, the Yd flip-flop operates to indicate the ΔY increment in each cycle of computation. In this way, the operation of the Yd flip-flop can be logically expressed as:

$$yd = Yr\overline{S}Go\overline{R}(\Delta Ye)T \qquad (66)$$

$$oyd = [S(\Delta Ys) + Pl]T \qquad (67)$$

The Yn flip-flop combines the signals representing Y and ΔY in each cycle of computation to obtain signals representing a new value of Y. These signals are inserted into the Y delay line for use as the value of Y in the next cycle of computation. The operation of the Yn flip-flop in combining the values of Y and ΔY in each cycle of computation is similar to the operation of the Xn flip-flop in combining the values of X and ΔX in each cycle of computation. Accordingly, the logical equations for controlling the operation of the Yn flip-flop may be expressed as:

$$yn = [Yr\overline{Y}d\overline{Y}c\overline{G}r + \overline{Y}rY d\overline{Y}cS + \overline{Y}r\overline{Y}dYcS + YrYdYc]T \qquad (68)$$

$$oyn = (\overline{y}n)T \qquad (69)$$

The Yn flip-flop actually combines the signals representing Y and ΔY for each position with the signals representing the carry resulting from the combination of Y and ΔY from the previous position. The carry is indicated by the Yc flip-flop, the operation of which is controlled in a manner similar to that set forth above for the Xc flip-flop. The Yc flip-flop becomes triggered to the true and false states in accordance with the following logical equations:

$$yc = YrYd\overline{R}T \qquad (70)$$

$$oyc = \overline{Y}r\overline{Y}dT \qquad (71)$$

As will be seen from FIGURE 11, the increment in the product of X and Y in each cycle of computation is obtained by first determining the incremental quantities XΔY and YΔX. The incremental quantity XΔY is obtained from the operation of the Xy flip-flop. As will be seen, the Xy flip-flop is triggered to the true state in a cycle of computation only when an XΔY incremental quantity is actually obtained in that cycle of computation, as indicated by a signal of particular characteristics on the left output terminal of the ΔZey flip-flop. Furthermore, the Xy flip-flop can be triggered to the true state only in the positions after the "start" pulse, as indicated by a signal of particular characteristics on the left output terminal of the S flip-flop. Under such conditions, the Xy flip-flop becomes triggered true for a positive ΔY increment in the digital positions in which the binary value of X in the X delay line is "1". The Xy flip-flop also becomes triggered true for a negative value of ΔY in the digital positions in which the binary value of X in the X delay line is zero. This causes the value of the indications representing X in the X delay line to be inverted for a negative ΔY increment. The triggering of the Xy flip-flop to the true state may be represented as:

$$xy = (\Delta Ye)S[Xr(\Delta Ys) + \overline{X}r(\Delta \overline{Y}s)]T \qquad (72)$$

The stages controlling the triggering of the Xy flip-flop to the true state in accordance with the logic expressed in Equation 72 are shown in FIGURE 13. These stages include the "and" networks 600, 602 and 606 and the "or" network 604.

In like manner, the Xy flip-flop is triggered to the false state for a positive ΔY increment in the digital positions in which the signal indications stored in the X delay line have a binary value of "0." The signal indications in the Xy flip-flop are inverted from a binary value of "1" to a binary value of "0" when the ΔY increment is negative. The Xy flip-flop is also reset to the false state at the end of each cycle of computation. The triggering of the Xy flip-flop to the false state occurs in accordance with the logic expressed in Equation 73:

$$oxy = [\overline{X}r(\Delta Ys) + Xr(\Delta \overline{Y}s) + Pl]T \qquad (73)$$

As will be seen from Equations 72 and 73, the value of X used in obtaining the XΔY increment is the value at the beginning of each cycle of computation. This value is used in order to obtain the area 501 in FIGURE 11. However, a value of Y at the end of each cycle of computation is used to obtain the YΔX increment in that cycle of computation. The value of Y at the end of each cycle of computation is used in order to obtain the combined values of areas 502 and 504 in FIGURE 11. In this way, the areas 501, 502 and 504 can be added to the value of the product XY in each cycle of computation to obtain a new value of the product XY.

The YΔX increment is determined by the Yx amplifier and Yx inverter. The logic controlling the operation of the Yx amplifier is similar to the logic expressed in Equation 72 for the Xy flip-flop except that the value Yn is used instead of the value Yr so that the value of Y at the end of each cycle of computation will be obtained. The operation of the Yx amplifier may be expressed as:

$$Yx = (\Delta Xe) Sr[Yn(\Delta Xs) + \overline{Yn}(\Delta \overline{Xs})]T \quad (74)$$

The Yx amplifier and Yx inverter are used in order to prevent a delay of 1 digit time. This is necessary so that the signals produced by the Yx amplifier and Yx inverter will be synchronized with the signals produced by the Xy flip-flop. A saving of 1 digit time is necessary for the YΔX incremental quantity since the new value of Y for each digital position is determined only at the end of the position whereas the old value of X is available at the beginning of each digital position. In this way, the digital significance of the signals produced in each position by the Yx amplifier and Yx inverter corresponds to the digital significance of the signals produced in each position of the Xy flip-flop.

The signals representing the XΔY incremental quantity and the YΔX incremental quantity are combined in stages including the Yv flip-flop to obtain the composite value of the areas 501, 502 and 504 in FIGURE 11. The logic controlling the equation of the Yv flip-flop is similar to that discussed above and expressed in such equations as Equations 62 and 68. This logic may be expressed as:

$$yv = [\overline{Xy}\overline{Yx}Yh + \overline{Xy}Yx\overline{Yh}$$
$$+ Xy\overline{Yx}\overline{Yh} + XyYxYh]SrT \quad (75)$$

$$oyv = (\overline{yv})T \quad (76)$$

The Yv flip-flop becomes activated upon the occurrence of the Sr signal rather than the S signal because of the delay of one digital position provided by the Xy and Yn flip-flops.

The values of XΔY and YΔX in each position are actually combined with the carry resulting from the combination of these signals in the previous position. The carry is indicated by the Yh flip-flop, the operation of which is controlled in a manner similar to that described above for other carry flip-flops. The logic controlling the production of a carry indication by the Yh flip-flop may be expressed as:

$$yh = XyYx\overline{R}T \quad (77)$$
$$oyh = \overline{Xy}\overline{Yx}T \quad (78)$$

The Yh flip-flop is also triggered true in the position immediately following the start position when the value of the ΔX increment is negative in a cycle of computation. The purpose of this is to provide an addition of a binary value of "1" in the position of least digital significance so that the inverted value of Y can actually become the complemented value of Y. This binary addition of "1" in the least significant digit is obtained for the reasons set forth above in connection with logical Equation 37a. The logic controlling the triggering of the Yh flip-flop to the true state in the position of least digital significance for a negative ΔX increment may be expressed as:

$$yh = S\overline{S}r(\Delta Xe)(\Delta \overline{Xs})\overline{R}T \quad (79)$$

As will be seen from Equation 79, the position of least digital significance is represented as $S\overline{S}r$.

The signals stored in the R delay line to represent R in each cycle of computation are combined with the signals provduced in the Yv flip-flop to represent the ΔR incremental quantity. This combination occurs in various stages controlling the operation of the Rn flip-flop so that the Rn flip-flop becomes triggered in successive digital positions to represent the new value of R. The combination of R and ΔR in successive positions is obtained in a manner similar to that described above for other combinations and may be expressed logically as:

$$rn = [Rr\overline{Yv}\overline{Rc}\overline{Gr} + \overline{Rr}Yv\overline{Rc}Sr$$
$$+ \overline{Rr}\overline{Yv}RcSr + RrYvRc]T \quad (80)$$

$$orn = rnT \quad (81)$$

The stages for controlling the operation of the Rn flip-flop are shown in FIGURE 14.

The values of R and ΔR are actually combined in each position with the carry resulting from the combination of these quantities in the previous digital position. The carry is produced in a manner to that set forth above such as in Equations 64 and 65 and may be logically expressed as:

$$rc = \overline{R}RrYvT \quad (82)$$
$$orc = Rr\overline{Yv}T \quad (83)$$

A carry is also produced in the position of least digital significance when a ΔY increment actually occurs in a cycle of computation and when the sign of the increment is negative. This carry is produced in the position of least digital significance so that the value of X in the XΔY increment will be complemented rather than inverted. The carry is produced for the same reasons as set forth above in connection with the discussion relating to Equation 79. The carry may be logically expressed as:

$$rc = Sr\overline{S}s(\Delta Ye)(\Delta \overline{Ys})T \quad (84)$$

As will be seen from Equation 84, the carry is produced two positions after the occurrence of the start pulse. This corresponds to the position of least digital significance in the value of the XΔY increment because of the delay provided by the Xy, Yn and Yv flip-flops.

In each cycle of computation, the new value of R is tested to determine whether the new value exceeds the capacity of the R delay line. If the new value exceeds the capacity of the R delay line, an overflow in the value of R occurs. This overflow is represented by a ΔZ increment. A ΔZ increment is obtained when a carry is produced in the most significant digit in the combination of ΔR and R for a positive ΔR increment. The occurrence of a ΔZ increment under such circumstances may be represented as:

$$\Delta ze = P2\overline{Yv}RcT \quad (85)$$

The overflow indication is produced for each cycle of computation at position 2 in the next cycle of computation because of the delays provided by the Xy, Yn and Yv flip-flops. In like manner, a ΔZ increment occurs in a cycle of computation when no carry in the combination of R and ΔR occurs in the most significant digit for a negative ΔR increment. This may be represented as:

$$\Delta ze = P2Yv\overline{Rc}T \quad (86)$$

No ΔZ increment is produced in a cycle of computation when a carry is produced in the most significant digit for a negative ΔR increment. This may be logically expressed as:

$$o\Delta ze = P2YvRcT \quad (87)$$

Similarly, no ΔZ increment is produced in a cycle of computation when no carry is produced in the most significant digit for a positive ΔR increment. The logical expression for this is:

$$o\Delta ze = P2\overline{Yv}\overline{Rc}T \quad (88)$$

The ΔZe flip-flop is also maintained false during the resetting operation so that no transfers from this flip-flop can occur during this operation to represent $\Delta X$ and $\Delta Y$ increments.

The polarity of each $\Delta Z$ increment is directly dependent upon the polarity of the $\Delta R$ increment. For example, the $\Delta Z$ increment can be positive only when the $\Delta R$ increment is positive. In like manner, the $\Delta Z$ increment can be negative only when the $\Delta R$ increment is negative. Because of this, the operation of the $\Delta Zs$ flip-flop can be logically expressed as:

$$\Delta zs = P2\overline{Y}v\overline{R}T \tag{89}$$

$$o\Delta zs = (P2Yv+R)T \tag{90}$$

A "start" pulse is included in the signals stored in the Y delay line to indicate that the value of Y occurs in the successive digital positions in the delay line in each cycle of computation. The scale factor provided for the value of X corresponds to that provided for the value of Y so that corresponding positions in the X and Y delay lines have the same digital significance. Upon the occurrence of a start pulse in each cycle of computation, the S flip-flop is triggered to the true state. This occurs in accordance with the following logical equation:

$$s = Yr\overline{S}\overline{F}mGoT \tag{91}$$

In Equation 91, the $\overline{F}m$ term indicates that neither the F1 or F2 flip-flops is true such that a fill operation cannot occur for either X or Y. The stages controlling the operation of the S flip-flop are shown in FIGURE 15.

The Sr flip-flop becomes triggered true in the position immediately following the start pulse. This results from the logical equation:

$$sr = SGoT \tag{92}$$

In like manner, the Ss flip-flop becomes triggered true in the position immediately following the triggering of the Sr flip-flop to the true state. The Ss flip-flop becomes triggered true in accordance with the logical equation:

$$ss = SrGoT \tag{93}$$

When the S flip-flop is triggered true upon the occurrence of the "start" pulse in each cycle of computation, it remains true until the end of the cycle of computation. In the last position of each cycle of computation, the S flip-flop becomes reset to the false state so that it will respond properly to the "start" pulse in the next cycle of computation. The S flip-flop is triggered false at the end of each cycle of computation in accordance with the following logical equation:

$$os = P30\overline{F}mT \tag{94}$$

The Sr flip-flop becomes triggered false in the position immediately following the triggering of the S flip-flop to the false state. The logic controlling the triggering of the Sr flip-flop to the false state may be expressed as:

$$osr = \overline{S}GoT \tag{95}$$

In like manner, the Ss flip-flop becomes triggered false in the position immediately following the triggering of the Sr flip-flop to the false state. The logic controlling the triggering of the Ss flip-flop to the false state may be expressed as:

$$oss = \overline{S}rGoT \tag{96}$$

Since the S, Sr and Ss flip-flops are triggered false on a sequential basis, combinations of these flip-flops may be used to indicate positions 1 and 2 in each cycle of computation. For example, the S flip-flop is false and the Sr flip-flop is still true at position 1 in each cycle of computation. This may be logically expressed as:

$$P1 = \overline{S}Sr \tag{97}$$

In like manner, the Sr flip-flop is false and the Ss flip-flop is still true at position 2 in each cycle of computation. Because of this, position 2 may be defined as:

$$P2 = \overline{S}rSs \tag{98}$$

As described previously in connection with the integrator shown schematically in FIGURE 1 and shown in detail in FIGURES 6 to 9, inclusive, computation should be interrupted in case of any overflow in the value of the dependent quantity Y stored in the Y delay line. The reason is that the value of Y remaining in the Y delay line after an overflow no longer reflects the true value of Y so that errors will be obtained in the subsequent cycles of computation. In a product operation, computation should also be interrupted when an overflow occurs in the value of the independent quantity X stored in the X delay line. This interruption upon an overflow in the value of X stored in the X delay line should be obtained for the same reasons as an interruption in the computation upon an overflow in the value of Y.

The overflow in the value of the dependent quantity Y is dependent upon the polarities of Y and $\Delta Y$ in each cycle of computation and upon the carry produced in the most significant digit as a result of the combination of Y and $\Delta Y$ in that cycle of computation. Positive values of Y and $\Delta Y$ are indicated by binary values of "0" in the most significant digit. When a binary carry of "1" is produced in the most significant digit for positive values of Y and $\Delta Y$ in a cycle of computation, an overflow in the value of Y occurs in that cycle of computation. This may be expressed as:

$$of = \overline{Y}r\overline{Y}dYcP30T \tag{99}$$

The stages for controlling the operation of the Of flip-flop in accordance with the logic expressed in Equation 99 are shown in FIGURE 13.

In like manner, negative values of Y and $\Delta Y$ are indicated by binary values of "1" in the most significant digit. When a binary carry of "0" is produced in the most significant digit for negative values of Y and $\Delta Y$, an overflow in the value of Y occurs. This overflow is produced in accordance with the following logical equation:

$$of = Yr Yd\overline{Y}cP30T \tag{100}$$

The polarities of X and $\Delta X$ are indicated in a manner similar to that described above for Y and $\Delta Y$. The Xc carry flip-flop also operates in a manner similar to that described above for the Yc carry flip-flop. Because of this, an overflow in the value of X as a result of the combination of X and $\Delta X$ in each cycle of computation may be expressed as:

$$of = P30(\overline{X}r\overline{X}dXc + XrXd\overline{X}c)T \tag{101}$$

In order to make certain that computations are proceeding properly, the combination of $X\Delta Y$ and $Y\Delta X$ should be checked in each cycle of computation to make certain that no carry is produced in the most significant digit. The reason is that no provision has been made to combine this carry with the value of the output quantity R in a cycle of computation so that the resultant indications obtained for R in that cycle of computation indicate the true product of X and Y. Because of this, an overflow indication is produced when a carry is obtained in the most significant digit from adding $Y\Delta X$ and $X\Delta Y$.

The overflow indication obtained in accordance with the previous paragraph is dependent upon the polarities of the $X\Delta Y$ and $Y\Delta X$ increments and the carry resulting from the combination of these increments in the most significant position. Positive values of $X\Delta Y$ and $Y\Delta X$ are indicated by binary values of "0" in the most significant position, and negative values of $X\Delta Y$ and $Y\Delta X$ are indicated by binary values of "1" in the most significant digit. An overflow occurs when a binary carry of "1" is produced in the most significant digit for positive values of $Y\Delta X$ and $X\Delta Y$ or when a binary carry of "0" is produced in the most significant digit for negative values of $Y\Delta X$ and $X\Delta Y$. The most significant digit for each cycle of computation occurs at position 1 in the next cycle of computation because of the delays provided by the $Yv$ and $Yh$ flip-flops. The logic controlling the production of an overflow indication by the $Of$ flip-flop may be accordingly expressed as:

$$of = P1(\overline{Xy}\overline{Yx}Yh + XyYx\overline{Yh})T \qquad (102)$$

At certain times, it may be desired to reset the initial values of the $Ix$ and $Iy$ delay lines into the X and Y delay lines respectively. For example, it may be desired to run through a computation more than once to make certain that the computation has proceeded properly. Even in the situations when a computation is only performed once, the values inserted into the $Ix$ and $Iy$ delay lines have to be respectively transferred to the X and Y delay lines before the computation can be commenced. The transfer of information occurs when the $Go$ and reset flip-flops are true. The transfer is obtained in accordance with the following logical equations:

$$xn = IrxGoRT \qquad (103)$$

$$yn = IryGoRT \qquad (104)$$

The stages for controlling the transfer of information to the $Ix$ and $Iy$ delay lines in accordance with the logic expressed in Equations 103 and 104 are shown in FIGURE 12.

An initial value of R should also be inserted into the R delay line in order to minimize the errors resulting from the value remaining in the R delay line at the end of a computation. As previously described in connection with the integrator shown in FIGURES 6 to 9, inclusive, the value of R initially inserted into the R delay line should be approximately one half the capacity of the R delay line on an average basis. This is obtained by inserting a binary value of "1" in each digital position of the R delay line after the start position except that a binary value of "0" is inserted into the position of greatest digital significance. The insertion is made in accordance with the following logical equation:

$$rn = SGoRT \qquad (105)$$

A binary value of "0" is inserted into the position of greatest digital significance in accordance with Equation 105 since the S flip-flop is triggered false at this position. The transfer of information into the R delay line in accordance with logical equation 105 is obtained as a result of the operation of stages shown in FIGURE 14.

The insertion of information into the $Ix$ and $Iy$ delay lines is obtained as a result of the operation of the S, $Sr$ and $Ss$ flip-flops. The information is inserted on an octal basis such that the S, $Sr$ and $Ss$ flip-flops store information relating to three successive digits. The $Ss$ flip-flop stores information relating to the least significant of the three successive digits and the S flip-flop stores information relating to the most significant of the three successive digits.

Since the S, $Sr$ and $Ss$ flip-flops are reset to the false state at the end of each octal filling operation, the flip-flops have to be triggered in a fill operation only when they are to receive a binary value of "1" for a particular digit. In a fill operation, the S, $Sr$ and $Ss$ flip-flops are accordingly triggered to the true state when the ⓘₓ, ⓘᵧ and ⓘ_z switches are respectively closed. The triggering of the S, $Sr$ and $Ss$ flip-flops to the true states during the fill operation may be respectively represented as:

$$s = \text{ⓘₓ} Fm\overline{G}oT \qquad (106)$$

$$sr = \text{ⓘᵧ} Fm\overline{G}oT \qquad (107)$$

$$ss = \text{ⓘ}_z Fm\overline{G}oT \qquad (108)$$

As will be seen, the $Fm$ term is included in Equations 106, 107 and 108. The $Fm$ term is true when either F1 is true to represent a fill operation for the independent quantity X or when F2 is true to represent a fill operation for the dependent quantity Y.

The information in the $Ss$, $Sr$ and S flip-flops is stepped into either the $Ix$ or $Iy$ delay lines. The stepping operation occurs when the $Go$ flip-flop is true. The stepping operation occurs into the $Ix$ delay line when the Ⓕ₁ switch is closed to make F1 true. Similarly, the stepping operation occurs into the $Iy$ delay line upon a closure of the Ⓕ₂ switch to make F2 true. The stepping operation actually occurs from the $Ss$ flip-flop into the $Ix$ and $Iy$ delay lines as may be seen from the following logical equations:

$$inx = SsF1GoT \qquad (109)$$

$$oinx = \overline{S}sF1GoT \qquad (110)$$

$$iny = SsF2GoT \qquad (111)$$

$$oiny = \overline{S}sF2GoT \qquad (112)$$

The information from the $Sr$ flip-flop becomes stepped into the $Ss$ flip-flop as the information from the $Ss$ flip-flop becomes inserted into either the $Ix$ or $Iy$ delay lines. The information in the $Sr$ flip-flop becomes stepped into the $Ss$ flip-flop in accordance with the following logical equations:

$$ss = SrGoT \qquad (113)$$

$$oss = \overline{S}rGoT \qquad (114)$$

After the information becomes stepped from the $Sr$ flip-flop into the $Ss$ flip-flop in a first clock time, the information becomes inserted by the $Ss$ flip-flop into the $Ix$ or $Iy$ delay lines in a second clock time.

In like manner, the information from the S flip-flop becomes stepped into the $Sr$ flip-flop in a first clock time, into the $Ss$ flip-flop in a second clock time and into the $Ix$ delay line or $Iy$ delay line in a third clock time. The stepping of information from the S flip-flop to the $Sr$ flip-flop is obtained in accordance with the following logical equations:

$$sr = SGot \qquad (115)$$

$$osr = \overline{S}GoT \qquad (116)$$

During the time that the information is being stepped from the $Ss$ flip-flop into the $Ix$ or $Iy$ delay line, the information in the activated delay line is being inserted into the S flip-flop. This insertion occurs in accordance with the following logical equations.

$$s = (IrxF1Go + IryF2Go)T \qquad (117)$$

$$os = (\overline{Irx}F1Go + \overline{Iry}F2Go)T \qquad (118)$$

As will be seen from Equations 117 and 118, the S flip-flop receives the information from the $Ix$ delay line upon a closure of the Ⓕ₁ switch and receives the information from the $Iy$ delay line upon a closure of the Ⓕ₂ switch. By having the information from the $Ix$ delay line and the $Iy$ delay line travel through the S, $Sr$ and $Ss$ flip-flops, a delay of three digital positions is obtained in the recirculation of the information in the delay lines. This delay is necessary so that the information inserted into the S, $Sr$ and $Ss$ flip-flops in accordance with Equations 106, 107, and 108 can be stepped into the activated one of the $Ix$ and $Iy$ delay lines.

During the time that information is being inserted into the S, $Sr$ and $Ss$ flip-flops, the information previously inserted into the $Ix$ and $Iy$ delay lines should recirculate without any delay. This recirculation occurs for the $Ix$ delay line through a shortened path including the delay line, the $Irx$ flip-flop and the $Inx$ flip-flop and occurs through a similar path for the information in the $Iy$ delay line. Such a recirculation is also obtained during periods of actual computation. The circulation of information through the shortened paths is obtained in accordance with the following logical equations:

$$inx = Irx(\overline{F1} + \overline{G}o)T \qquad (119)$$

$$oinx = \overline{Irx}(\overline{F1} + \overline{G}o)T \qquad (120)$$

$$iny = Iry(\overline{F2} + \overline{G}o)T \qquad (121)$$

47

$$iny = Iry(\overline{F}2 + \overline{G}o)T \quad (212)$$

$$oiny = \overline{Iry}(\overline{F}2 + \overline{G}o)T \quad (122)$$

*Schematic Showing of Servo Shown in FIGURE 16*

An integrator for performing a servo operation is schematically illustrated in FIGURE 16. The integrator includes a Y delay line, a Yr read flip-flop and a Yn flip-flop as in the previous embodiments. The signals from the Y delay line are combined in each cycle of computation with signals representing increments of $\Delta Y$ in that cycle of computation. As will be described in detail subsequently, a plurality of $\Delta Y$ increments may be introduced to the servo integrator in each cycle of computation. These $\Delta Y$ increments are added in each cycle of computation to obtain a resultant $\Delta Y$ increment and the resultant $\Delta Y$ increment is introduced to the Y adder for combination with the value of Y in that cycle of computation.

The signals representing the most significant digit of Yn in each cycle of computation are introduced to the Ss flip-flop through a gate 840. The signals from the Ss flip-flop are then combined with the signals representing the actual occurrence of a $\Delta X$ increment to obtain $\Delta Ze$ signals representing the actual occurrence of a $\Delta Z$ increment. The $\Delta Z$ increment is obtained only when a $\Delta X$ increment occurs and only when the value of Yn varies from a particular value such as a value of zero. This $\Delta Z$ increment is used to provide servo functions dependent upon the particular problem being solved. The polarity of the $\Delta Z$ increment is dependent upon the polarity of Yn and the polarity of the $\Delta X$ increment in each cycle of computation.

FIGURE 16 also includes an I delay line, an Ir flip-flop and an In flip-flop corresponding to similar members in the other embodiments. The I delay line stores signals representing the initial value of Y, these signals being introduced to the Y delay line before the initiation of a computation. The S, Sr and Ss flip-flops are included to provide an introduction of information on an octal basis into the I delay line to serve as the initial value of Y.

*Detailed Circuitry of Servo Integrator*

The detailed circuitry for controlling the operation of the servo integrator is shown in FIGURES 17 to 23, inclusive. The circuits shown in FIGURE 17 include a pair of "and" networks 900 and 902. The "and" network 900 is connected to the left output terminal of the $\Delta Zey1$ flip-flop and the right output terminal of the $\Delta Zey2$ flip-flop. The "and" network 902 is operatively controlled by signals from the left output terminal of the $\Delta Zey2$ flip-flop and the right output terminal of the $\Delta Zey1$ flip-flop. The signals from the "and" networks 900 and 902 pass through an "or" network 904 to an input terminal of the "and" network 906, other input terminals of which are connected to the left output terminal of the Yr flip-flop and the right output terminal of the S flip-flop. The signals from the "and" network 906 are in turn introduced through an "or" network 908 to an input terminal of an "and" network 910.

Figure 17:
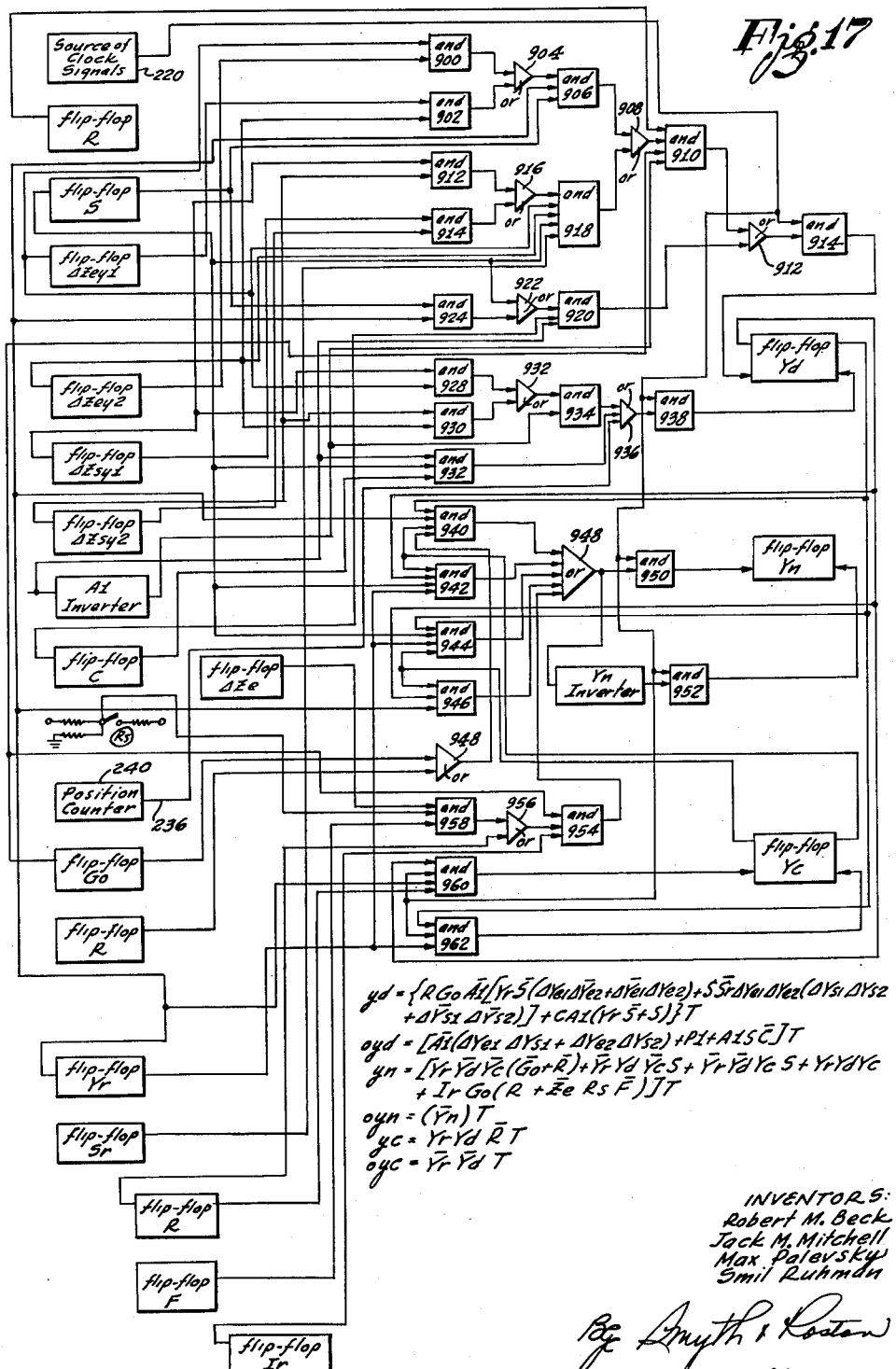

"And" networks 912 and 914 are also shown in FIGURE 17. The "and" network 912 has signals applied to it from the left output terminals of the $\Delta Zsy1$ and $\Delta Zsy2$ flip-flops. The "and" network 914 has input terminals connected to the right output terminals of the $\Delta Zsy1$ and $\Delta Zsy2$ flip-flops. The signals from the "and" networks 912 and 914 are introduced through an "or" network 916 to an input terminal of "and" network 918, other input terminals of which are connected to the left output terminals of the $\Delta Zey1$, $\Delta Zey2$ and the S flip-flops and the right output terminal of the Sr flip-flop. The signals from the "and" network 918 also pass through the "or" network 908 to the "and" network 910.

In addition to receiving the signals passing through the "or" network 908, the "and" network 910 is operatively controlled by the signals on the left output terminals of the R and Go flip-flops and signals from an A1 lead. The signals from the "and" network 910 are introduced through an "or" network 912 to an input terminal of an "and" network 914, the operation of which is synchronized by the signals from the clock source 220. The signals from the "and" network 914 trigger the Yd flip-flop to the true state.

The "and" network 914 also receives the signals passing through an "or" network 912 from an "and" network 920. Input terminals of the "and" network 920 are connected to the A1 lead, an "or" network 922 and to the left output terminal of the C flip-flop. The "or" network 922 has signals applied to it from the left output terminal of the S flip-flop and from an "and" network 924. The "and" network 924 is in turn operatively controlled by the signals from the left output terminal of the Yr flip-flop and from the right output terminal of the S flip-flop.

The triggering of the Yd flip-flop to the false state is dependent upon the operation of a plurality of stages including the "and" networks 928, 930 and 932. The "and" network 928 becomes activated upon the introduction of signals of particular characteristics from the left output terminals of the $\Delta Zey1$ and $\Delta Zsy1$ flip-flops. Similarly, the "and" network 930 becomes activated upon the simultaneous introduction of signals of the particular characteristics from the left output terminals of the $\Delta Zey2$ and $\Delta Zsy2$ flipflops. The signals from the "and" networks 928 and 930 pass through an "or" network 932 to an input terminal of an "and" network 934, another input terminal of which is connected to the A1 lead.

The "and" network 932 receives signals at its input terminals from the A1 lead, the left output terminal of the S flip-flop and the right output terminal of the C flip-flop. The signals from the "and" network 932 are introduced through an "or" network 936 to an input terminal of an "and" network 938. The signals from the "and" network 934 and the signals on the output line 278 of the position counter 240 also pass through the "or" network 936 to the "and" network 938. The signals introduced to the "and" network 938 from the "or" network 936 pass through the "and" network on a synchronized basis in accordance with the clock signals from the source 220 and trigger the Yd flip-flop to the false state.

Stages for controlling the triggering of the Yn flip-flop are also shown in FIGURE 17. These stages include "and" networks 940, 942, 944 and 946. The "and" network 940 receives signals passing through an "or" network 948 from the right output terminals of the R and Go flip-flops. Other input terminals of the "and" network 940 are connected to the left output terminal of the Yr flip-flop and the right output terminals of the Yd and Yc flip-flops. The operation of the "and" network 942 is dependent upon the characteristics of the signals introduced to the "and" network from the left output terminals of the S and Yd flip-flops and the right output terminals of the Yr and Yc flip-flops. Signals are applied to input terminals of the "and" network 944 from the left output terminals of the S and Yc flip-flops and the right output terminals of the Yd and Yr flip-flops. Connections are made to the input terminals of the "and" network 946 from the left output terminals of the Yr, Yd and Yc flip-flops.

The signals from the "and" networks 940, 942, 944 and 946 pass through an "or" network 948 to an input terminal of an "and" network 950 having another input terminal connected to the clock source 220. The signals from the "and" network 950 trigger the Yn flip-flop to the true state. The Yn flip-flop becomes triggered to the false state by signals from an "and" network 952, the operation of which is dependent upon the signals from the clock source 220 and from a yn inverter. The yn inverter operates to invert the signals from the "or" network 948.

Signals also pass through the "or" network 948 from an "and" network 954, the input terminals of which are connected to an "or" network 956 and the left output terminals of the Ir and Go flip-flops. The "or" network 956 receives signals from the left output terminal of the R flip-flop and from an "and" network 958. The operation of the "and" network 958 is dependent upon the signals produced on the right output terminals of the F and ΔZe flip-flops and upon the signals on the movable arm of an Rs switch.

Signals from "and" networks 960 and 962 respectively trigger the Yc flip-flop to the true and false states. The "and" network 960 has input terminals connected to the clock source 220, the left output terminals of the Yr and Yd flip-flops and the right output terminal of the R flip-flop. Connections are made to the input terminals of the "and" network 962 from the clock source 220 and the right output terminals of the Yr and Yd flip-flops.

Figure 18:
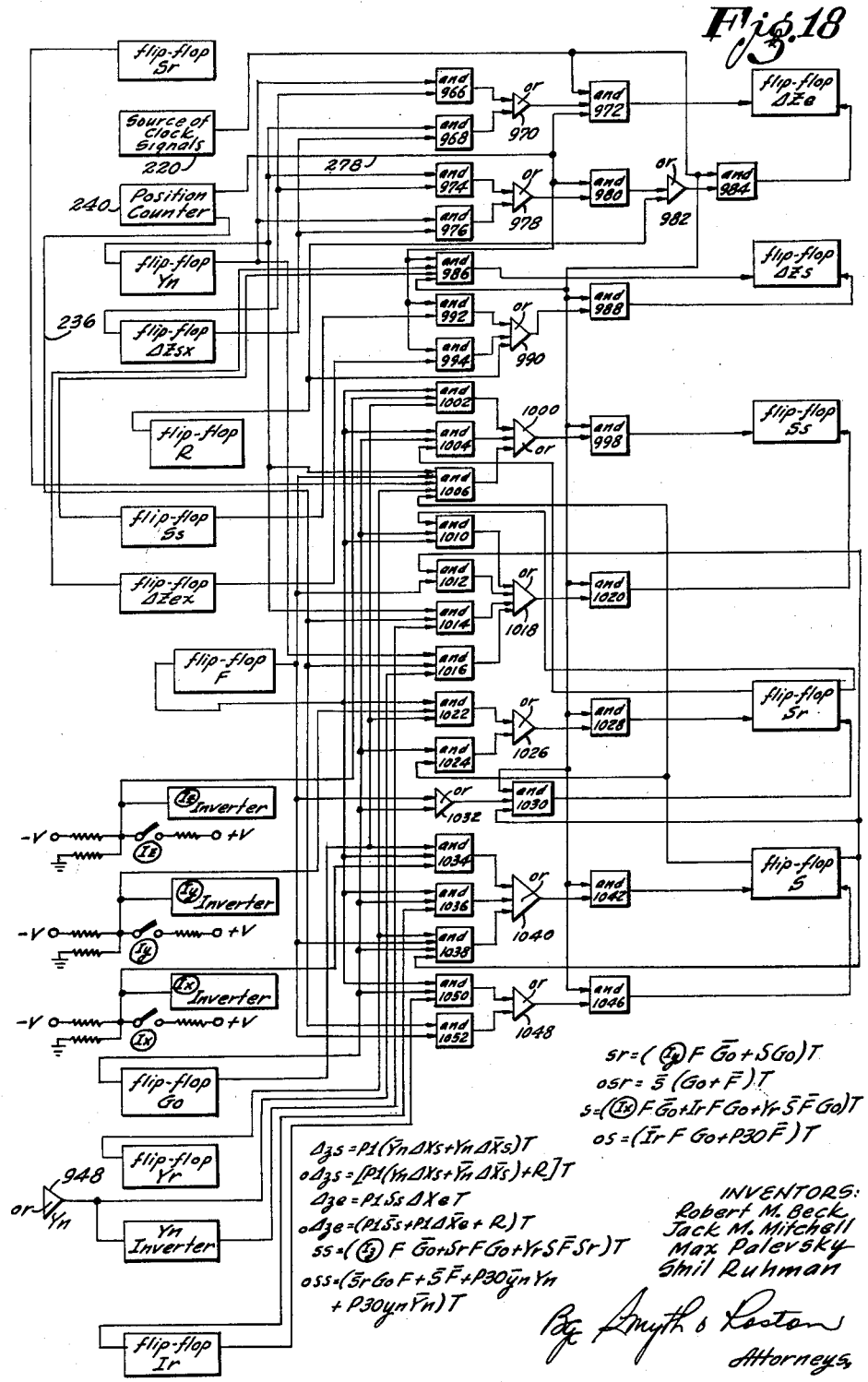

"And" networks 966 and 968 are shown in FIGURE 18. The operation of the "and" network 966 is controlled by signals on the left output terminal of the ΔZsx flip-flop and on the right output terminal of the Yn flip-flop. The operation of the "and" network 968 is operatively controlled by the signals on the left output terminal of the Yn flip-flop and the right output terminal of the ΔZsx flip-flop. The signals from the "and" networks 966 and 968 pass through an "or" network 970 to an input terminal of an "and" network 972 having other input terminals connected to the clock source 220 and to the output line 278 of the counter 240. The signals from the "and" network 972 are introduced to the left input terminal of the ΔZe flip-flop.

"And" networks 974 and 976 control in part the introduction of triggering signals to the right input terminal of the ΔZe flip-flop. The "and" network 974 has input terminals connected to the left output terminals of the Yn and ΔZsx flip-flops. Input terminals of the "and" network 976 are connected to the right output terminals of the Yn and ΔZsx flip-flops. The signals from the "and" networks 974 and 976 are introduced through an "or" network 978 to an input terminal of an "and" network 980, other input terminals of which are connected to the output line 278 of the counter 240. The signals from the "and" network 980 in turn pass through an "or" network 982 to an input terminal of an "and" network 984 having another input terminal connected to the clock source 220. The signals of particular characteristics on the left output terminal of the R flip-flop also pass through the "or" network 982 to the "and" network 984. Signals from the "and" network 984 trigger the ΔZe flip-flop to the false state.

An "and" network 986 has input terminals connected to the clock source 220, the output line 278 of the counter 240 and the left output terminals of the Ss and ΔZex flip-flops. The signals from the "and" network 986 trigger the ΔZs flip-flop to the true state. The ΔZs flip-flop becomes triggered to the false state by signals from an "and" network 988, input terminals of which are connected to the clock source 220 and to an "or" network 990. The "or" network 990 receives the signals on the left output terminal of the R flip-flop and the signals from "and" networks 992 and 994. The "and" network 992 passes a signal upon the simultaneous introduction of signals of particular characteristics from the output line 278 of the counter 240 and from the right output terminal of the Ss flip-flop. The "and" network 994 becomes activated when signals of particular characteristics are simultaneously introduced from the output line 278 and the right output terminal of the ΔZex flip-flop.

The Ss flip-flop becomes triggered to the true state by signals from an "and" network 998, input terminals of which are connected to the clock source 220 and to an "or" network 1000. Signals pass through the "or" network 1000 from the "and" networks 1002, 1004 and 1006. The "and" network 1002 has input terminals connected to the movable arm of the (c) switch, the left output terminal of the F flip-flop and the right output terminal of the Go flip-flop. Signals are applied to input terminals of the "and" network 1004 from the left output terminals of the F, Sr and Go flip-flops. The "and" network 1006 becomes activated when signals of particular characteristics are simultaneously introduced to its input terminals from the left output terminals of the Yr, Yn, S and Sr switches and the right output terminal of the F flip-flop.

"And" networks 1010, 1012, 1014 and 1016 control in part the introduction of triggering signals to the right input terminal of the Ss flip-flop. Input terminals of the "and" network 1010 are connected to the left output terminals of the F and Go flip-flops and the right output terminals of the Sr flip-flop. The "and" network 1012 has signals applied to it from the right output terminals of the F and S flip-flops. The "and" network 1014 is activated upon the simultaneous introduction of signals of particular characteristics from the output line 236 of the counter 240, the yn inverter and the left output terminal of the Yn flip-flop. Connections are made to input terminals of the "and" network 1016 from the output line 236, the "or" network 948 (also shown in FIGURE 17) and the right output terminal of the Yn flip-flop. The signals from the "and" networks 1010, 1012, 1014 and 1016 pass through an "or" network 1018 to an input terminal of "and" network 1020, another input terminal of which is connected to the clock source 220. The signals from the "and" network 1020 trigger the Ss flip-flop to the false state.

"And" networks 1022 and 1024 are associated with each other. The "and" network 1022 receives the signals on the movable arm of the (b) switch and the right output terminals of the F and Go flip-flops. The "and" network 1024 has signals applied to it from the left output terminals of the S and Go flip-flops. The signals from the "and" networks 1022 and 1024 are introduced through an "or" network 1026 to the input terminal of an "and" network 1028, another input terminal of which is connected to the clock source 220. The signals from the "and" network 1028 trigger the Sr flip-flop to the true state.

The Sr flip-flop becomes triggered to the false state by signals from an "and" network 1030, which becomes activated in accordance with the introduction of signals from the clock source 220, an "or" network 1032 and the right output terminal of the S flip-flop. The "or" network 1032 passes the signals of particular characteristics from the right output terminal of the F flip-flop and the left output terminal of the Go flip-flop.

"And" networks 1034, 1036 and 1038 are also shown in FIGURE 18. The "and" network 1034 has signals applied to it from the movable arm of the (Ir) switch, the right output terminal of the Go flip-flop and the left output terminal of the F flip-flop. The "and" network 1036 receives signals from the left output terminals of the F, Ir and Go flip-flops. Input terminals of the "and" network 1038 are connected to the left output terminals of the Yr and Go flip-flops and the right output terminals of the F and S flip-flops. The signals from the "and" networks 1034, 1036 and 1038 pass through an "or" network 1040 to input terminal of an "and" network 1042, another input terminal of which is connected to the clock source 220. The signals from the "and" network 1042 trigger the S flip-flop to the true state.

The S flip-flop becomes triggered to the false state by signals from an "and" network 1046 having input terminals to the clock source 220 and to an "or" network 1048. The "or" network 1048 receives signals from "and" networks 1050 and 1052. The "and" network 1050 has input terminals connected to the right output terminal of the Ir flip-flop and the left output terminals of the F and Go flip-flops. Connections are made to the input terminals of the "and" network 1052 from the right output terminal of the F flip-flop and from the output line 236 of the counter 240.

Figure 19:
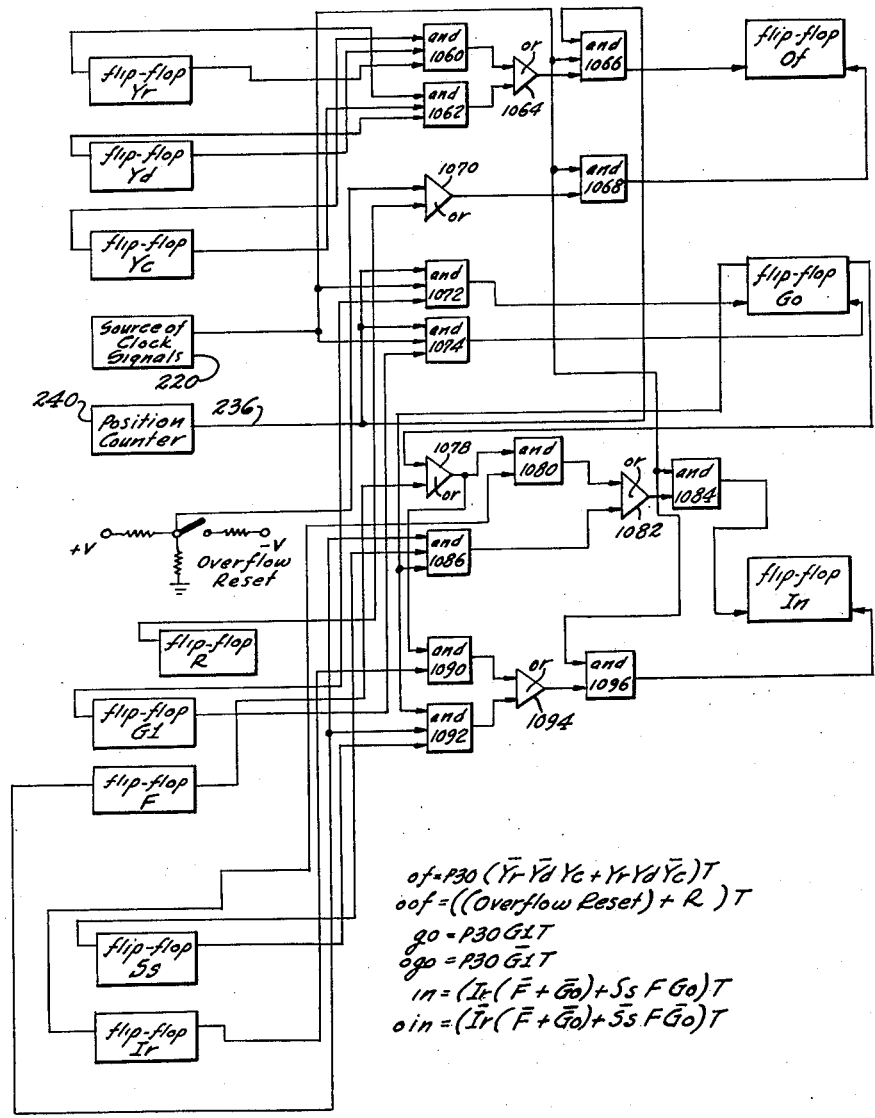

An "and" network 1060 in FIGURE 19 receives signals from the left output terminal of the Yc flip-flop and the right output terminals of the Yr and Yd flip-flops. Signals are applied to the "and" network 1062 from the left output terminals of the Yr and Yd flip-flops and the right output terminal of the Yc flip-flop. The signals from the "and" networks 1060 and 1062 pass through an "or" network 1064 to an input terminal of an "and" network 1066, other input terminals of which are connected to the clock source 220 and to the output line 236 of the counter 240.

The signals from the "and" network 1066 are introduced to the left input terminal of the Of flip-flop to trigger the flip-flop to the true state. The Of flip-flop becomes triggered to the false state by signals from an "and" network 1068, input terminals of which are connected to the clock source 220 and to an "or" network 1070. Signals pass through the "or" network 1070 from the left output terminals of the R flip-flop and the Overflow Reset switch.

A Go flip-flop becomes respectively triggered to the true and false states in accordance with the introduction of signals from "and" networks 1072 and 1074. The "and" network 1072 has signals applied to it from the clock source 220, the output line 236 of the counter 240 and the left output terminal of the G1 flip-flop. The "and" network 1074 is operatively controlled by signals from the clock source 220, the output line 236 and the right output terminal of the G1 flip-flop.

An "or" network 1078 has input terminals connected to the right output terminals of the Go and F flip-flops. Signals pass through the "or" network 1078 to an input terminal of an "and" network 1080, the operation of which is also dependent upon the characteristics of the signals from the left output terminal of the Ir flip-flop. The output signals from the "and" network 1080 pass through an "or" network 1082 to an input terminal of an "and" network 1084, another input terminal of which is connected to the clock source 220. The signals from the "and" network 1084 trigger the In flip-flop to the true state. The "and" network 1084 also receives signals passing through the "or" network 1082 from an "and" network 1086. The "and" network 1086 becomes activated upon the simultaneous introduction of signals of particular characteristics from the left output terminals of the F, Ss and Go flip-flops.

The signals from the "or" network 1078 are also introduced to an input terminal of an "and" network 1090 having another input terminal connected to the right output terminal of the Ir flip-flop. The "and" network 1090 is associated with an "and" network 1092, the operation of which is controlled by the signals on the left output terminals of the F and Go flip-flops and the right output terminal of the Ss flip-flop. The signals from the "and" networks 1090 and 1092 pass through an "or" network 1094 to an input terminal of an "and" network 1096, another input terminal of which is connected to the clock source 220. The signals from the "and" network 1096 trigger the In flip-flop to the false state.

The operation of an A flip-flop is controlled by the stages shown in FIGURE 20. These stages include "and" networks 1100, 1102 and 1104. The "and" network 1104 has input signals applied to it from the left output terminals of the $\Delta Zsy1$, $\Delta Zey2$ and $\Delta Zsy2$ flip-flops and an output line 1106 of the position counter 240. The "and" network 1102 receives signals from the output line 1106, the left output terminals of the $\Delta Zey1$ and $\Delta Zsy1$ flip-flop and the right output terminal of the $\Delta Zey2$ flip-flop. The "and" network 1104 has input terminals connected to the output line 1106, the left output terminals of the $\Delta Zey2$, $\Delta Zsy2$ and $\Delta Zsy3$ flip-flops and the right output terminal of the $\Delta Zsy1$ flip-flop.

"And" networks 1100, 1102 and 1104 are associated with "and" networks 1108, 1110 and 1112. The "and" network 1108 is operatively controlled by the signals on the output line 1106, the left output terminals of the $\Delta Zey3$ and $\Delta Zsy3$ flip-flops and the right output terminal of the $\Delta Zey2$ flip-flop. The "and" network 1110 becomes activated when signals of particular characteristics are simultaneously introduced to its input terminals from the output line 1106, the left output terminals of the $\Delta Zey2$ and $\Delta Zsy2$ flip-flops and the right output terminals of the $\Delta Zsy1$, $\Delta Zey3$ and $\Delta Zsy3$ flip-flops. The input terminals of the "and" network 1112 are connected to the output line 1106 and the left output terminals of the $\Delta Zey1$, $\Delta Zsy1$, Zey3 and Zsy3 flip-flops.

"And" networks 1114, 1116 and 1118 are also associated with the "and" networks described in the last two paragraphs. The "and" network 1114 passes a signal when signals of particular characteristics are simultaneously introduced to its input terminals from an output line 1129 of the counter 240, the left output terminals of the D and E flip-flops and the right output terminals of the A and B flip-flops. The "and" network 1116 receives signals at its input terminals from the output line 1129, the left output terminals of the D and K flip-flops and the right output terminals of the A and B flip-flops. The operation of the "and" network 1118 is controlled by signals from the output line 1129, the left output terminals of the B, D, E and K flip-flops and the right output terminal of the A flip-flop. The signals from the "and" networks 1114, 1116 and 1118 and from the "and" networks 1100, 1102, 1104, 1108, 1110 and 1112 pass through an "or" network 1120 to an input terminal of an "and" network 1122, another input terminal of which is connected to the clock source 220. The signals from the "and" network 1122 trigger the A flip-flop to the true state.

The A flip-flop becomes triggered to the false state by signals from an "and" network 1124, input terminals of which are connected to the clock source 220 and to an "or" network 1126. The "or" network 1126 receives signals from "and" networks 1128, 1130, 1132 and 1134. The operation of the "and" network 1128 is dependent upon the characteristics of the signals applied to its input terminals from the output line 396 of the counter 240 and the left output terminal of the A flip-flop. The "and" network 1130 becomes activated when signals of particular characteristics are simultaneously introduced to its input terminals from the output line 1129, the left output terminals of the A and E flip-flops and the right output terminals of the B and D flip-flops. The "and" network 1132 has input terminals connected to the output line 1129, the left output terminals of the A and K flip-flops and the right output terminals of the B and D flip-flops. Connections are made to input terminals of the "and" network 1134 from the output line 1129, the left output terminals of the A, B, E and K flip-flops and the right output terminal of the D flip-flop.

The stages for controlling the operation of the B and C flip-flops are shown in FIGURE 21. These stages include "and" networks 1136, 1138 and 1140. The "and" network 1136 is operatively controlled by signals from the output line 1106 of the counter 240 and the left output terminals of the $\Delta Zsy1$, $\Delta Zey2$, $\Delta Zsy2$, $\Delta Zey3$ and $\Delta Zsy3$ flip-flops. The "and" network 1138 becomes activated upon the simultaneous introduction of signals of particular characteristics from the output line 1106, the left output terminals of the $\Delta Zey1$, $\Delta Zsy1$, $\Delta Zey3$ and $\Delta Zsy3$ flip-flops and the right output terminal of the $\Delta Zey2$ flip-flop. The "and" network 1140 has input terminals connected to the output line 1106, the left output terminals of the $\Delta Zey2$, $\Delta Zsy2$, $\Delta Zey3$ and $\Delta Zsy3$ flip-flops and the right output terminals of the $\Delta Zey1$ flip-flop.

"And" networks 1142, 1144, 1146 and 1148 are also shown in FIGURE 11. The "and" network 1142 receives signals at its input terminals from the output line 1106, the left output terminals of the $\Delta Zey2$ and $\Delta Zey3$ flip-flops and the right output terminals of the $\Delta Zsy1$, $\Delta Zsy2$ and $\Delta Zsy3$ flip-flops. The "and" network 1144 becomes activated when signals of particular characteristics are simultaneously introduced to its input terminals from the output line 1106, the left output terminals of the $\Delta Zey1$ and $\Delta Zey3$ flip-flops and the right output terminals of the $\Delta Zsy1$, $\Delta Zey2$ and $\Delta Zsy3$ flip-flops. The "and" network 1148 has input terminals connected to the output line 1106, the left output terminals of the $\Delta Zey1$, $\Delta Zsy1$, $\Delta Zey2$ and $\Delta Zsy2$ flip-flops and the right output terminal of the $\Delta Zey3$ flip-flop.

An "and" network 1150 is operatively controlled by the signals on the output line 1106, the left output terminals of the $\Delta Zey1$ and $\Delta Zey2$ flip-flops and the right output terminals of the $\Delta Zsy1$, $\Delta Zsy2$ and $\Delta Zey3$ flip-flops. Signals pass through an "and" network 1152 upon the simultaneous introduction of signals of particular characteristics from the right output terminal of the S flip-flop and from the left output terminal of the $Yr$ flip-flop. The signals from the "and" network 1152 and from the left output terminal of the S flip-flop pass through an "or" network 1154 to an input terminal of an "and" network 1156, other input terminals of which are connected to the left output terminal of the C flip-flop and the right output terminal of the A flip-flop.

The signals from the "and" network 1156 and from the "and" networks 1136, 1138, 1140, 1142, 1144, 1146, 1148 and 1150 pass through an "or" network 1160 to an input terminal of an "and" network 1162, another input terminal of which is connected to the clock source 220. The signals from the "and" network 1162 trigger the B flip-flop to the true state.

The B flip-flop becomes triggered to the false state by signals from an "and" network 1166, input terminals of which are connected to the clock source 220, to the left output terminal of the B flip-flop and to an "or" network 1168. The "or" network receives the signals from the output lines 396 and 1129 of the position counter 240.

"And" networks 1172, 1174 and 1176 are also shown in FIGURE 21. The "and" network 1172 has input terminals connected to the output line 1106 and the left output terminals of the $\Delta Zey1$, $\Delta Zey2$ and $\Delta Zey3$ flip-flops. The "and" network 1174 receives at its input terminals signals from the output line 1106, the left output terminal of the $\Delta Zey1$ flip-flop and the right output terminals of the $\Delta Zey2$ and $\Delta Zey3$ flip-flops. The "and" network 1176 is operatively controlled by signals from output line 1106, the left output terminal of the $\Delta Zey2$ flip-flop and the right output terminals of the $\Delta Zey1$ and $\Delta Zey3$ flip-flops. Connections are made to input terminals of the "and" network 1178 from the output line 1106, the left output terminal of the $\Delta Zey3$ flip-flop and the right output terminals of the $\Delta Zey1$ and $\Delta Zey2$ flip-flops.

"And" networks 1179, 1180 and 1182 are associated with the "and" networks 1172, 1174, 1176 and 1178. The "and" network 1179 has input terminals connected to the output line 1129, the left output terminal of the K flip-flop and the right output terminal of the C flip-flop. The "and" networks 1180 and 1182 both receive signals from the "or" network 1168. The "and" network 1180 also has signals applied to it from the left output terminal of the D flip-flop and the right output terminal of the B flip-flop. Similarly, the "and" network 1182 has signals applied to it from the left output terminal of the B flip-flop and the right output terminal of the D flip-flop. The signals from the "and" networks 1172, 1174, 1176, 1178, 1179, 1180 and 1182 pass through an "or" network 1184 to an input terminal of an "and" network 1186, another input terminal of which is connected to the clock source 220. The signals from the "and" network 1186 are in turn introduced to the left input terminal of the C flip-flop.

"And" networks 1188, 1190 and 1192 control in part the introduction of signals to the right input terminal of the C flip-flop. The "and" network 1188 has input terminals connected to the output line 1129 of the counter 240 and the left output terminals of the C and K flip-flops. The "and" network 1190 is operatively controlled by signals from the "or" network 1168 and the right output terminals of the B and D flip-flops. The "and" network 1192 becomes activated upon the simultaneous introduction of signals of particular characteristics from the "or" network 1168 and the left output terminals of the D and B flip-flops. The signals of "and" networks 1188, 1190 and 1192 and from the output line 396 pass through an "or" network 1194 to an input terminal of an "and" network 1196, the operation of which is synchronized by the signals from the clock source 220. The signals from the "and" network 1196 in turn pass to the ring input terminal of the C flip-flop.

Figure 22:
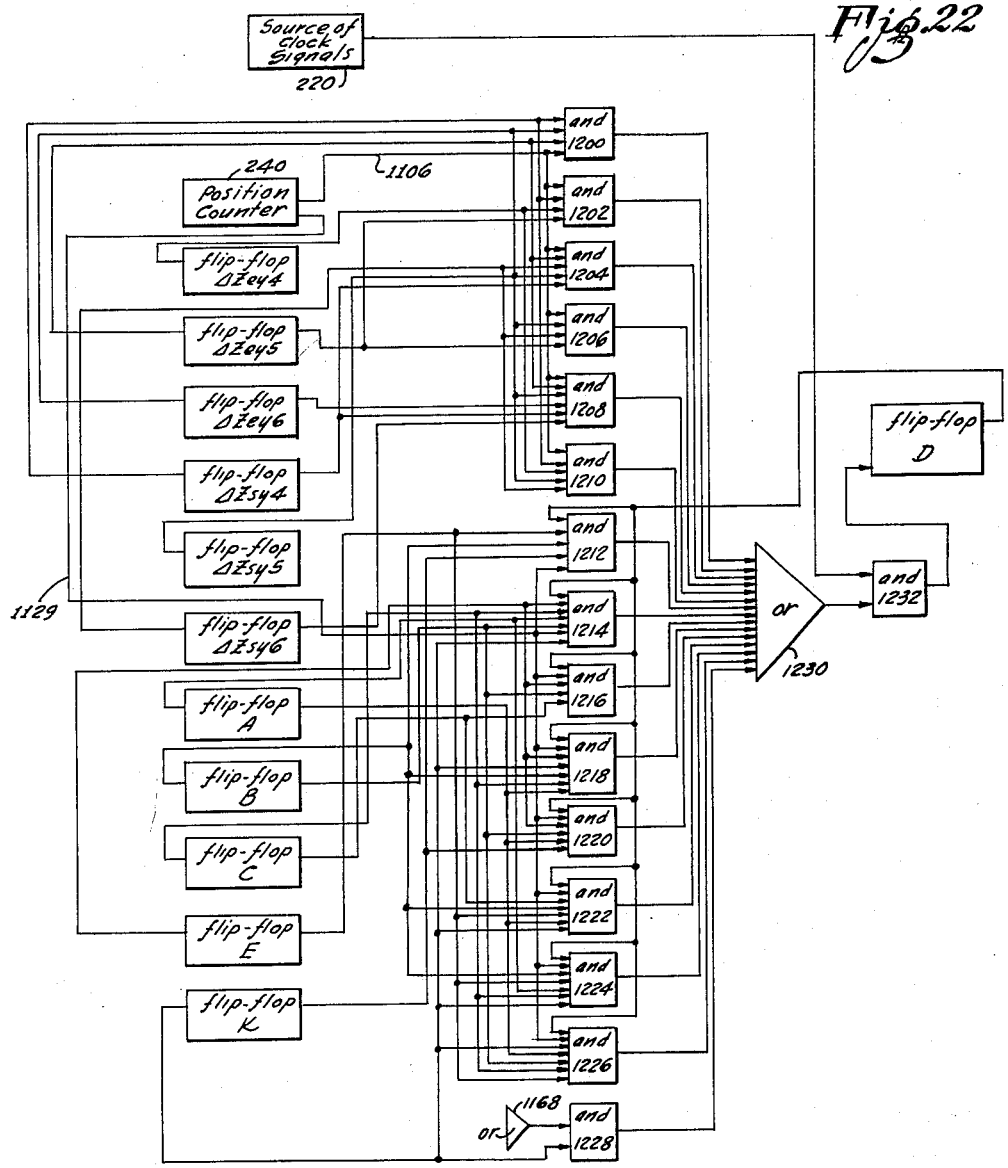

Connections are made to the input terminals of an "and" network 1200 in FIGURE 22 from the output line 1106 and the left output terminals of the $\Delta Zsy4$, $\Delta Zey5$ and the $\Delta Zsy5$ flip-flops. And "and" network 1202 has input terminals connected to the output line 1106, the left output terminals of the $\Delta Zey4$ and $\Delta Zsy4$ flip-flops and the right output terminal of the $\Delta Zey5$ flip-flop. An "and" network 1204 becomes activated upon the simultaneous introduction of signals of particular characteristics from the output line 1106, the left output terminals of the $\Delta Zey5$, $\Delta Zsy5$ and $\Delta Zsy6$ flip-flops and the right output terminal of the $\Delta Zsy4$ flip-flop. An "and" network 1206 has signals applied to its input terminals from the output line 1106, the left output terminals of the $\Delta Zey6$ and $\Delta Zsy6$ flip-flops and the right output terminal of the $\Delta Zey5$ flip-flop.

"And" networks 1208, 1210, 1212 and 1214 are associated with the "and" networks 1200, 1202, 1204 and 1206. The operation of the "and" network 1208 is dependent upon the simultaneous introduction of signals of particular characteristics from the output line 1106, the left output terminals of the $\Delta Zey5$ and $\Delta Zsy5$ flip-flops and the right output terminals of the $\Delta Zsy4$, $\Delta Zey6$ and $\Delta Zsy6$ flip-flops. The "and" network 1210 receives signals at its input terminals from the output line 1106 and the left output terminals of the $\Delta Zey4$, $\Delta Zsy4$, $\Delta Zey6$ and $\Delta Zsy6$ flip-flops. The operation of the "and" network 1212 is dependent upon the characteristics of the signals introduced to the "and" network from the output line 1129, the left output terminal of the B flip-flop and the right output terminals of the D, E and K flip-flops. The "and" network 1214 is operatively controlled by the signals from the output line 1129, the left output terminals of the A, C, K and E flip-flops and the right output terminals of the B and D flip-flops.

"And" networks 1216, 1218, 1220 and 1222 are also shown in FIGURE 22. The operation of the "and" network 1216 is dependent upon the characteristics of the signals from the left output terminal of the E flip-flop and the right output terminals of the B, C and D flip-flops. The "and" network 1218 receives signals at its input terminals from the output line 1129, the left output terminals of the B, C, E and K flip-flops and the right output terminals of the A and D flip-flops. The "and" network 1220 has signals introduced to its input terminals from the output line 1129, the left output terminal of the E flip-flop and the right output terminals of the A, B, D and K flip-flops. Input terminals of the "and" network 1222 are connected to the output line 1129, the left output terminals of the B and K flip-flops and the right output terminals of the A, C, D and E flip-flops.

FIGURE 22 also includes "and" networks 1224, 1226 and 1228. The "and" network 1224 receives signals from the output line 1129, the left output terminals of the A, B, C, and K flip-flops and the right output terminals of the D and E flip-flops. The "and" network 1226 is operatively controlled by the signals on the output line 1129, the left output terminals of the C and K flip-flops and the right output terminals of the A, B, D and E flip-flops. The signals from the "or" network 1168 and from the left output terminal of the K flip-flop are introduced to the "and" network 1228. The signals from the "and" networks 1224, 1226 and 1228 and from the "and" networks 1200 to 1222, inclusive (even numbers only), pass through an "or" network 1230 to an input terminal of an "and" network 1232, another input terminal of which is connected to the clock source 220. The signals from the "and" network 1232 trigger the D flip-flop to the true state.

Figure 23:
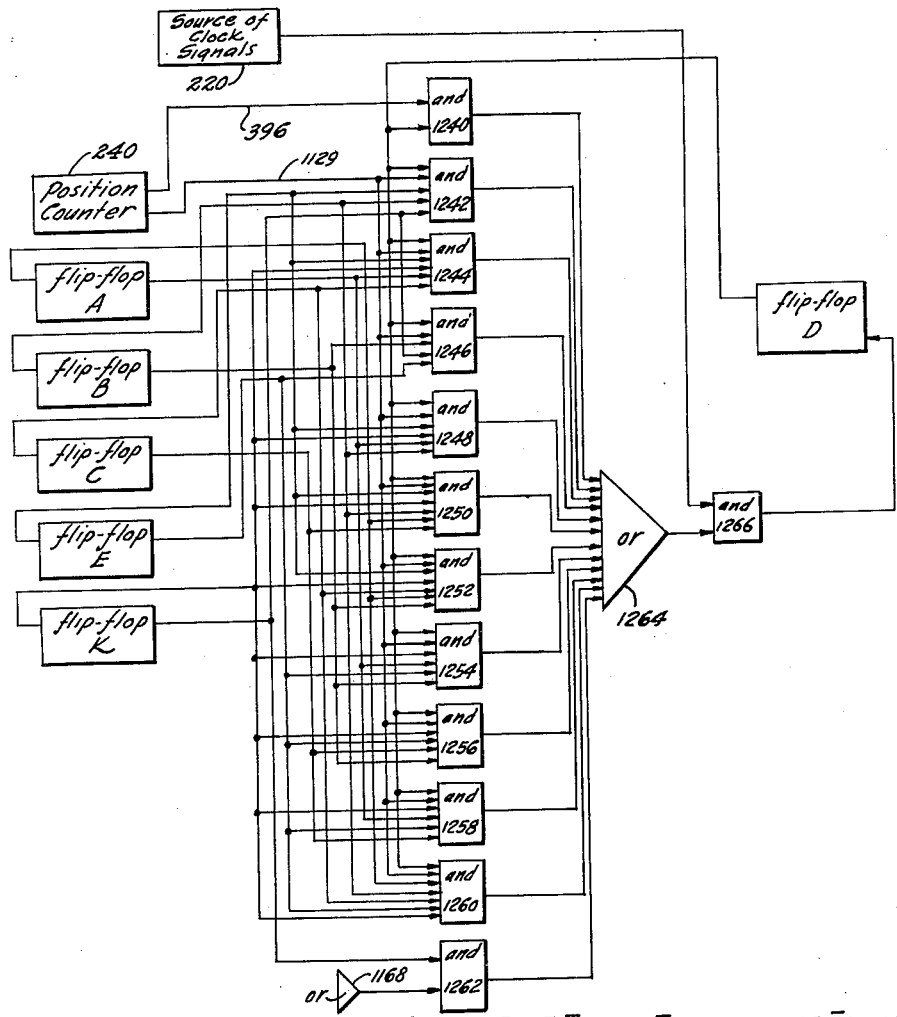

"And" networks 1240, 1242 and 1244 are shown in FIGURE 23. The "and" network 1240 is connected to the output line 396 of the position counter 240 and to the left output terminal of the D flip-flop. The "and" network 1242 is operatively controlled by signals from the output line 1129 of the counter 240, the left output terminals of the B, D and E flip-flops and the right output terminal of the K flip-flop. The "and" network 1244 becomes activated upon the simultaneous introduction of signals of particular characteristics from the output line 1129, the left output terminals of the C, D and E flip flops and the right output terminals of the A and K flip-flops.

The "and" networks 1240, 1242 and 1244 are associated with "and" networks 1246, 1248 and 1250. The operation of the "and" network 1246 is dependent upon the characteristics of the signals from the output line 1229, the left output terminal of the D flip-flop and the right output terminals of the B, E and K flip-flops. The "and" network 1248 receives signals at its input terminals from the output line 1129, the left output terminals of the B, D, E and K flip-flops and the right output terminal of the A flip-flop. Connections are made to the input terminals of the "and" network 1250 from the output line 1129, the left output terminals of the A, B, D, E and K flip-flops and the right output terminal of the C flip-flop.

"And" networks 1252, 1254 and 1256 are also shown in FIGURE 23. The "and" network 1254 has signals applied to its input terminals from the output line 1129, the left output terminal of the A, C, D, E and K flip-flops and the right output terminal of the B flip-flop. The "and" network 1256 has input terminals connected to the output line 1129, the left output terminals of the D and K flip-flops and the right output terminals of the A, B and E flip-flops. Connections are made to the input terminals of the "and" network 1258 from the output line 1129, the left output terminals of the D and K flip-flops and the right output terminals of the B, C and E flip-flops.

FIGURE 23 also includes "and" networks 1258, 1260 and 1262. The "and" network 1258 becomes activated when signals of particular characteristics are simultaneously introduced to its input terminals from the output line 1129, the left output terminals of the D and K flip-flops and the right output terminals of the A, C and E flip-flops. The "and" network 1260 passes a signal when signals of particular characteristics are simultaneously introduced to its input terminals from the output line 1129, the left output terminals of the A, B, C, D and K flip-flops and the right output terminal of the E flip-flop. The "and" network 1262 has input terminals connected to the "or" network 1168 and to the right output terminal of the K flip-flop. The signals from the "and" network 1250, 1260 and 1262 and from the "and" networks 1240 to 1256, inclusive (even numbers only), pass through an "or" network 1264 to an input terminal of an "and" network 1266, another input terminal of which is connected to the clock source 220. The signals from the "and" network 1266 are in turn introduced to the right input terminal of the D flip-flop.

Stages including the "and" networks 1270, 1272, 1274 and 1276 are shown in FIGURE 24 for controlling the operation of the E flip-flop. The "and" network 1270 is operatively controlled by signals from the output line 1106 of the counter 240 and the left output terminals of the $\Delta Zsy4$, $\Delta Zsy5$, $\Delta Zsy6$, $\Delta Zey5$ and $\Delta Zey6$ flip-flops. Signals are applied to input terminals of the "and" network 1272 from the output line 1106 and the left output terminals of the $\Delta Zey4$, $\Delta Zey6$, $\Delta Zsy4$ and $\Delta Zsy6$ flip-flops and the right output terminal of the $\Delta Zey5$ flip-flop. The "and" network 1274 becomes activated in accordance with the characteristics of the signals introduced from the output line 1106, the left output terminals of the $\Delta Zey5$, $\Delta Zey6$, $\Delta Zsy5$ and $\Delta Zsy6$ flip-flops and the right output terminal of the $\Delta Zey4$ flip-flop. The operation of the "and" network 1276 is controlled by the signals from the output line 1106, the left output terminals of the $\Delta Zey5$ and $\Delta Zey6$ flip-flops and the right output terminals of the $\Delta Zsy4$, $\Delta Zsy5$ and $\Delta Zsy6$ flip-flops.

"And" networks 1278, 1280, 1282 and 1284 are associated with the "and" networks 1270, 1272, 1274 and 1276. The "and" network 1278 receives input signals from the output line 1106, the left output terminals of the $\Delta Zey4$ and $\Delta Zey6$ flip-flops and the right output terminals of the $\Delta Zsy4$, $\Delta Zey5$ and $\Delta Zsy6$ flip-flops. The "and" network 1280 has input terminals connected to the output line 1106, the left output terminals of the $\Delta Zey5$ and $\Delta Zey6$ flip-flops and the right output terminals of the $\Delta Zey4$, $\Delta Zsy5$ and $\Delta Zsy6$ flip-flops. Signals are introduced to the "and" network 1282 from the output line 1106, the left output terminals of the $\Delta Zey4$, $\Delta Zsy4$, $\Delta Zey5$ and $\Delta Zsy6$ flip-flops and the right output terminal of the $\Delta Zey6$ flip-flops. Connections are made to the input terminals of the "and" network 1284 from the output line 1106, the left output terminals of the $\Delta Zey4$ and $\Delta Zey5$ flip-flops and the right output terminals of the $\Delta Zsy4$, $\Delta Zsy5$ and $\Delta Zey6$ flip-flops.

The signals from the "and" networks 1270 to 1284, inclusive (even numbers only) pass through an "or" network 1286 to an input terminal of an "and" network 1288, the operation of which is synchronized by signals from the clock source 220. Signals from the "and" network 1288 trigger the E flip-flop to the true state. The flip-flop becomes triggered to the false state by signals from an "and" network 1290. The operation of the "and" network 1290 is controlled by signals on the output line 396 of the counter 240 and signals from the clock source 220 and the left output terminal of the E flip-flop.

The stages for controlling the operation of the K flip-flop are also shown in FIGURE 24. These stages include "and" networks 1292, 1294 and 1296. Input terminals of the "and" network 1292 are connected to the output line 1106 and the left output terminals of the $\Delta Zey4$, $\Delta Zey5$ and $\Delta Zey6$ flip-flops. Signals are introduced to the "and" network 1294 from the output line 1106, the left output terminals of the $\Delta Zey4$ and $\Delta Zey6$ flip-flops and the right output terminal of the $\Delta Zey5$ flip-flop. The "and" network 1294 receives signals from the output line 1106, the left output terminal of the $\Delta Zey5$ flip-flop and the right output terminals of the $\Delta Zey4$ and $\Delta Zey6$ flip-flops.

"And" networks 1298, 1300 and 1302 are associated with the "and" networks 1292, 1294 and 1296. The "and" network 1298 is operatively controlled by signals from the output line 1106, the left output terminal of the $\Delta Zey6$ flip-flop and the right output terminals of the $\Delta Zey4$ and $\Delta Zey5$ flip-flops. The "and" network 1300 becomes activated when signals of particular characteristics are simultaneously introduced to its input terminals from the output line 1129, the left output terminals of the B and E flip-flops and the right output terminals of the A, D and K flip-flops. The "and" network 1302 has input terminals connected to the output line 1129, the left output terminals of the A, B, D and E flip-flops and the right output terminal of the K flip-flop. The signals from the "and" networks 1298, 1300 and 1302 and from the "and" networks 1292, 1294 and 1296 pass through an "or" network 1304 to an input terminal of an "and" network 1306, another input terminal of which is connected to the clock source 220. The signals from the "and" network 1306 trigger the K flip-flop to the true state.

"And" networks 1310, 1312, 1314 and 1316 control in part the introduction of triggering signals to the right input terminal of the K flip-flop. The operation of the "and" network 1310 is dependent upon the characteristics of the input signals from the output line 396 of the counter 240 and the left output terminal of the K flip-flop. The operation of the "and" network 1312 is controlled by the signals from the output line 1129, the left output terminals of the A and K flip-flops and the right output terminal of the D flip-flop. The "and" network 1314 receives signals from the output line 1129, the left output terminals of the D and K flip-flops and the right output terminal of the A flip-flop. The "and" network 1316 becomes activated when signals of particular characteristics are introduced to its input terminals from the "or" network 1168 and the left output terminal of the K flip-flop.

"And" networks 1318, 1320 and 1322 also control the triggering of the K flip-flop to the false state. The "and" network 1318 has signals applied to its input terminals from the output line 1129, the left output terminal of the K flip-flop and the right output terminals of the B and C flip-flops. Input terminals of the "and" network 1320 are connected to the output line 1129, the left output terminal of the K flip-flop and the right output terminals of the B and E flip-flops. Connections are made to input terminals of the "and" network 1322 from the output line 1129, the left output terminal of the K flip-flop and the right output terminals of the C and E flip-flops. The signals from the "and" networks 1310 to 1322, inclusive, pass through an "or" network 1324 to an input terminal of an "and" network 1326, another input terminal of which is connected to the clock source 220. The signals from the "and" network 1326 trigger the K flip-flop to the false state.

The $Yd$ flip-flop shown in FIGURE 17 indicates the $\Delta Y$ increment in a manner similar to that set forth previously for the corresponding flip-flop in the other embodiments. However, the servo schematically shown in FIGURE 16 and shown in detail in FIGURES 17 to 24, inclusive may receive a plurality of $\Delta Y$ increments in each cycle of computation. The $Yd$ flip-flop is operatively controlled so that it indicates in successive positions after the "start" position the resultant value of the $\Delta Y$ increments in each cycle of computation. The signals produced by the $Yd$ flip-flop are then combined with the signals representing $Yr$ from the Y delay line in each cycle of computation to obtain a new value of Y for that cycle of computation.

The number of $\Delta Y$ increments capable of being introduced to the servo integrator shown in FIGURES 17 to 24, inclusive, in each cycle of computation is dependent upon the potential applied to the A1 lead. This lead may be connected to a switch so as to be set to a particular state of operation before the commencement of any computation and is maintained in the particular state of operation until the end of the computation. When the potential on the A1 lead is relatively high, only two $\Delta Y$ increments can be combined with the value of Y in each cycle of computation. These increments may be represented as $\Delta Y1$ and $\Delta Y2$. Upon the occurrence of a low voltage on the A1 lead, however, as many as six $\Delta Y$ increments can be combined to control the operation of the $Yd$ flip-flop. These increments may be represented as $\Delta Y1$, $\Delta Y2$, $\Delta Y3$, $\Delta Y4$, $\Delta Y5$ and $\Delta Y6$.

When the A1 lead has a relatively high potential during periods of computation, the $Yd$ flip-flop becomes triggered true at the "start" position only when one of the two increments designated as $\Delta Y1$ and $\Delta Y2$ occurs in a cycle of computation. The $Yd$ flip-flop becomes triggered true under such circumstances at the "start" position since a binary value of "1" is produced in the least significant digit for the resultant value of $\Delta Y$ whether the resultant value of $\Delta Y$ is positive or negative. The logic controlling the triggering of the $Yd$ flip-flop to the true state under such circumstances can be expressed as:

$$yd = RGo\overline{A}1Yr\overline{S}(\Delta Ye1\Delta \overline{Y}e2 + \Delta \overline{Y}e1\Delta Ye2)T \quad (123)$$

With a relatively high potential on the A1 lead, the $Yd$ flip-flop remains false in the position of least digital significance when neither a $\Delta Y1$ increment nor a $\Delta Y2$ increment occurs in a cycle of computation or when both $\Delta Y1$ and $\Delta Y2$ increments occur in a cycle of computation. However, the $Yd$ flip-flop becomes triggered true in the position of second least digital significance when both $\Delta Y1$ and $\Delta Y2$ increments occur in a cycle of computation and when both increments have the same polarity. The reason is that the addition of two increments of the same polarity gives a value of "2." This is equivalent to a binary value of "0" in the position of least digital significance and a binary value of "1" in the position of second least digital significance. The $Yd$ flip-flop becomes triggered true in the position of second least digital significance in accordance with the following logical equation:

$$yd = RGo\overline{A}1S\overline{S}r\Delta Ye1\Delta Ye2(\Delta Ys1\Delta Ys2 + \Delta \overline{Y}s1\Delta \overline{Y}s2)T \quad (124)$$

When the $Yd$ flip-flop becomes triggered true in the position of least digital significance or in the position of second least digital significance, the $Yd$ flip-flop becomes triggered false in the following digital position when either one of the $\Delta Y1$ or $\Delta Y2$ increments is positive. The reason is that the resultant incremental value indicated by the $Yd$ flip-flop cannot be negative when at least one of the $\Delta Y1$ and $\Delta Y2$ increments is positive. The $Yd$ flip-flop is triggered false at such time since a positive value for $\Delta Y$ is indicated by binary values of "0" in the positions of higher significance. The triggering of the $Yd$ flip-flop to the false state in this manner occurs in the following logical equation:

$$oyd = \overline{A}1(\Delta Ye1\Delta Ys1 + \Delta Ye2\Delta Ys2)T \quad (125)$$

When the potential on the A1 lead is relatively low, as many as 6 $\Delta Y$ increments can be combined to control the operation of the $Yd$ flip-flop in each cycle of computation. These increments may be designated as $\Delta Y1$, $\Delta Y2$, $\Delta Y3$, $\Delta Y4$, $\Delta Y5$ and $\Delta Y6$ and may be combined in accordance with the operation of the stages shown in FIGURES 20 to 24, inclusive. The A, B and C flip-flops shown in FIGURES 20 and 21 operate to combine the $\Delta Y1$, $\Delta Y2$ and $\Delta Y3$ increments to determine the resultant value of these increments and the polarity of the resultant value in each cycle of computation. Similarly, the D, E and K flip-flops shown in FIGURES 22, 23 and 24 operate to combine the $\Delta Y4$, $\Delta Y5$ and $\Delta Y6$ increments in each cycle of computation to determine the resultant value of these increments and the polarity of the resultant value in that cycle of computation.

The A, B, C, D and K flip-flops then operate to combine the resultant value of the $\Delta Y1$, $\Delta Y2$ and $\Delta Y3$ increments and the resultant value of the $\Delta Y4$, $\Delta Y5$ and $\Delta Y6$ increments to obtain a total value. This total value is stepped from the C flip-flop to the $Yd$ flip-flop in the positions after the start pulse. The stepping occurs in accordance with the following logical equations:

$$yd = A1C(Yr\overline{S}+S)T \quad (126)$$

$$oyd = A1S\overline{C}T \quad (127)$$

The A flip-flop shown in FIGURE 20 operates at position 4 in each cycle of computation to determine the polarity of the resultant value obtained by combining the $\Delta Y1$, $\Delta Y2$ and $\Delta Y3$ increments. A positive polarity for the sum of the $\Delta Y1$, $\Delta Y2$ and $\Delta Y3$ increments is indicated by a true state of the A flip-flop, as is a value of "0," which can occur when only two of the increments are produced. A negative polarity of the sum of the $\Delta Y1$, $\Delta Y2$ and $\Delta Y3$ increments is indicated by a false state of operation of the A flip-flop.

In view of the statements in the previous paragraphs relating to the operation of the A flip-flop, the A flip-flop becomes triggered true when only two increments actually occur and one of the increments is positive. The A flip-flop also becomes triggered true when one increment is positive and one of the two possible other increments does not occur. The A flip-flop also becomes triggered true when one of the three possible increments occurs and is positive and when one of the two other possible increments is positive regardless whether this increment or the other increments actually occurs. The logic controlling the triggering of the A flip-flop under these circumstances can be simplified to:

$$a = (Pr\Delta Ys1 \Delta Ye2 \Delta Ys2 + P4 \Delta Ye1 \Delta Ys1 \Delta \overline{Y}e2$$
$$+ P4 \Delta \overline{Y}s1 \Delta Ys2 \Delta Ys3 \Delta \overline{Y}e2 + P4 \Delta \overline{Y}2 \Delta Ye3 \Delta Ys3$$
$$+ P4 \Delta \overline{Y}s1 \Delta Ye2 \Delta Ys2 \Delta \overline{Y}e3 \Delta \overline{Y}s3$$
$$+ P4 \Delta Ye1 \Delta Ys1 \Delta Ye3 \Delta Ys3)T \qquad (128)$$

The A flip-flop becomes reset at position 2 in each cycle so that it can be triggered true at position 4 in that cycle when the sum of the ΔY1, ΔY2 and ΔY3 increments is either "0" or positive. The A flip-flop becomes reset in accordance with the following logical equation:

$$oa = P2AT \qquad (129)$$

The B flip-flop indicates the value of the most significant digit for the resultant quantity obtained by adding the ΔY1, ΔY2 and ΔY3 increments. The B flip-flop becomes triggered true when the decimal value of the ΔY1, ΔY2 and ΔY3 increments is either "2" or "3" regardless of the sign of this resultant quantity. The logic controlling the triggering of the B flip-flop to the true state is expressed as:

$$b = (P4 \Delta Ys1 \Delta Ye2 \Delta Ys2 \Delta Ye3 \Delta Ys3$$
$$+ P4 \Delta Ye1 \Delta Ys1 \Delta \overline{Y}e2 \Delta Ye3 \Delta Ys3$$
$$+ P4 \Delta \overline{Y}e1 \Delta Ye2 \Delta Ys2 \Delta Ye3 \Delta Ys3$$
$$+ P4 \Delta \overline{Y}s1 \Delta Ye2 \Delta Ys2 \Delta Ye3 \Delta \overline{Y}s3$$
$$+ P4 \Delta Ye1 \Delta \overline{Y}s1 \Delta \overline{Y}e2 \Delta Ye3 \Delta \overline{Y}s3$$
$$+ P4 \Delta Ye1 \Delta \overline{Y}e2 \Delta Ys2 \Delta Ye3 \Delta \overline{Y}s3$$
$$+ P4 \Delta Ye1 \Delta Ys1 \Delta Ye2 \Delta Ys2 \Delta \overline{Y}e3$$
$$+ P4 \Delta Ye1 \Delta \overline{Y}s1 \Delta Ye2 \Delta \overline{Y}s2 \Delta \overline{Y}e3)To \qquad (130)$$

The B flip-flop becomes reset at position 2 in each cycle of operation so as to be available for triggering to the true state at position 4 in that cycle of operation. The B flip-flop also becomes reset at position 5 after its setting at position 4 so as to be available for a particular operation at the "start" position as will be described in detail subsequently. The B flip-flop can be reset to the false state at position 5 since it is not used in the combination of the two resultant values obtained by adding the ΔY1, ΔY2 and ΔY3 increments and by adding the ΔY4, ΔY5 and ΔY6 increments. The triggering of the B flip-flop to the false state can be represented as:

$$ob = (P2 + P5)BT \qquad (131)$$

The C flip-flop indicates the least significant digit of the sum of the ΔY1, ΔY2 and ΔY3 increments. Because of this, the C flip-flop becomes triggered true at position 4 in each cycle of computation when actually all of the ΔY1, ΔY2 and ΔY3 increments occur or when only one of these three increments occur. The reason is that the C flip-flop can become true only for decimal values of "1" and "3" and not for decimal values of "0" and "2." The triggering of the C flip-flop to the true state occurs in accordance with the following logical equation:

$$c = (P4 \Delta Ye1 \Delta Ye2 \Delta Ye3 + P4 \Delta Ye1 \Delta \overline{Y}e2 \Delta \overline{Y}e3$$
$$+ P4 \Delta \overline{Y}e1 \Delta \overline{Y}e2 \Delta Ye3 + P4 \Delta \overline{Y}e1 \Delta Ye2 \Delta \overline{Y}e3)T \qquad (132)$$

The D flip-flop operates in a manner similar to the A flip-flop to indicate the polarity of the resultant value obtained by combining the ΔY4, ΔY5 and ΔY6 increments. Because of this, the logic for controlling the operation of the D flip-flop at position 4 in each cycle of computation may be expressed as:

$$d = (P4 \Delta Ys4 \Delta Ye5 \Delta Ys5 + P4 \Delta Ye4 \Delta Ys4 \Delta \overline{Y}e5$$
$$+ Pr\Delta Ys4 \Delta Ye5 \Delta Ys5 \Delta Ye6 + Pr\Delta \overline{Y}e5 \Delta Ye6 \Delta Ys6$$
$$+ Pr\Delta \overline{Y}s4 \Delta Ye5 \Delta Ys5 \Delta Ye6 \Delta \overline{Y}s6$$
$$+ Pr4 \Delta Ye4 \Delta Ys4 \Delta Ye6 \Delta Ys6)T \qquad (133)$$

$$od = P2DT \qquad (134)$$

The E flip-flop operates in a manner similar to the B flip-flop to indicate the most significant digit of the resultant value obtained by adding the ΔY4, ΔY5 and ΔY6 increments in each cycle of computation. This causes the logic for the E flip-flop to be expressed as follows:

$$e = (P4 \Delta Ys4 \Delta Ye5 \Delta Ys5 \Delta Ye6 \Delta Ys6$$
$$+ P4 \Delta Ye4 \Delta Ys4 \Delta \overline{Y}e5 \Delta Ye6 \Delta Ys6$$
$$+ P4 \Delta \overline{Y}s4 \Delta \overline{Y}e5 \Delta \overline{Y}s5 \Delta Ye6 \Delta \overline{Y}s6$$
$$+ Pr\Delta \overline{Y}e4 \Delta Ye5 \Delta Ys5 \Delta Ye5 \Delta Ys6$$
$$+ P4 \Delta Ye4 \Delta \overline{Y}s4 \Delta Ye5 \Delta Ye6 \Delta \overline{Y}s6$$
$$+ P4 \Delta \overline{Y}e4 \Delta Ye5 \Delta \overline{Y}s5 \Delta Ye6 \Delta \overline{Y}s6$$
$$+ Pr\Delta Ye4 \Delta Ys4 \Delta Ye5 \Delta Ys5 \Delta \overline{Y}e6$$
$$+ P4 \Delta Ye4 \Delta \overline{Y}s4 \Delta Ye5 \Delta \overline{Y}s5 \Delta \overline{Y}e6)T \qquad (135)$$

$$oe = P2ET \qquad (136)$$

The K flip-flop operates in a manner similar to the C flip-flop to indicate the value of the least significant digit in the resultant quantity by combining the ΔY4, ΔY5 and ΔY6 increments in each cycle of computation. Because of this, the logic for controlling the operation of the K flip-flop in position 4 in each cycle of computation may be expressed as:

$$k = (P4 \Delta Ye4 \Delta Ye5 \Delta Ye6 + P4 \Delta Ye4 \Delta \overline{Y}e5 \Delta \overline{Y}e6$$
$$+ P4 \Delta \overline{Y}e4 \Delta Ye5 \Delta \overline{Y}e6 + P4 \Delta \overline{Y}e4 \Delta \overline{Y}e5 \Delta Y6)T \qquad (137)$$

$$ok = P2KT \qquad (138)$$

At position 5 in each cycle of computation, the resultant sum of the ΔY1, YΔ2 and YΔ3 increments is combined with the resultant sum of the ΔY4, ΔY5 and ΔY6 increments to obtain the total value of the ΔY increments in that cycle of computation. The K flip-flop operates at position 5 in each cycle of computation to indicate the value of the most significant digit in the sum of all of the ΔY increments in that cycle of computation. In order to have a binary indication of "1" for the K flip-flop at position 5 in a cycle of computation, the total decimal value of the ΔY increments in that cycle of computation must be at least "4." This can be obtained only by having the same polarity for the sum of the ΔY1, ΔY2 and ΔY3 increments and the sum of the ΔY4, ΔY5 and ΔY6 increments, as indicated by the A and D flip-flops. Furthermore, the K flip-flop may be true at position 4 in a cycle of computation so that it may not have to be triggered true at position 5 in that cycle of computation when a true state of the flip-flop is desired for that cycle of computation. Because of this, logic has only to be included for triggering the K flip-flop from the false state to the true state at position 5 when a true state of the K flip-flop is desired at position 5 for a cycle of computation. This occurs when the B and E flip-flops indicate binary values of "1" for the most significant digit in the sum of the ΔY4, ΔY5 and ΔY6 increments such that a decimal value of "2" for the first sum is combined with a decimal value of "2" for the second sum. In this way, the logic for triggering the K flip-flop at position 5 in a cycle of computation can be expressed as:

$$k = (P5\overline{K}\overline{A}BDE + P5\overline{K}ABDE)T \qquad (139)$$

In like manner, the K flip-flop becomes triggered to the false state at position 5 from a true state when the total decimal value of the ΔY increments in a cycle of computation is less than four. This occurs when the two resultant quantities have opposite polarities, as indicated by opposite states of operation for the A and D flip-flops. It also occurs when the sum of the ΔY1, ΔY2 and ΔY3 increments or the sum of the ΔY4, ΔY5 and ΔY6 increments is zero. Another possibility of having a decimal value of less than "4" for the total value of all of the ΔY increments in a cycle of computation occurs when the most significant digit in the sum of the ΔY1, ΔY2 and ΔY3 increments and in the sum of the ΔY4, ΔY5 and ΔY6 increments has a binary value of "0." In view of the discussion immediately above in this paragraph, the logic for triggering the K flip-flop false at position 5 in each cycle of computation may be expressed as:

$$ok = (PtKA\overline{D} + P5K\overline{AD} + P5K\overline{BC} + P5K\overline{EB} + P5K\overline{EC})T \quad (140)$$

At position 5, the D flip-flop operates to indicate the value of the second most significant digit in the total value of the ΔY increments for each cycle of computation. Since the maximum decimal value possible for the ΔY increments in the cycle of computation is "6" and since the D flip-flop indicates a decimal value of "2" in the true state, the D flip-flop becomes triggered true for decimal values of "2," "3" and "6." In order to obtain the decimal value of "6" for the sum of all of the ΔY increments in a cycle of computation, the E flip-flop has to be triggered true at position 4 to indicate the sum of the ΔY4, ΔY5 and ΔY6 increments. Because of this, no logic has to be included to maintain the E flip-flop in the true state at position 5.

Decimal values of "2" are obtained in various ways for the ΔY increments in a cycle of computation. For example, only the C and K flip-flops may be true at position 4 to indicate decimal values of "1" for the sum of ΔY1, ΔY2 and ΔY3 and for the sum of ΔY4, ΔY5 and ΔY6. In like manner, the B flip-flop may be triggered true at position 4 to indicate a decimal value of "2," and the C and K flip-flops may be triggered false at this position to indicate values of "0." It is also possible to have a decimal value of "3" in one sign for one of the sums such as the sum of the ΔY1, ΔY2 and ΔY3 increments and to have a decimal value of "1" of the opposite sign for the other sum such as the sum of the ΔY4, ΔY5 and ΔY6 increments. In like manner, decimal values of "3" for the sum of all of the ΔY increments in a cycle of computation may be obtained by adding a decimal value of "3" for one sum such as the sum of the ΔY1, ΔY2 and ΔY3 increments to a decimal value of "0" for the other sum such as the sum of the ΔY4, ΔY5 and ΔY6 increments. A decimal value of "3" may also be obtained for the sum of all of the ΔY increments in a cycle of computation by adding a decimal value of "2" to a decimal value of "1" for the sums of the ΔY1, ΔY2 and ΔY3 increments and of the ΔY4, ΔY5 and ΔY6 increments.

In view of the above discussion, it is believed that a person skilled in the art will see how the following logic is derived for controlling the operation of the D flip-flop at position 5 in each cycle of computation. In accordance with this logic, the D flip-flop indicates the value of the second most significant digit for all of the ΔY increments in each cycle of computation. The logic for controlling the operation of the D flip-flop at position 5 may be expressed as follows:

$$d = (P5B\overline{DEK} + P5\overline{BCDE} + P5\overline{ABC}DEK + P5\overline{ABCDEK}$$
$$+ P5\overline{ABDEK} + P5\overline{ABCDEK} + P5ABC\overline{DEK}$$
$$+ P5ABC\overline{DEK})T \quad (141)$$

$$od = (P5BD\overline{EK} + P5\overline{AC}DEK + P5\overline{BDEK}$$
$$+ P5\overline{ABDEK} + P5AB\overline{CDEK} + P5A\overline{BCDEK}$$
$$+ P5A\overline{BDEK} + P5\overline{BCDEK} + P5\overline{ACDEK}$$
$$+ P5ABCD\overline{EK})T \quad (142)$$

In the fifth pulse time, the C flip-flop indicates the least significant digit in the total value of the ΔY increments for each cycle of computation. As will be seen, the C flip-flop is true in position 5 for the odd decimal values of "1," "3" and "5" and is false in position 5 for the even decimal values of "0," "2," "4" and "6." Because of this, the C flip-flop should be triggered true from the false state only when the K flip-flop is true at position 4. The C flip-flop should be triggered true at this time since the combination of a false state in the C flip-flop and a true state in the K flip-flop at position 4 indicates an odd decimal value for the ΔY increments. Similarly, the C flip-flop should be triggered false at position 5 from a true state when the K flip-flop is also true at position 4. The reason is that the simultaneous occurrence of true states in the C and K flip-flops at position 4 indicates an even decimal value. The triggering of the C flip-flop to the true and false states may be expressed respectively as:

$$c = P5\overline{C}KT \quad (143)$$
$$oc = P5CKT \quad (144)$$

The A flip-flop is triggered at position 5 in each cycle of computation to indicate the polarity of the sum of the ΔY increments in that cycle of computation. The A flip-flop is triggered true from a false state when the sum of the ΔY4, ΔY5 and ΔY6 increments has a positive polarity and a magnitude equal to or greater than the magnitude of a negative quantity obtained by adding the ΔY1, ΔY2 and ΔY3 increments. In like manner, the A flip-flop is triggered false when the sum of the ΔY4, ΔY5 and ΔY6 increments is negative and has a magnitude greater than the magnitude of a positive quantity obtained by adding the ΔY1, ΔY2 and ΔY3 increments. The triggering of the A flip-flop to the true and false states at position 5 in each cycle of computation may be respectively expressed as follows:

$$a = (P5\overline{ABDE} + P5\overline{ABDK} + P5\overline{ABDEK})T \quad (145)$$
$$oa = (P5A\overline{BDE} + P5A\overline{BDK} + P5AB\overline{DEK})T \quad (146)$$

At position 5 in each cycle of computation, the total absolute value of the ΔY increments in each cycle of computation is indicated by the state of operation of the C, D and K flip-flops, and the sign of this absolute magnitude is indicated by the state of operation of the A flip-flop. This information now has to be converted to a proper representation for combination with the value of Y in each cycle of computation. For a positive value of the sum of the ΔY increments in a cycle of computation, the values representing the successive binary digits are stepped into the C flip-flop without any change. For a negative value of the sum of the ΔY increments in a cycle of computation, the value of the ΔY sum is stepped into the C flip-flop without any change until the first occurrence of a binary "1" in a cycle of computation. Thereafter, the binary values in the successive digital positions are inverted in that cycle of computation. The B flip-flop operates to recognize the first occurrence of a binary "1" for a negative value of the sum of the ΔY increments in a cycle of computation. The B flip-flop operates to provide such a recognition in accordance with the following logical equation:

$$b = \overline{A}C(Yr\overline{S} + S)T \quad (147)$$

The inversion may be seen from a specific example. By way of illustration, a value may be represented as 001100, where the least significant digit is at the right. This represents a decimal value of "12." Complementation of this number causes a value of 110100 to be obtained, where the least significant digit is at the right. As will be seen, the original number and the complementary number coincide until the occurrence of the first binary value of "1." Thereafter, the binary values between the original number and the complementary number are inverted.

When the B flip-flop is triggered true, all of the indications representing the sum of the ΔY increments are inverted in the positions after the first binary "1" appears in the value representing the sum of all of the ΔY increments. This is obtained by inverting the signal indications introduced to the C flip-flop in successive digital positions after the first binary "1" appears in the value representing the sum of the ΔY increments in a cycle of computation. The inversion can be accomplished since the information relating to values of successive digital positions is sequentially stepped into the C flip-flop. The inversion for a negative value of the ΔY increment in the position after the first binary "1" in a cycle of computation is obtained in accordance with the following logical equations:

$$c = [(Yr\overline{S}+S)D\overline{B}+(Yr\overline{S}+S)\overline{D}B]T \quad (148)$$

$$oc = [(Yr\overline{S}+S)\overline{DB}+(Yr\overline{S}+S)DB]T \quad (149)$$

Just as the information from the D flip-flop is stepped into the C flip-flop in accordance with the logic expressed in equations 148 and 149, the information in the K flip-flop is stepped into the D flip-flop. This stepping is obtained since the K flip-flop indicates the most significant digit of the sum of all of the ΔY increments in a cycle of computation and since the D flip-flop indicates the second most significant digit for the sum of all of the ΔY increments in that cycle of computation. The stepping is obtained in accordance with the logic expressed in the following equations:

$$d = (Yr\overline{S}+S)KT \quad (150)$$

$$od = (Yr\overline{S}+S)\overline{K}T \quad (151)$$

At the start position, the K flip-flop is triggered false if it previously is in the true state. The K flip-flop is triggered false in this position in order to indicate a positive value for the sum of the ΔY increments in the positions after the information positions. This does not affect the information inserted into the K flip-flop at position 4 since this information has been stepped into the D flip-flop at the start position in accordance with the logic expressed in Equation 150. The K flip-flop is triggered to the false state at the start position in accordance with the following logical equation:

$$ok = (Yr\overline{S}+S)KT \quad (152)$$

When the K flip-flop becomes triggered false, it causes values of "0" to be stepped into the C flip-flop in the position after the information positions unless the value of the sum of the ΔY increments is actually negative. If such a sum is actually negative, the B flip-flop becomes triggered true in accordance with Equation 147. This causes the binary values of "0" to become inverted to binary values of "1" in the positions of increased digital significance so that a negative value is indicated by the C flip-flop in a manner similar to that set forth in Equation 136 for the E flip-flop. The A, B, C, D, E and K flip-flops become reset at position 2 of the next cycle of computation. In this way, the A, B, C, D, E and K flip-flops become reset to a false state before the commencement of operations in the next cycle of computation. Stages are included in FIGURES 20 to 24, inclusive, for performing such a resetting operation.

The Yn flip-flop shown in FIGURE 17 operates to combine the signals representing the Y and ΔY increments in each cycle of computation to obtain signals representing a new value of Y. The combination of Y and ΔY to obtain a new value of Y in each cycle of computation has been described in detail previously for both a normal integrator and a multiplier. The signals representing the new value of Y are then inserted into the Y delay line for use as the value of Y in the next cycle of computation. The operation of the Yn flip-flop is controlled in accordance with the following logical equations:

$$yn = (Yr\overline{Y}d\overline{Y}c(\overline{G}o+\overline{R})+\overline{Y}rYd\overline{Y}cS$$
$$+\overline{Y}r\overline{Y}dYcS+Yr\overline{Y}dYc)T \quad (153)$$

$$oyn = (\overline{y}n)T \quad (154)$$

The signals representing the values of Y and ΔY for each position are actually combined with the signals representing the carry resulting from the combination of Y and ΔY in the previous position. The production of the carry signals resulting from the combination of Y and ΔY has been described in detail previously. The carry signals are produced in accordance with the following logical equations:

$$yc = Yr Yd\overline{R}T \quad (155)$$

$$oyc = \overline{Yr}\overline{Y}dT \quad (156)$$

The signals representing the value of Yn are introduced to stages (FIGURE 18) controlling the operation of the Ss flip-flop at successive digital positions after the position of least digital significance in each cycle of computation. In this way, the Ss flip-flop becomes triggered in accordance with the following logical equation:

$$ss = YnS\overline{S}r\overline{F}T \quad (157)$$

As will be seen from logic set forth in Equation 157, the Ss flip-flop becomes triggered to the true state if a binary value of "1" occurs for the new value of Y in any digital position after the start position. When the Ss flip-flop is triggered true in a cycle of computation, it remains true for the remainder of that cycle of computation. This indicates that the new value of Y is different from "0."

The new value of Y controls in part the production of a ΔZ increment. When the new value of Y is different from "0" in a cycle of computation and a ΔX increment actually occurs in that cycle, a ΔZ increment is produced. The ΔZ increment is produced in accordance with the following logical equation:

$$\Delta ze = P1Ss\Delta XeT \quad (158)$$

No ΔZ increment is produced in a cycle of computation when the value of Yn in that cycle of computation is "0" or when no ΔX increment actually occurs in that cycle of computation. A lack of occurrence of a ΔZ increment in a cycle of computation is indicated by a false state of operation of that ΔZe flip-flop in that cycle of computation. A false state of operation of the ΔZe flip-flop is also produced during a reset operation in order to prevent the transfer of wrong information from the ΔZe flip-flop to other stages in the digital differential analyzer. In this way, the logic controlling the triggering of the ΔZe flip-flop to the false state can be expressed as:

$$o\Delta ze = (P1\overline{S}s+P1\Delta \overline{X}e+R)T \quad (159)$$

The polarity of each ΔZ increment is dependent upon the polarities of the ΔX increment and the polarity of the new value of Y in each cycle of computation. For example, the ΔZ increment is positive in a cycle of computation when both Yn and ΔX are positive in a cycle of computation. Similarly, the ΔZ increment is positive in a cycle of computation when both Yn and ΔX are negative in a cycle of computation. The testing of the polarities of these quantities occurs in the most significant digital position. This corresponds to position 1 because of the delay of one digital position provided by the Yn flip-flop. The logic controlling the triggering of the ΔZs flip-flop to the true state may be expressed as:

$$\Delta zs = P1(\overline{Y}n\Delta Xs+Yn\Delta \overline{X}s)T \quad (160)$$

The ΔZs flip-flop is triggered to the false state when either the ΔX increment or the value of Yn is negative provided both the ΔX and Yn are not of the same sign. The ΔZs flip-flop is also triggered to the false state in a reset operation. In this way, the logic controlling the triggering of the ΔZs flip-flop to the false state may be expressed as:

$$o\Delta zs = P1(Yn\Delta Xs+\overline{Y}n\Delta \overline{X}s)T+RT \quad (161)$$

During the time that the value of Y is in a particular range of values such as the range between "0" and one-half of the capacity of the Y delay line, a servo operation is performed as described above. When the absolute value of Y is greater than one-half the capacity of the Y delay line, the servo operation is over-ruled. This is accomplished by triggering the Ss flip-flop to the false state in the position of greatest digital significance. By triggering the $Ss$ flip-flop to the false state, a $\Delta Z$ increment cannot be produced in accordance with the logic expressed in Equation 159 above.

The new value of Y in each cycle of computation is determined by comparing the values of the digits in the most significant information digit and in the digit representing the sign of Y. These two digits occur in the last two positions in each cycle of computation. For example, the positive value of Y is represented by a binary value of "0" in the last position in each cycle of computation. Similarly, a negative value of Y is represented by a binary value of "1" in the last position in each cycle of computation. When the value of Y is positive, the magnitude of the value of Y is greater than one-half the capacity of the Y delay line for a binary value of "1" in the digit immediately preceding the sign digit.

Similarly, the value of Y exceeds one-half the capacity of the Y delay line when the polarity of Y is negative and when a binary value of "0" is produced in the position immediately preceding the sign position.

In this way, the value of Y exceeds one-half of the value of the Y delay line for either the condition 01 or 10 in the last two positions representing Y in a cycle of computation. When the value of Y exceeds one-half of the capacity of the Y delay line, the $Ss$ flip-flop is triggered false in the manner described above so as to interrupt the servo operation. The $Ss$ flip-flop is triggered false in this manner in accordance with the logical equation:

$$oss = [P30(\bar{y}n) + P30(yn)\bar{Y}n]T \quad (162)$$

Since the servo operation is interrupted when the value of Y exceeds one-half of the capacity of the Y delay line, it is possible for the value of Y to rise considerably above this value. Actually, it is possible for the value of Y to exceed the capacity of the Y delay line so that an overflow in the value of Y occurs. It will be appreciated that such an overflow is undesirable since it causes errors to be produced in subsequent computations. The overflow is produced when a positive carry occurs in the addition of Y and $\Delta Y$ at the position of greatest digital significance for a positive value of $\Delta Y$. Similarly, an overflow occurs when no carry is produced at the position of greatest digital significance in the addition of Y and $\Delta Y$ when the value of $\Delta Y$ is negative. The overflow occurs in accordance with the following logical expression:

$$of = P30(Yr\bar{Y}dYc + \bar{Y}rYd\bar{Y}c)T \quad (163)$$

The start position for the information in the Y delay line is indicated by the first binary value of "1" for Y in each cycle of computation. This occurs in a manner similar to that described above and remains fixed for each cycle of computation. The start pulse causes the S flip-flop to be triggered to the true state. The triggering of the S flip-flop to the true state may be expressed logically as:

$$s = Yr\bar{S}FGoT \quad (164)$$

The $Sr$ flip-flop becomes triggered true in the position immediately following the start position. The $Sr$ flip-flop becomes triggered true in accordance with the logical equation:

$$sr = SGoT \quad (165)$$

The $Ss$ flip-flop does not become triggered true in the position immediately following the triggering of the $Sr$ flip-flop to the true state such as occurs in a normal integrator or in a multiplier. The reason for this is that the $Ss$ flip-flop operates in a servo integrator to test whether the value of Y in each cycle of computation is different from a first particular value such as a value of "0" or from a second particular value such as one-half the capacity of the Y delay line.

The S flip-flop becomes reset to the false state at the end of each cycle of computation in accordance with the logical equation:

$$os = P30\bar{F}T \quad (166)$$

In like manner, the $Sr$ flip-flop becomes reset to the false state in the position immediately following the resetting of the S flip-flop. This occurs in accordance with the logical equation:

$$osr = S(Go + \bar{F})T \quad (167)$$

The $Ss$ flip-flop becomes reset to the false state at the same time as the $Sr$ flip-flop in accordance with the following logical equation:

$$oss = \overline{SF}T \quad (168)$$

At certain times, a different value than "0" may be inserted from the I delay line into the Y delay line to serve as the initial value of Y. When this occurs, $\Delta Z$ outputs are obtained in successive cycles to reduce the value of Y to the particular value such as a value of "0." When a value of "0" for Y is reached, no output is produced in a cycle of computation, as indicated by a false state for $\Delta Ze$ flip-flop. Upon the occurrence of a false state for the $\Delta Ze$ flip-flop at the time that the (⑬) switch is closed, the value of Y in the I delay line is again inserted into the Y delay line. The initial value of Y is inserted into the Y delay line in accordance with the logic expressed in the following equation so that a new count-down operation for the value of Y in the Y delay line can be initiated:

$$yn = \Delta Ze \, ® \, \bar{F}IrGoT \quad (169)$$

The information relating to the initial value of Y is inserted into the I delay line on an octal basis in a manner similar to that described previously. The information is inserted on an octal basis by first inserting the information into the $Ss$, $Sr$ and S flip-flops in accordance with the following logical equations:

$$ss = ⓘ_z \bar{FG}oT \quad (170)$$

$$sr = ⓘ_y \bar{FG}oT \quad (171)$$

$$s = ⓘ_x \bar{FG}oT \quad (172)$$

After the octal information has been inserted into the $Ss$, $Sr$ and S flip-flops, the information is stepped into the I delay line from the $Ss$ flip-flop and into the $Ss$ flip-flop from the $Sr$ flip-flop and into the $Sr$ flip-flop from the S flip-flop. This has been described in detail previously for normal integrators and for multipliers. The stepping occurs in a similar manner for integrators operating as servos. The stepping of the information into the I delay line through the $Ss$, $Sr$ and S flip-flops may be logically expressed as:

$$in = SsFGoT \quad (173)$$

$$oin = \bar{S}sFGoT \quad (174)$$

$$ss = SrFGoT \quad (175)$$

$$oss = \bar{S}rFGoT \quad (176)$$

$$sr = SGoT \quad (177)$$

$$osr = \bar{S}GoT \quad (178)$$

$$s = IrFGoT \quad (179)$$

$$os = \bar{I}rFGoT \quad (180)$$

As will be seen from Equations 173 to 181, inclusive, a closed loop operation is obtained since the information in the I delay line is stepped into the S flip-flop for subsequent transfer from the $Ss$ flip-flop back into the I delay line.

During periods of computation and during other periods in which no filling operation is occurring, the information in the I delay line circulates through a path which includes only the I delay line, the $Ir$ read flip-flop and the $In$ write flip-flop. This re-circulation occurs in accordance with the following logical equations:

$$in = Ir(\bar{F} + \bar{G}o)T \qquad (181)$$

$$oin = \bar{I}r(\bar{F} + Go)T \qquad (182)$$

It should be appreciated that the stages shown in FIGURES 20 to 24, inclusive, may be included in a separate package. In this way, the packages can be coupled only to particular servo integrators in accordance with the specific mathematical problem which is to be solved by the digital differential analyzer at any instant. It should also be appreciated that the stages shown in FIGURES 20 to 24, inclusive, may be coupled to the normal integrators shown in FIGURES 6 to 9, inclusive, as well as to servo integrators. It is believed that a person skilled in the art would understand from the above discussion how to couple the stages shown in FIGURES 20 to 24, inclusive, to normal integrators.

*Combination Serial Parallel Digital Differential Analyzer*

The digital differential analyzer shown in FIGURE 25 includes a plurality of integrators which operate on a parallel basis in a manner similar to that described above. The digital differential analyzer shown in FIGURE 25 also includes a plurality of integrators which operate on a time-sharing basis. The time-sharing portion of the digital differential analyzer shown in FIGURE 25 may be similar in many respects to the time-sharing integrators disclosed in Hagen Patent 2,850,232.

The digital differential analyzer shown in FIGURE 25 includes a Y delay line which may be of such length as to store information relating to a plurality of integrators. The Y delay line operates in a manner similar to the Y delay line discussed above for the parallel integrator except that it has an increased length. The signals from the Y delay line are read by the $Yr$ read flip-flop and are introduced to a gate 1350, which passes the signals to a $Yn$ flip-flop for insertion into the Y delay line. This recirculation of information occurs in a manner similar to that described previously.

In like manner, the information in an R delay line is read by an $Rr$ flip-flop and introduced from the flip-flop to a gate 1352 which controls the introduction of signals to an $Rn$ flip-flop. The $Rn$ flip-flop in turn records the information in the R delay line. An I delay line, an $Ir$ flip-flop, a gate 1354 and an $In$ right flip-flop are also associated with one another in a loop in a manner similar to that described previously.

The signals read by the $Yr$ flip-flop are introduced to a counter generally indicated at 1356. The counter includes a plurality of flip-flops which may be designated as C1, C2 . . . Cn. The number of flip-flops in the counter 1356 is dependent upon the number of integrators having information stored in the Y, R and I delay lines for circulation on a time-sharing basis. The number of flip-flops in the counter 1356 is also dependent upon the number of digital positions in each of the time-sharing and parallel integrators. Gates such as gates 1360, 1362 and 1364 are included in the counter 1356 to control the passage of triggering signals to the flip-flops C1, C2 . . . Cn. It is believed that a person skilled in the art will understand how to build a counter similar to that designated as 1356.

As the information circulates through the Y delay line, the counter 1356 counts the number of digital positions so as to indicate at any instant the particular integrators being presented in the Y and R delay lines for computation at any particular instant. Each integrator is indicated by an individual setting of the flip-flops C1, C2 . . . Cn. The flip-flops also indicate the particular position being presented for computation at any instant. By way of illustration, the counter 1356 may indicate at a particular instant that position 6 of time-sharing integrator 4 is being presented for computation.

Upon the occurrence of particular settings of the flip-flops C1, C2 . . . Cn, signals pass through a gate 1358. Actually, the gate 1358 includes a plurality of "and" and "or" networks which are inter-related in a particular manner in accordance with a mathematical problem to be solved by the digital differential analyzer shown in FIGURE 25. Signals pass through the gate 1358 from the counter 1356 when particular integrators and particular positions in the integrators are presented by the Y and R delay lines for computation.

The signals passing through the gate 1358 are introduced to a gate 1360 to control the activation of the gate 1360. The gate 1360 also receives signals representing the occurrence of $\Delta Y$ increments from a plurality of parallel integrators such as those shown in FIGURES 6 to 24, inclusive, and described above. The gate 1360 also receives signal indications representing the sign of each such $\Delta Y$ increment. For example, the gate 1360 receives signals from flip-flops representing the occurrence and the sign of integrators 1 to $m$, inclusive, where $m$ may represent the number of parallel integrators. As will be apparent, the number of parallel integrators may be equal to or different from the number of time-sharing integrators.

The signals representing the occurrence and the sign of the $\Delta Y$ increments from the parallel integrators 1 to $m$, inclusive are always available for passage through the gate 1360. This results from the inherent operation of the integrators on a parallel basis, as has been described in detail previously. However, only a particular one or particular ones of these signals are able to pass through the gate 1360 at any instant in accordance with the activation of the gate 1358. For example, when integrator 4 in the time-sharing portion of the digital differential analyzer shown in FIGURE 25 is presented for computation, the gate 1358 may operate on the gate 1360 so that only the signals representing the occurrence and the sign of the $\Delta Y$ increments in parallel integrators 2 and 6 are able to pass through the gate 1360. It will be seen from these remarks that the gate 1360 may actually be formed from a plurality of "and" and "or" networks which are inter-related in accordance with the mathematical problem to be solved by the digital differential analyzer shown in FIGURE 25.

The signals passing through the gate 1360 may be combined in a manner similar to that shown in FIGURES 20 to 24, inclusive, to obtain signal indications representing the sum of the $\Delta Y$ increments in a cycle of computation for each time-sharing integrator. These signal indications control the operation of the $Yd$ flip-flop in successive digital positions in a manner similar to that described above such that the $Yd$ flip-flop indicates the sum of the $\Delta Y$ increments for each time-sharing integrator in each cycle of computation.

The signals from the $Yd$ flip-flop are introduced to an adder generally indicated at 1362, as are the signals read from the Y delay line by the $Yr$ flip-flop. The adder 1362 operates in a manner similar to that described previously to add the values of Y and $\Delta Y$ for each time-sharing integrator in each cycle of computation so as to obtain signal indications representing the new value of Y for that integrator. The addition of Y and $\Delta Y$ for each time-sharing integrator in each cycle of computation is facilitated by the operation of a $Yc$ flip-flop which indicates the carry from each digital position to the next. The resultant signals representing the new value of Y for each time-sharing integrator are inserted by the $Yn$ flip-flop into the Y delay line.

The signals representing the new value of Y for each time-sharing integrator are introduced to a $Yt$ gate in a manner similar to that described previously for the parallel integrators. The $Yt$ gate also receives signals representing one-half of the sum of the $\Delta Y$ increments for the time-sharing integrator activated at each instant in accordance with the operation of the gate 1360. These signals pass through the $Yt$ gate in accordance with the occurrence of a $\Delta X$ increment for a particular one of the integrators. This integrator may be either one of the time-sharing integrators other than the integrator being presented for computation at that instant, or it may be one of the parallel integrators. The particular integrator controlling the production of ΔX increments for each time-sharing integrator is dependent upon the operation of a gate 1367.

For example, when a ΔX increment actually occurs in a cycle of computation for the time-sharing integrator being presented for computation at any instant, the signals representing Y and one-half of the sum of the ΔY increments for that integrator pass through the Yt gate to an adder generally indicated at 1364. However, when no ΔX increment occurs in a cycle of computation for the time-sharing integrator, only the signals representing one-half of the sum of the ΔY increments pass through the Yt gate.

The resultant signals produced by the adder 1364 represent $Y + \frac{1}{2}\Sigma\Delta Y$ for each time-sharing integrator in the cycle of computations in which a ΔX increment actually occurs for that time-sharing integrator. However, the signals produced by the adder 1364 represent only $\frac{1}{2}\Sigma\Delta Y$ for each time-sharing integrator in a cycle of computation in which no ΔX increment occurs for that integrator. In this paragraph, "Σ" indicates that a sum of the ΔY is being obtained for each time-sharing integrator in the cycles of computation. The signals produced by the adder 1364 pass through a gate 1366 to a Yu flip-flop corresponding to that described previously in connection with the parallel integrators forming a part of this invention.

The signals from the Yu flip-flop are introduced to a gate 1370, as are the signals representing the sign of the ΔX increment for the particular time-sharing integrator being presented for computation at any instant. When the sign of the ΔX increment for the time-sharing integrator is positive, the signals produced by the Yu flip-flop pass through the gate 1370 without any change. However, when the sign of the ΔX increment for the time-sharing integrator is negative, the signals produced by the Yu flip-flop become inverted as they pass through the gate 1370. Signals representing the sign of the ΔX increment for the time-sharing integrator are obtained from a gate 1371. The gate 1371 controls which one of the integrators provides signals representing the ΔX increment for each time-sharing integrator as each time-sharing integrator is presented for computation on a time-sharing basis.

The signals passing through the gate 1370 are introduced to an adder generally indicated at 1372 and are combined in the adder 1372 with the signals read by the Rr flip-flop from the R delay line. These signals represent the output quantity for the same time-sharing integrator as the integrator whose value of Y is simultaneously being presented in the Y delay line. The combination of R and YΔX in each cycle of computation is facilitated by the operation of an Rc flip-flop which indicates the carry from each digital position to the next. The Rc carry flip-flop is also initially set to the true state at position one for a negative ΔX increment so that the value of Y passing through the gate 1370 will actually represent a complementary value rather than an inverted value.

The signals passing through the gate 1358 to indicate the particular one of the time-sharing integrators being presented for computation at any instant and to indicate the particular position in the particular integrator are introduced to gates 1374 and 1376. The gates 1374 and 1376 also receive signals from the gate 1370 to represent the polarity of the YΔX increment. The gate 1374 further receives the signals from the Rc flip-flop to represent any carry at the most significant position in combining the values of R and YΔX.

Upon the occurrence of a carry from the Rc flip-flop at the most significant position in a cycle of computation having a positive YΔX increment, a signal passes through the gate 1374 to indicate the actual occurrence of a ΔZe increment. A signal also passes through the gate 1374 to indicate the actual occurrence of a ΔZe increment when the YΔX increment is negative and no carry occurs in the position of greatest digital significance in a cycle of computation.

The signals from the gate 1374 control the operation of a ΔZe flip-flop. The signals from the ΔZe flip-flop are in turn introduced to a gate 1378, the operation of which is also dependent upon the signals from the gate 1358 to represent the particular one of the time-sharing integrators being presented for computation at each instant. In accordance with the particular signals introduced from the gate 1358, the gate 1378 operates to pass signal indications to particular ones of the integrators in the digital differential analyzer. The signals from the gate 1378 may represent ΔX or ΔY increments for any one of the integrators in the parallel portion or any one of the integrators in the time-sharing portion.

In like manner, signals pass through the gate 1376 in the position of greatest digital significance. These signals pass through the gate 1376 in accordance with the sign of the YΔX increment in each cycle of computation. For example, the ΔZ increment for a time-sharing integrator is positive when the YΔX increment for the integrator is positive in a cycle of computation. Similarly, the ΔZ increment is negative for a time-sharing integrator when the YΔX increment is negative for the integrator in a cycle of computation.

The signals from the ΔZs flip-flop are shown as passing through the gates 1380 and 1382, the gate 1380 becoming activated for a positive ΔZ increment and the gate 1382 becoming activated for a negative ΔZ increment. The signals passing through the gates 1380 and 1382 are introduced to a ΔZs flip-flop corresponding to ΔZe flip-flops shown at the bottom left of FIGURE 25. A plurality of ΔZs flip-flops are shown in FIGURE 25, each being included in a different one of the parallel or time-sharing integrators. The particular ΔZs flip-flop receiving signals from the gates 1380 and 1382 at any instant is dependent upon the inter-relationship between the integrators in accordance with the mathematical problem to be solved.

The operation of the overflow flip-flop is controlled in a manner similar to that described previously for the parallel integrators. For example, a gate 1384 may be included to test the polarity of Y and the occurrence of a carry from the Yc flip-flop for each time-sharing integrator in a cycle of computation. This testing is provided by the gate 1384 at the position of greatest digital significance for each time-sharing integrator as the integrator is presented for computation. The signals passing through the gate 1384 trigger the Of flip-flop to a particular state such as the true state to indicate the occurrence of an overflow in the value of Y for the particular one of the time-sharing integrators being presented for computation at each particular instant.

As in the parallel integrators, signals representing the initial values of Y for the different time-sharing integrators are initially inserted into the I delay line. This insertion may be obtained on an octal basis by introducing the information to S, Sr and Ss flip-flops in a manner similar to that described above. The information from the S, Sr and Ss flip-flops may be stepped through the gate 1354 into the In flip-flop for insertion into the I delay line. A gate 1388 may be included to control whether the information read by the Ir flip-flop from the I delay line passes directly through the gate 1354 to the In flip-flop or passes through the S, Sr and Ss flip-flops before reaching the gate 1354 and the In flip-flop.

After the insertion into the I delay line of the information representing the initial value of Y for each of the time-sharing integrators, the information becomes transferred from the I delay line to the Y delay line by the activation of a gate 1350 which may be included in the adder 1362. The information in the I delay line becomes transferred into the Y delay line before the commencement of computation. The information may become transferred only once when a computation is made, or the information may become transferred to the I delay line and the Y delay line several times in order to provide a check as to the accuracy of computation.

It should be appreciated that various of the time-sharing integrators may be interrelated so that the ΔZ increments from certain integrators may be introduced to other integrators as the ΔX and ΔY increments for these other integrators. It should also be appreciated that various of the parallel integrators may be interrelated in a similar manner. By also including an interrelationship between various ones of the parallel and time-sharing integrators, an increased flexibilty is obtained for a composite digital differential analyzer over that which would be obtained if only parallel integrators or only time-sharing integratars were used. Decreased cost in the construction of the digital differential analyzer also results.

It should be appreciated that the construction of the gate 1360 does not have to vary in the solution of different problems. Actually, a plugboard can be provided and the connections in and to the plugboard can be varied in accordance with the different mathematical problems to be solved. These plugboard connections vary which ones of the ΔYe1, ΔYe2 . . . ΔYen flip-flops and the ΔYs1, ΔYs2 . . . ΔYsn flip-flops introduce signals to the gate 1360 upon the presentation of each time-sharing integrator for computation. The plugboard connections also control which one of the ΔXe1, ΔXe2 . . . ΔXen introduces signals to the gate 1367 upon the presentation of each time-sharing integrator for computation and which one of the ΔXs1, ΔXs2 . . . ΔXsn flip-flops introduces signals to the gate 1371 at such time.

Detail Circuits

A typical "or" network capable of being used in the digital differential analyzer constituting this invention is shown in FIGURE 26. The "or" network shown in FIGURE 26 includes a pair of input leads 1400 and 1402. Diodes 1401 and 1403, such as types HD2768 have their cathodes respectively connected to the input leads 1400 and 1402 and have their anodes connected to the base of a transistor 1404, which may be a PNP transistor such as a type 2N417. A resistance 1406 having a suitable value in the order of 22 kilo-ohms is connected between the base of the transistor 1404 and a terminal 1408, which is connected to receive a suitable potential such as +10 volts.

The collector of the transistor 1404 is connected to a terminal 1410 to receive a suitable potential such as approximately −10 volts. The emitter of the transistor is connected to an output line 1416 and to one terminal of a resistance 1412, which may have a value in the order of 470 ohms. The second terminal of the resistance 1412 is connected to a terminal 1414 to receive a potential such as +2 volts.

The terminal 1410 is also connected to first terminals of a pair of resistances 1407 and 1409, second terminals of which are respectively connected to the cathodes of the diodes 1400 and 1402. The second terminals of the resistances 1407 and 1409 are also respectively connected to the cathodes of diodes schematically indicated at 1411 and 1413. Actually, each of the diodes 1411 and 1413 may comprise a plurality of diodes connected in an "and" relationship as shown in FIGURE 27. This illustrates how different 'and" networks may be coupled to an "or" network.

During the time that the potentials on the lines 1400 and 1402 in FIGURE 26 are near 0 volt, current tends to flow through a circuit including the terminal 1408, the resistance 1406, the diodes 1401 and 1403 and the input leads 1400 and 1402. This current tends to maintain the base of the transistor 1404 at a potential near 0 volt. The emitter of the transistor 1404 is also at a potential near 0 volt since the potential on the emitter of the transistor in an emitter follower tends to follow the potential on the base of the transistor.

When an input signal of negative polarity is introduced to the lead 1400 or the lead 1402 or both the leads 1400 and 1402, it causes the potential on the base of the transistor 1404 to drop. This in turn causes the potential on the emitter of the transistor 1404 to drop since the potential on the emitter follows the potential on the base in an emitter follower. In this way, a negative signal is produced on the output lead 1416. This negative signal is introduced to subsequent stages to indicate that either A or B is true or that both A and B are true. As will be seen from FIGURE 26, "A" indicates an input signal on the line 1400 and "B" indicates an input signal on the line 1402.

A typical "and" network capable of being used in the diigtal differential analyzer constituting this invention is illustrated in FIGURE 27. The "and" network includes a pair of input leads 1420 and 1422. The anodes of diodes 1424 and 1426 are respectively connected to the input leads 1420 and 1422, and the cathodes of the diodes are connected to the base of a transistor 1428, which may be a PNP transistor such as a type 2N417.

A resistance 1430 having a suitable value in the order of 2.4 kilo-ohms is connected between the base and the collector of the transistor 1428. The collector of the transistor 1428 has a suitable potential in the order of −10 volts applied to it from a terminal 1432. The emitter of the transistor 1428 is connected to an output line 1434 and to one terminal of a resistance 1436 which may be provided with a suitable value in the order of 470 ohms. The second terminal of the resistance 1436 is connected to a terminal 1438, which receives a suitable potential such as approximately +2 volts.

During the time that negative signals do not appear on the input lines 1420 and 1422, the potential applied to the input leads 1420 and 1422 is approximately 0 volt. This causes the potential on the emitter of the transistor 1428 to be approximately 0 volt since the potential on the emitter follows the potential on the base. When negative signals are simultaneously introduced to the lines 1420 and 1422, the negative potential on the terminal 1432 is instrumental in reducing the potential on the base of the transistor 1428 to a negative value. This causes a current of relatively large magnitude to flow through the transistor 1428 so that the potential on the output line 1434 approaches −10 volts. In this way, a negative signal is produced on the output line 1434 when both A and B are simultaneously true.

A buffer inverter is shown in FIGURE 28. The buffer inverter includes a transistor 1440, which may be a PNP transistor such as a type 2N417. The transistor 1440 is included in an emitter follower with a resistance 1442, which may have a suitable value in the order of 470 ohms. The resistance 1442 and the emitter and the collector of the transistor 1440 are disposed electrically between a terminal 1444 having a suitable potential in the order of +2 volts and a terminal 1446 having a potential in the order of −10 volts.

In addition to being connected to the resistance 1442, the emitter of the transistor 1440 is connected to a resistance 1448 and a capacitance 1450 in parallel. The resistance 1448 and the capacitance 1450 may respectively have values in the order of 8.2 kilo-ohms and 100 micro-microfarads. Second terminals of the resistance 1448 and the capacitance 1450 are connected to the base of a transistor 1452, which may be a PNP transistor such as a type 2N417. A resistance 1454 having a suitable value in the order of 4.3 kilo-ohms is connected between the base of the transistor 1452 and the terminal 1444. The emitter of the transistor 1452 is grounded, and the collector of the transistor has a negative potential applied to it through a resistance 1456 from the terminal 1446.

The resistance 1456 may have a suitable value in the order of 1 kilo-ohm.

The base of the transistor 1440 ordinarily receives a potential of approximately 0 volt so that the potential on the emitter of the transistor is also approximately 0 volt. Because of the voltage-dividing action provided by the resistances 1454 and 1448, the potential applied to the base of the transistor 1452 is slightly positive so that the transistor is non-conductive. This causes the output line 1458 to receive a potential approaching the potential of −10 volts on the terminal 1446. Because of this, the output line 1458 receives a negative potential of −10 volts in comparison to the potential of 0 volt applied to the base of the transistor 1440. In this way, the signal applied to the base of the transistor 1440 becomes inverted on the output line 1458.

Upon the introduction of a negative signal of −10 volts to the base of the transistor 1440, a negative potential approaching the potential of −10 volts on the terminal 1446 is produced on the emitter of the transistor 1440. Because of the action of the capacitance 1450, the negative signal produced on the emitter of the transistor 1440 is instantaneously applied to the base of the transistor 1452 to produce a current of relatively large magnitude through the transistor. This current produces a voltage across the resistance 1456 such that the potential on the output line 1458 rises from approximately −10 volts to approximately 0 volt. In this way, a negative input signal becomes inverted to a positive signal on the output line 1458.

Although FIGURES 26, 27 and 28 show an emitter follower, the emitter follower is separately shown in FIGURE 29. The emitter follower includes a transistor 1460 which may be a PNP transistor such as a type 2N417. Input signals are applied to the base of the transistor 1460. The collector of the transistor receives a suitable negative potential such as approximately −10 volts. An output line 1464 is connected to the emitter of the transistor 1460. The emitter of the transistor has a positive potential applied to it through a resistance 1466 from a terminal 1468, which is connected to receive a suitable potential in the order of +2 volts. The resistance 1466 may have a value in the order of 470 ohms. Because of the inherent operation of the emitter follower, the potential on the emitter of the transistor 1460 follows the potential on the base of the transistor.

Figure 30:
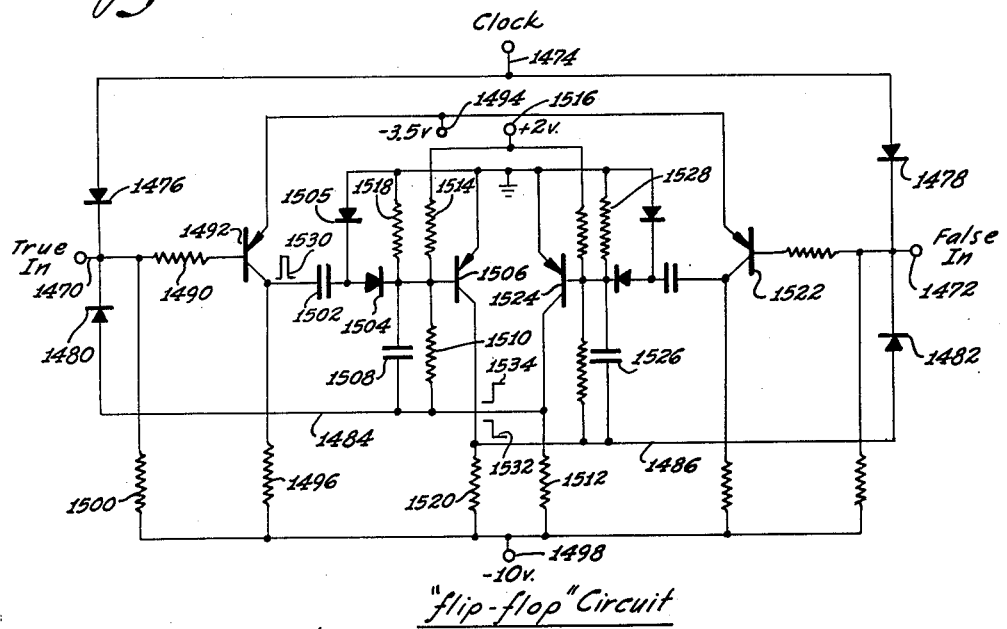

FIGURE 30 illustrates a flip-flop circuit which may be used in the digital differential analyzer constituting this invention. The flip-flop circuit includes input lines 1470 and 1472 and a clock line 1474. Diodes 1476 and 1478 are respectively connected between the clock line 1474 and the input lines 1470 and 1472, with the anodes of the diodes being connected to the clock line and the cathodes of the diodes being connected to the input lines. Diodes 1480 and 1482 are respectively connected between the input lines 1470 and 1472 and output lines 1484 and 1486.

A resistance 1490 having a suitable value in the order of 470 ohms is connected between the input line 1470 and the base of a transistor 1492 which may be a PNP transistor such as a type 2N417. A negative potential in the order of −3½ volts is applied to the emitter of the transistor 1492 from a terminal 1494. A resistance 1496 having a suitable value in the order of 680 ohms is connected between the collector of the transistor 1492 and a terminal 1498, which is connected to receive a suitable negative potential such as −10 volts. A resistance 1500 is connected between the terminal 1498 and the input line 1470. The resistance 1500 may have a suitable value in the order of 2.4 kilo-ohms.

A capacitance 1502 having a suitable value in the order of 300 micro-microfarads is connected between the collector of the transistor 1492 and the anode of a diode 1504. The cathode of a diode 1505 is connected to the anode of the diode 1504, and the anode of the diode 1505 is grounded. The cathode of the diode 1504 is connected to the base of a transistor 1506, which may be a PNP transistor such as a type 2N417. A capacitance 1508 and a resistance 1510 are connected between the base of the transistor 1506 and the output line 1484. The capacitance 1508 and the resistance 1510 may respectively have values in the order of 150 micro-microfarads and 4.3 kilo-ohms. A resistance 1512 is disposed electrically between the output line 1484 and the terminal 1498 and may have a suitable value in the order of 680 ohms.

A resistance 1514 extends electrically between the base of the transistor 1506 and a terminal 1516, which is connected to receive a suitable potential such as approximately +2 volts. A resistance 1518 is connected between the base and emitter of the transistor 1506, the emitter being grounded. The resistances 1514 and 1518 may respectively have suitable values in the order of 22 kilo-ohms and 470 ohms. The collector of the transistor 1506 is directly coupled to the output line 1486 and to one terminal of a resistance 1520, which may have a value in the order of 680 ohms. The other terminal of the resistance 1520 receives a negative potential of −10 volts from the terminal 1498.

Transistors 1522 and 1524 correspond respectively to the transistors 1492 and 1506. Resistances and capacitances are electrically associated with the transistors 1522 and 1524 in a manner similar to that described above for the transistors 1492 and 1496. These include a resistance 1528 and a capacitance 1526, which respectively correspond to the capacitance 1508 and the resistance 1518. In this way, the flip-flop shown in FIGURE 30 represents a balanced construction in which one side of the flip-flop corresponds in construction to the other side of the flip-flop.

At a particular instant, the transistor 1524 may be non-conductive such that the potential on the collector of the transistor approaches the potential of −10 volts on the terminal 1498. This causes a negative potential to be applied to the anode of the diode 1480 so that the diode cannot act to pass a current when negative signals are introduced to the input line 1470. Under such conditions, a negative signal on the input line 1470 is able to pass to the base of the transistor 1492 when it coincides in time with the production of a negative clock signal on the line 1474. This coincidence of the input and clock signals is necessary to prevent the diode 1476 from passing current to overcome the effects of the negative signal on the input line 1470.

Upon the introduction of a negative input signal to the base of the transistor 1492, current of a relatively large magnitude flows through the transistor and the resistance 1496. Because of this large current, the potential on the collector of the transistor 1492 approaches the potential on the emitter of the transistor so that a positive signal is produced on the collector, as indicated at 1530 in FIGURE 30. The positive signal passes through the capacitance 1502 and the diode 1504 to the base of the transistor 1506. The diode 1504 insures that only positive signals are applied from the collector of the transistor 1492 to the base of the transistor 1506.

The positive signal on the base of the transistor 1506 causes the transistor to become non-conductive such that the potential on the collector of the transistor falls to a potential approaching the potential of −10 volts on the terminal 1498. A resultant potential of relatively negative polarity is produced on the collector of the transistor 1506 and on the output line 1486, as indicated at 1532 in FIGURE 30. The negative signal 1532 is coupled through the capacitance 1526 to the base of the transistor 1524 so as to make the transistor 1524 conductive.

When the transistor 1524 becomes conductive, the resultant flow of current through the resistance 1512 causes a positive potential indicated at 1534 to be produced on the output line 1484. This positive potential biases the diode 1480 so as to produce a flow of current through the diode if a negative signal should again be introduced to the input line 1470. This flow of current prevents a negative triggering signal from being introduced to the base of the transistor 1492. In this way, the diodes 1476 and 1480 operate as an "and" gate to insure that triggering signals will be introduced to the transistor 1492 only when the flip-flop is in the false state and only when the input signal coincides in time with the clock signal.

Upon the introduction of an input signal to the line 1472, the transistor 1522 becomes conductive to make the transistor 1524 non-conductive. This causes a negative signal to be produced on the output line 1484 and to be coupled through the capacitance 1508 to the base of the transistor 1506 so as to make the transistor 1506 conductive. The resultant flow of current through the transistor 1506 and the resistance 1520 causes a relatively positive potential to be produced on the output line 1486.

The capacitance 1508 is provided with a relatively large value to insure that the transistor 1506 will be maintained non-conductive immediately after the transistor 1524 becomes conductive. Since the capacitance 1508 has a relatively large value, the resistance 1518 is provided with a relatively small value so as to produce a relatively low RC time constant in the series circuit formed by the capacitance 1508 and the resistance 1518. This small RC time constant insures that the capacitance 1508 will become immediately discharged through the resistance 1518 so as to be ready quickly for subsequent response to input signals. The series circuit formed by the capacitance 1526 and the resistance 1528 is provided with a similar RC time constant.

When a positive pulse is introduced from the collector of the transistor 1492 to the base of the transistor 1506 to cut off the transistor 1506, the capacitance 1502 becomes positively charged. The capacitance 1502 becomes subsequently discharged through a circuit including the diode 1505, the capacitance and the resistance 1496. Since the diode 1505 and the resistance 1496 have only relatively low impedances in the forward direction of the diode, the capacitance 1502 becomes quickly discharged so as to be instantaneously ready to couple subsequent signals from the collector of the transistor 1492 to the base of the transistor 1506.

Figure 31:
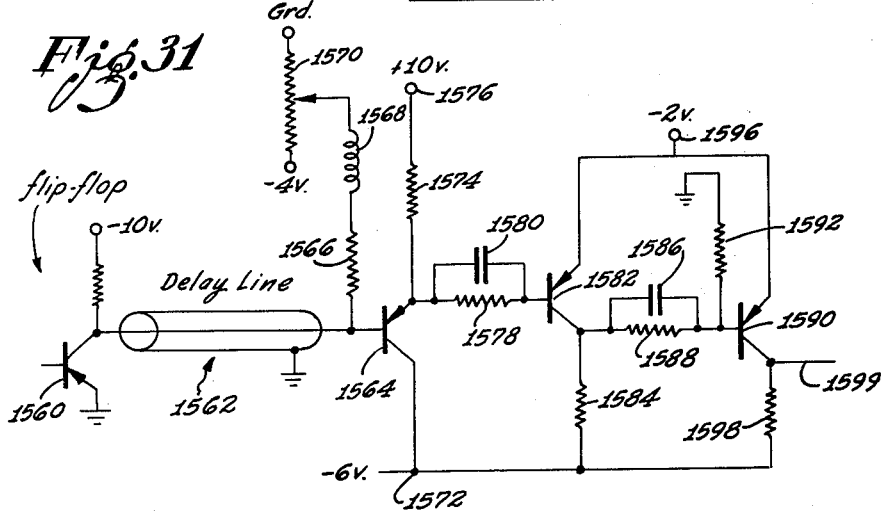

FIGURE 31 illustrates the construction of a read amplifier which may be used to amplify the signals which are produced by the write flip-flops such as the Y*n* and I*n* flip-flops and are introduced to a delay line such as the line 1562. The output stage of the flip-flop includes a transistor 1560 corresponding to the transistors 1506 and 1524 in FIGURE 31. The signals produced on the collector of the transistor 1560 are introduced to a delay line generally indicated at 1562. The delay line 1562 may be a distributed cable manufactured by the James Millen Company of Malden, Massachusetts. The cable may be provided with an impedance of 1350 ohms and may be stabilized by heat cycles to have a temperature coefficient of 80 parts per million maximum for each degree centigrade of temperature variation.

The output of the delay line is coupled to the base of a transistor, which may be a PNP transistor such as a type 2N417. A resistance 1566 and a coil 1568 are in series between the base of the transistor 1564 and the movable arm of a potentiometer 1570. The stationary contacts of the potentiometer 1570 may respectively receive suitable potentials as ground and —4 volts. The resistance 1566, the coil 1568 and the potentiometer 1570 may respectively have values in the order of 1.8 kilo-ohms 240 micro-henries and 1 kilo-ohm.

The collector of the transistor 1564 receives a suitable negative potential such as —6 volts from a terminal 1572. The emitter of the transistor 1576 has a positive potential applied to it through a resistance 1574 from a terminal 1576, which may be connected to receive a positive potential in the order of +10 volts. A resistance 1578 and a capacitance 1580 are disposed electrically in parallel between the emitter of the transistor 1564 and the base of a transistor 1582, which may be a PNP transistor such as a type 2N393. The resistances 1574 and 1578 may respectively have suitable values in the order of 6.8 kilo-ohms and 1.2 kilo-ohms, and the capacitance 1580 may have a suitable value in the order of 100 micro-micro-farads.

A resistance 1584 is disposed electrically between the collector of the transistor 1582 and the terminal 1572 and may have a suitable value in the order of 470 ohms. A capacitance 1586 and a resistance 1588 extend electrically between the collector of the transistor 1582 and the base of a transistor 1590, which may be a PNP transistor such as a type 2N393. The capacitance 1586 and the resistance 1588 may respectively have suitable values in the order of 100 micro-microfarads and 1.2 kilo-ohms.

A resistance 1592 is disposed electrically between the base of the transistor 1590 and ground and may have a suitable value in the order of 4.3 kilo-ohms. The emitters of the transistor 1590 and of the transistor 1582 receive a suitable potential such as —2 volts from a terminal 1596. A resistance 1598 is connected at one end to the collector of the transistor 1590 and at the other end to the terminal 1572 and may be provided with a suitable value in the order of 1 kilo-ohm. An output line 1599 extends electrically from the collector of the transistor 1590.

When the transistor 1560 is cut off, a potential approaching —10 volts is applied to the input of the delay line 1562. The delay line is provided with characteristics so that its delay characteristics vary only 80 parts in a million for each temperature variation of one degree centigrade. The characteristics of the delay line 1562 are also such that a signal rises and falls in 0.2 microsecond. With the peaking obtained from the coil 1568, the signal rises and falls in 0.1 microsecond. After passing through the delay line 1562, the signals are introduced to the base of the transistor 1564 to produce corresponding signals on the emitter of the transistor.

The leading edges of the signals passing through the delay line are sharpened as a result of the action of the coil 1568. This causes the transistor 1564 to respond instantaneously to the introduction of a negative signal from the delay line 1562. The voltage swing on the emitter of the transistor 1564 corresponds substantially to the voltage swing on the base of the transistor. The mean voltage on the emitter of the transistor 1564 is dependent upon the positioning of the movable arm in the potentiometer 1560.

The potential on the emitter of the transistor 1564 falls approximately —1.5 volts from a median value of —2 volts when a negative signal is introduced to the base of the transistor. The negative signal on the emitter of the transistor 1564 is introduced instantaneously to the base of the transistor 1582 as a result of the operation of the capacitance 1580 in passing the signal.

The resultant flow of current through the transistor 1582 and the resistance 1584 causes the potential on the collector of the transistor 1582 to rise from a potential approaching —6 volts to a potential approaching —2 volts. This rise in potential in turn causes the transistor 1590 to become non-conductive so that the potential on the collector of the transistor falls from a potential approaching —2 volts to a potential approaching —6 volts.

The fall in potential on the collector of the transistor 1590 causes a negative signal to be produced on the output line 1599. An output line may also be connected to the collector of the transistor 1582.

Figure 32:
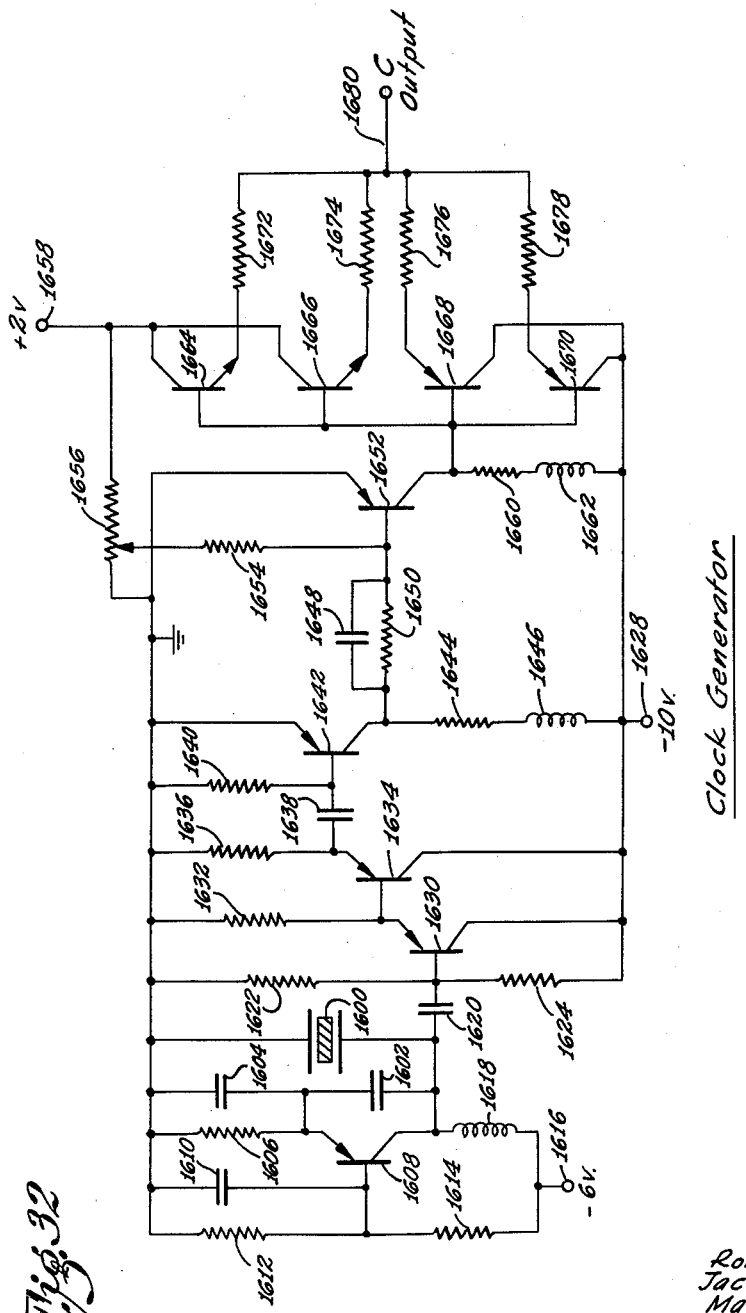

FIGURE 32 illustrates circuitry which can be used as the clock generator 220. The circuitry includes an oscillator, the frequency of which is precisely controlled by a crystal 1600. One side of the crystal 1600 is grounded. A pair of capacitances 1602 and 1604 are in series across the crystal 1600 and may respectively have values in the order of 50 and 1500 micro-microfarads. A resistance 1606 is in parallel with the capacitance 1604 and may have a suitable value in the order of 2.2 kilo-ohms. The emitter and the collector of a transistor 1608 are connected to the capacitance 1602. The transistor 1608 may be a PNP transistor such as a type 2N417.

A capacitance 1610 and a resistance 1612 are in parallel between the base of the transistor 1608 and ground. A resistance 1614 is disposed electrically between the base of the transistor 1608 and a terminal 1616, which is connected to receive a suitable potential such as approximately —6 volts. The capacitance 1610 and the resistances 1612 and 1614 may respectively have suitable values in the order of 5000 micro-microfarads, 15 kilo-ohms and 22 kilo-ohms. An inductance 1618 is disposed between the collector of the transistor 1608 and the terminal 1616 and may have a value in the order of 55 micro-henrys.

A capacitance 1620 and a resistance 1622 are in series across the crystal 1600. The capacitance 1620 and the resistance 1622 may respectively have values in the order of 50 micro-microfarads and 10 kilo-ohms. A resistance 1624 having a suitable value in the order of 15 kilo-ohms has one terminal connected to the terminal common to the capicitance 1620 and the resistance 1622 and has a second terminal connected to a terminal 1628. The terminal 1628 is connected to receive a suitable potential such as —10 volts. The base of a transistor 1630 is also connected to the terminal common to the capacitance 1620 and the resistance 1622. The transistor 1630 may be a PNP transistor such as a type 2N417.

A resistance 1632 having a suitable value in the order of 1 kilo-ohm extends electrically between the emitter of the transistor 1630 and ground. The base of a transistor 1634 is also connected to the emitter of the transistor 1630, and the collector of the transistor 1634 is connected to the terminal 1628. The transistor 1634 may be a PNP transistor such as a type 2N417. A resistance 1636 having a suitable value in the order of 1 kilo-ohm extends electrically from the emitter of the transistor 1634 to ground. A capacitance 1638 and a resistance 1640 are in series across the resistance 1636. The capacitance 1638 and the resistance 1640 may respectively have values in the order of 200 micro-microfarads and 680 ohms.

The base of a transistor 1642 is connected to the terminal common to the capacitance 1638 and to the resistance 1640, and the emitter of the transistor 1642 is grounded. The transistor 1642 may be a PNP transistor such as a type 2N417. A resistance 1644 and an inductance 1646 are in series between the collector of the transistor 1642 and the terminal 1628. The resistance 1644 and the inductance 1646 may respectively have values in the order of 220 ohms and 24 micro-henrys.

A capacitance 1648 and a resistance 1650 are in parallel between the collector of the transistor 1642 and the base of a transistor 1652, which may be a PNP transistor such as a type 2N417. The capacitance 1648 and the resistance 1650 may respectively have values in the order of 100 micro-microfarads and 3.9 kilo-ohms. A resistance 1654 is connected between the base of the transistor 1652 and the movable arm of a potentiometer 1656. One stationary contact of the potentiometer 1656 is grounded. The other stationary contact of the potentiometer 1656 is connected to a terminal 1658, which is adapted to receive a suitable potential such as +2 volts. The resistance 1654 and the potentiometer 1656 may respectively have suitable values in the order of 330 ohms and 1 kilo-ohm.

The emitter of the transistor 1652 is grounded, and a resistance 1660 and an inductance 1662 are in series between the collector of the transistor and the terminal 1628. The resistance 1660 and the inductance 1662 may respectively have suitable values in the order of 330 ohms and 24 micro-henrys. The collector of the transistor 1652 is also connected to the base of a plurality of transistors 1664, 1666, 1668 and 1670. The transistors 1664 and 1666 may be NPN transistors such as types 2N440, and the transistors 1668 and 1670 may be PNP transistors such as types 2N417. All of these transistors are included in the clock generator because of the considerable load imposed upon the generator.

Each pair of transistors preferably includes one PNP transistor and one NPN transistor. Each pair of transistors is connected in an emitter follower to the output line 1680. The collectors of the transistors 1664 and 1666 are connected to the terminal 1658 and the collectors of the transistors 1668 and 1670 are connected to the terminal 1628. Resistances 1672, 1674, 1676 and 1678 are respectively connected between the emitters of the transistors 1664, 1666, 1668 and 1670 and an output line 1680. Each of the resistances 1672, 1674, 1676 and 1678 may be provided with a suitable value in the order of 15 ohms.

Pairs of transistors may be included in each different package. For example, one pair of transistors may be included in a package constituting one integrator, and a second pair of transistors may be included in a package constituting a second integrator.

The crystal 1600 is provided with characteristics to produce signals at a particular frequency such as 3 megacycles. The crystal 1600 is included in an oscillator with the transistor 1608, the coil 1618 and the associated resistances and capacitances. The feed back for maintaining the production of oscillatory signals is obtained through the capacitance 1602. By including the crystal 1600 in the oscillator, the frequency of the signals produced by the oscillator can be accurately maintained.

The oscillatory signals produced by the oscillator including the transistor 1608 are introduced to the emitter follower including the transistor 1630. The signals from the transistor 1630 are in turn introduced to a second emitter follower stage which is formed by the transistor 1634 and the resistance 1636. Two emitter follower stages are used to insure that the oscillator becomes sufficiently isolated from the stages after the emitter followers. The signals from the transistor 1634 are then introduced to an amplifier including the transistor 1642, the resistance 1644 and the coil 1646. The coil 1646 is included in the amplifier to sharpen the signals by neutralizing the capacitive effects including the effects resulting from distributed capacitances.

The signals from the collector of the transistor 1642 instantaneously control the conductivity of the transistor 1652 because of the coupling through the capacitance 1648. The conductivity of the transistor 1652 is also controlled by the bias applied to the base of the transistor from the movable arm of the potentiometer 1656. By adjusting the position of the movable arm in the potentiometer 1656, the width of the clock pulses produced by the clock generator shown in FIGURE 32 can be correspondingly controlled. These clock pulses are provided with a rectangular shape because of the operation of the amplifier including the transistor 1652. The production of signals having rectangular characteristics is also facilitated by the peaking action of the coil 1662.

The signals from the collector of the transistor 1652 are introduced to the bases of the transistors 1664, 1666, 1668 and 1670. The signals produced on the emitters of the transistors 1664, 1666, 1668 and 1670 are used to control the passage of signals through a plurality of "and" gates, such as described previously in connection with the integrators shown in FIGURES 6 to 24, inclusive. For example, the signals from the transistors 1664, 1666, 1668 and 1670 are introduced to pairs of transistors in emitter followers which are included in each of the different integrators.

Figure 33:
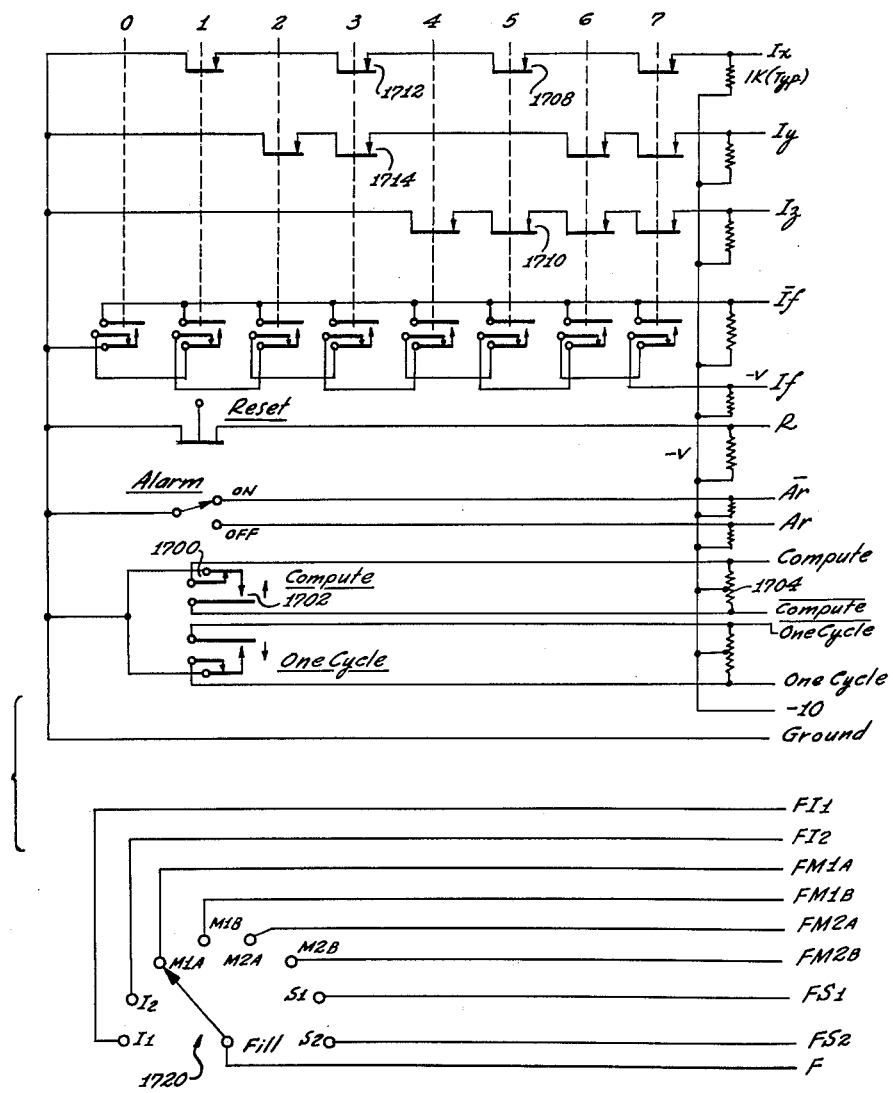

FIGURE 33 illustrates how the various switches may actually be connected on a preferred basis in the digital differential analyzer. These switches include the reset switch (designated as "(R)") the "Compute" switch and the "One Cycle" switch. By way of illustration, a ground potential may be introduced to the "Compute" line when the "Compute" switch is not actuated. This ground potential is introduced to the "Compute" line through a normally closed switch 1700 to obtain a false state of operation for the "Compute" flip-flop.

In order to produce a true state of operation for the "Compute" flip-flop, the movable arm of a switch 1702 is actuated in an upward direction in FIGURE 33 so as to engage an actuatable contact of the switch. Further movement of the movable arm of the switch 1702 causes the actuatable contact of the switch to press the movable arm of the switch 1700 away from the stationary arm of the switch 1700. In this way, the switch 1702 becomes closed before the switch 1700 becomes opened.

When the switch 1702 becomes closed and the switch 1700 becomes opened upon the depression of the "Compute" button, a ground potential is introduced to the "Compute" line through a circuit including the movable arm of the switch 1700 and the actuatable contact and movable arm of the switch 1702. A resistance 1704 is connected between the "Compute" and "Compute" lines and is connected at an intermediate terminal to a source of negative potential designated as $-V$ and having a value in the order of $-10$ volts. Since the "Compute" line is now grounded, the "Compute" line receives a negative potential because of the negative potential on the intermediate terminal of the resistance 1704. This negative potential on the "Compute" line 1704 causes the "Compute" flip-flop to be triggered to the true state.

FIGURE 33 also indicates how octal information may be inserted into an I delay line by actuating the (Ix), (Iy) and (Iz) switches. For example, eight buttons may be provided as indicated at "0" to "7," inclusive in FIGURE 33. When any one of the eight buttons is depressed, it causes a corresponding one of the (If) switches to be actuated since a different switch in the If line is associated with each one of the eight buttons. Each of the eight (If) switches corresponds in construction to the "Compute" switch described in the previous paragraph so that one portion of the switch becomes closed before a second portion of the switch becomes interrupted. When any one of the eight buttons is depressed, the corresponding one of the (If) switches becomes actuated to produce a $-V$ potential indicating the If state. This in turn causes the F flip-flop to be triggered to the true state.

Different switches are ganged to each of the eight buttons so as to produce the desired states for Ix, Iy and Iz. For example, when the decimal number "5" is to be inserted into an I delay line in the three successive binary places, switches 1708 and 1710 in the Ix and Iz lines become respectively opened so that a negative potential of $-V$ is applied to the Ix and Iz lines. This causes the S and Ss flip-flops to be triggered to the true states to indicate binary values of "1." However, a continuous circuit from ground to the Iy line is still maintained so that the Sr flip-flop is retained in the false state of operation. The reason is that no switch in the Iy line becomes opened when the button representing the decimal number "5" is depressed.

In like manner, switches 1712 and 1714 in the Ix and Iy lines become respectively opened when a decimal value of "3" is to be inserted into the I delay line on an octal basis. This causes negative potentials of $-V$ to be produced on the Ix and Iy lines so that the Ss and Sr flip-flops are triggered to the true state. The S flip-flop is maintained in the false state since a ground potential is still applied to the Iz line. It will be seen from the above discussion that any decimal value between "0" and "7," inclusive, may be inserted into the S, Sr and Ss flip-flops in accordance with the depression of the different buttons designated as "0" to "7," inclusive in FIGURE 33.

The alarm and reset buttons also control the potentials applied to associated lines. For example, when the reset switch is closed, a ground potential is applied through the reset switch to the R line. This causes the R flip-flop to be maintained in the false state. However, upon the actuation of the reset button, the R switch becomes opened so that a potential of $-V$ is applied to the R line. This causes the R flip-flop to be triggered to the true state.

A rotary switch 1720 is shown at the bottom of FIGURE 33 for controlling the particular integrator which has information filled into it at any instant. The movable arm of the rotary switch is connected to the fill line from the true side of the F flip-flop so as to receive a negative potential when the F flip-flop is true. Each stationary contact is connected to a different one of the integrators. For example, the first two stationary contacts of the switch in a clockwise direction are shown as being connected to normal integrators 1 and 2. These integrators are designated as "FI1" and "FI2."

The next pair of stationary contacts in the rotary switch 1720 in a clockwise direction are connected to the pair of integrators in a first multiplier. The pair of integrators in the first multiplier are designated as "FM1A" and "FM1B." Similarly, the pair of integrators in a second multiplier are designated as "FM2A" and "FM2B." Lines from the integrators FM2A and FM2B are connected to the fifth and sixth stationary contacts of the switch 1720 in a clockwise direction.

The last two stationary contacts of the switch 1720 in a clockwise direction are connected to a pair of integrators operating as servos. These integrators may be designated as "FS1" and "FS2." It will be appreciated that the rotary switch is shown only by way of example and that any number of normal integrators, servo integrators and multiplier integrators can be used.

What is claimed is:

1. In a parallel digital differential analyzer, means including a first plurality of registers each constructed to provide signal indications digitally representing a dependent quantity for a different one of a plurality of integrators and to provide a circulation of the signal indications in the register, means including a second plurality of registers each constructed to provide signal indications digitally representing an output quantity for a different one of the registers in the plurality and to provide a circulation of the signal indications in the register, means including first electrical circuitry for providing clock signals and for grouping the clock signals into words on a recurrent basis, means including a first plurality of electrical circuitry each coupled to the clock circuitry and to a particular one of the second registers for producing signal indications representing increments in an independent quantity for a different one of the integrators in each word time and in accordance with the signal indications representing the output quantity for the particular one of the second registers, and means including a second plurality of electrical circuitry each coupled to the clock circuitry and to a particular one of the second registers and to a particular one of the first registers and a particular one of the electrical circuitry in the first plurality for varying the signal indications in the particular one of the second registers in each word time in accordance with the signal indications in the particular one of the first registers and with the signals representing the increments in the independent quantity for the particular integrator.

2. In a parallel digital differential analyzer, means including a first plurality of registers each constructed to store a plurality of signal indications digitally representing a dependent quantity for a different one of the integrators in a plurality and each constructed to provide a circulation of the signal indications on a recurrent basis.

means including a second plurality of registers each constructed to store a plurality of signal indications digitally representing an output quantity for a different one of the integrators in the plurality and each constructed to provide a circulation of the signal indications on a recurrent basis, means including a clock generator for producing recurrent signals and for grouping the recurrent signals into recurrent words each having a length of a fixed number of recurrent signals, means including a first plurality of electrical circuits each constructed to provide signal indications representing increments in an independent quantity for a different one of the integrators in each recurrent word time, means including a second plurality of electrical circuits each coupled to the generating means and to a different one of the first electrical circuits and to individual ones of the first and second registers for combining the signal indications in the first and second registers in each word time in accordance with the signal indications from the associated one of the first electrical circuits in that word time, means including a third plurality of electrical circuits each coupled to a different one of the second electrical circuits and to the generating means for producing signal indications representing overflows in the signal indications in the associated one of the second registers in each word time and representing the polarity of each such overflow, and means including a fourth plurality of electrical circuits each coupled to individual ones of the first and third electrical circuits and to the generating means for obtaining an operation of the first electrical circuit in each word time in accordance with the signal indications provided by the third electrical circuit in that word time.

3. In a parallel digital differential analyzer, means including a first plurality of registers each constructed to provide signal indications digitally representing a dependent quantity for a different one of a plurality of integrators, and to provide a circulation of the signal indications in the register, means including a second plurality of registers each constructed to provide signal indications digitally representing an output quantity for a different one of the registers in the plurality and to provide a circulation of the signal indications in the register, means including first electrical circuitry for producing clock signals and for grouping the clock signals into words on a recurrent basis, means including a first plurality of electrical circuitry each coupled to the clock circuitry and to at least a particular one of the registers in the second plurality for producing signal indications representing increments in the dependent quantity for each integrator in accordance with the signal indications representing the most significant digit in the particular one of the registers in the first plurality in each, and means including a second plurality of electrical circuitry each coupled to the clock circuitry and to at least a partiular one of the registers in the first plurality and to a particular one of the electrical circuitry in the first plurality for combining the signal indications representing the increments in the dependent quantity for each integrator and the least significant digits of the dependent quantity for the integrator to provide new signal indications for circulation in the particular one of the first registers.

4. In a parallel digital differential analyzer, means including a first plurality of registers each constructed to store a plurality of signal indications digitally representing a dependent quantity for a different one of the integrators in a plurality and each constructed to provide a circulation of the signal indications in the register on a recurrent basis, means including a second plurality of registers each constructed to store a plurality of signal indications digitally representing an output quantity for a different one of the integrators in the plurality and each constructed to provide a circulation of the signal indications in the register on a recurrent basis, means including a clock generator for defining successive words at equal increments of time, means including a first plurality of electrical circuits each constructed to provide signal indications representing increments in a independent quantity for a different one of the integrators in each word time, means including a second plurality of electrical circuits each coupled electrically to the generating means and to individual ones of the first and second registers for combining the signal indications in these registers in each word time in accordance with the signal indications from the associated one of the first electrical circuits to obtain new signal indications for circulation in the second register, and means including a third plurality of electrical circuits each coupled electrically to the generating means and to individual ones of the first and second electrical circuits for varying the signal indications circulating in the first register in each word time in accordance with the signal indications obtained by the associated one of the second electrical circuits in that word time.

5. A digital differential analyzer, including, means including first recirculating registers each constructed to provide a recurrent circulation of signal indications representing dependent quantities for a different one of the integrators in a plurality, means including second recirculating registers each constructed to provide a recurrent circulation of signal indications representing the differential combination of the dependent quantity and increments in an independent quantity for a different one of the integrators in the plurality, means including a clock generator for providing clock signals at periodic intervals, means including a counter coupled to the clock generator for counting the clock signals to define words on a recurrent basis, means coupled electrically to each of the first registers and to particular ones of the second registers and responsive to the signals from the counter for varying in each word the signal indications recirculating in each of the first registers in accordance with the signal indications recirculating in the second registers, means coupled electrically to particular ones of the second registers and responsive to the signals from the counter for providing in each word signal indications representing increments in an independent quantity for each integrator, means coupled electrically to each of the first registers and responsive to the signals representing the increments in the independent quantity for the associated integrator and responsive to the signals from the counter for combining in each word the signal indications representing the dependent quantity and the increments in the independent quantity for each integrator to produce signal indications representing increments in the differential combination for each integrator, and means coupled electrically to each of the second integrators and responsive to the signals representing the increments in the differential combination for the associated integrator and responsive to the signals from the counter for combining in each word the signal indications representing the differential combination and the increments in the differential combination for each integrator to produce signal indications representing a new value of the differential combination for each integrator.

6. In a digital differential analyzer, means including a first plurality of recirculating registers each constructed to store a plurality of signal indications digitally representing a dependent quantity for a different one of the integrators in a plurality and to provide a recurrent circulation of the signal indications in the register, means including a second plurality of recirculating registers each constructed to store a plurality of signal indications digitally representing an output quantity for a different one of the integrators in the plurality and to provide a recurrent circulation of the signal indications in the register, means including a clock generator for providing clock signals and for grouping the signals into recurrent words, means including a first plurality of electrical circuits each constructed to provide signal indications representing increments in an independent quantity for a different one of the integrators in each recurrent word, means including a second plurality of electrical circuits each coupled electrically to a different one of the recirculating registers in the first plurality and to the generating means and to a different one of the first electrical circuitry and to a different one of recirculating registers in the second plurality for combining the signal indications in the associated ones of the first and second registers in each recurrent word in accordance with the signal indications from the associated first electrical circuitry to produce signal indications representing a new value of the output quantity for circulation in the second register, means including a third plurality of electrical circuits each coupled electrically to a particular one of the second circuits and to the generating means and to one of the first electrical circuits other than that associated with the particular one of the second circuits for obtaining an operation of the first electrical circuit in each word in accordance with the operation of the particular one of the second electrical circuits.

7. In a parallel digital differential analyzer, an integrator package, including, means including a first register constructed to store signal indications relating to a dependent quantity for the integrator and to provide a circulation of such information, means constructed to receive signal indications relating to increments in an independent quantity for the integrator in each recirculation of the signal indications in the first register, means responsive to the signal indications in the first register and to the signal indications representing the increments in the independent quantity for the integrator to combine such indications in each circulation of the signal indications in the first register to produce signal indications representing increments in a differential quantity for the integrator, means including a second register constructed to store signal indications relating to the differential combination for the integrator and to provide a circulation of such signal indications in synchronism with the circulation of signal indications in the first register, means responsive to the signal indications from the second register and to the signal indications representing the increments in the differential combination for the integrator to combine such signal indications in each circulation of the signal indications in the second register to produce signal indications for insertion into the second register for use in the next circulation of the information in the register, means constructed to receive signal indications relating to increments in the dependent quantity for the integrator in each circulation of the signal indications in the first register, and means responsive to the signal indications from the first register and to the signal indications representing the increments in the dependent quantity for the integrator to combine such signal indications in each circulation of the signal indications in the first register to produce signal indications for insertion into the first register for use in the next circulation of the information in the register.

8. In a parallel digital analyzer, a multiplier package, including, means including a first static register constructed to store only information relating to a dependent quantity for a first integrator and to provide a circulation of such information, means including a second static register distinct from the first static register and constructed to store only information relating to an independent quantity for a second integrator and to provide a circulation of the information in the second integrator in synchronism with the circulation of the information in the first register, means constructed to receive signal indications relating to increments in an independent quantity for the first integrator in each circulation of the information in the first register, means responsive to the signal indications in the first register and to the signal indications representing the increments in the independent quantity for the first integrator to combine such signal indications in each circulation of the signal indications in the first register to produce signal indications representing increments in the differential quantity for the integrator, means constructed to receive signal indications relating to increments in a dependent quantity for the second integrator in each circulation of the signal indications in the second register, means responsive to the signal indications in the second register and to the signal indications representing the increments in the dependent quantity for the second integrator to combine such signal indications in each circulation of the signal indications in the second register to produce signal indications representing increments in a differential quantity for the second integrator, means including a third static register distinct from the first and second registers and constructed to store only signal indications representing the combined value of the differential combinations for the first and second integrators and to provide a circulation of such signal indications in synchronism with the circulation of the signal indications in the first and second registers, and means responsive to the signal indications from the third register and to the signal indications representing the increments in the differential combinations for the first and second integrators to combine such signal indications in each circulation of the signal indications in the third register to produce signal indications for insertion into the third register to represent a new value in the combination of the first and second differential combinations.

9. The multiplier package for use in the parallel digital analyzer as set forth in claim 8, including, means constructed to receive signal indications relating to increments in the dependent quantity for the first integrator in each circulation of the signal indications in the first register, means responsive to the signal indications from the first register and to the signal indications representing the increments in the dependent quantity for the first integrator to combine such signal indications in each circulation of the signal indications in the first register to produce signal indications for insertion into the first register to represent a new value of the dependent quantity for the first integrator, means constructed to receive signal indications relating to increments in the independent quantity for the second integrator in each circulation of the signal indications in the second register, and means responsive to the signal indications from the second register and to the signal indications representing the increments in the independent quantity for the second integrator to combine such signal indications in each circulation of the signal indications in the second register to produce signal indications for insertion into the second register to represent a new value of the independent quantity for the second integrator.

10. In a parallel digital analyzer, an integrator package for use as a servo, including, means including a first stattic register constructed to store only signal indications relating to a dependent quantity for the integrator and to provide a circulation of such information, means constructed to receive signal indications relating to increments in an independent quantity for the integrator in each recirculation of the signal indications in the first register, means responsive to the signal indications in the first register and to the signal indications representing the increments in the independent quantity for the integrator to produce signal indications representing increments in an output quantity for the integrator upon the actual occurrence of an increment in the independent quantity for the integrator in each circulation of the signal indications in the first register and upon a variation of the signal indications in the first register from a particular value in each such recirculation, means constructed to receive signal indications relating to increments in the dependent quantity for the integrator in each circulation of the signal indications in the first register, and means responsive to the signal indications from the first register and to the signal indications representing the increments in the dependent quantity for the integrator to combine such signal indications in each circulation of the signal indications in the first register to produce signal indications representing a new value in the dependent quantity for the integrator.

11. The servo package set forth in claim 10, including means responsive to variations beyond particular limits in the value of the dependent quantity stored in the first register for preventing increments in the output quantity from being produced in each circulation of the signal indications in the first register and regardless of an actual occurrence of an increment in the independent quantity in such recirculation.

12. In a parallel digital differential analyzer, means including a first register constructed to store signal indications relating to a dependent quantity for an integrator and to provide a circulation of such signal indications, means constructed to receive signal indications relating to the occurrence or lack of occurrence of increments in an independent quantity for the integrator in each circulation of the signal indications in the first register, means constructed to receive signal indications relating to increments in the dependent quantity for the integrator in each circulation of the signal indications in the first register, means responsive to the signal indications from the first register and to the signal indications representing the increments in the dependent quantity for the integrator in each circulation of the signal indications in the first register to produce signal indications for insertion into the first register to represent a new value in the dependent quantity for the integrator, means reponsive to the signal indications representing the increments in the dependent quantity for the integrator in each circulation of the signal indications in the first register for delaying such signal indications, control means responsive to the delayed signal indications representing the increments in the dependent quantity for the integrator and to the signal indications representing the dependent quantity for the integrator for combining these signal indications upon the occurrence of increments in the independent quantity for the integrator in each circulation and for providing a passage of the delayed signal indications representing the increments in the dependent quantity for the integrator upon the lack of occurrence of increments in the independent quantity for the integrator in each circulation, means including a second register constructed to store signal indications relating to an output quantity for the integrator and to provide a circulation of such signal indications in synchronism with the circulation of the signal indications in the first register, and means responsive to the signal indications passing through the control means and to the signal indications in the second register in each circulation of the signal indications in the second register to produce signal indications for insertion into the second register to represent a new value of the output quantity for the integrator.

13. The parallel digital differential analyzer as set forth in claim 12, including, means constructed to receive signal indications relating to the polarity of each increment in the independent quantity for the integrator in each circulation of the signal indications in the first register, and means coupled to the control means for complementing the signal indications from the control means upon the occurrence of a first polarity in the increments in the independent quantity for the integrator and for passing the signal indications from the control means without any change upon the occurrence of a second polarity in the increments in the independent quantity for the integrator.

14. A digital differential analyzer, including, means including a first register constructed to store signal indications relating to the values of dependent quantities for a first plurality of integrators and to provide for a sequential circulation of the signal indications relating to the dependent quantities for the different integrators in the plurality, means including a first plurality of registers each constructed to store signal indications relating to the value of a dependent quantity for a different one of the integrators in a second plurality and to provide for a circulation of the signal indications in each of these registers, means including a third register constructed to store signal indications relating to the values of output quantities for the first plurality of integrators and to provide for a sequential circulation of the signal indications relating to the output quantities for the different integrators in the plurality, means including a second plurality of registers each constructed to store signal indications relating to the values of output quantities for a different one of the integrators in the second plurality and to provide for a circulation of the signal indications in each one of these registers, means responsive to the signal indications representing the output quantities from particular ones of the registers in the second plurality and representing the output quantities from particular ones of the integrators in the first register to produce signal indications representing increments in an independent quantity for each of the integrators in the first plurality upon the presentation of the integrators for computation, means responsive to the signal indications representing the dependent quantity for each of the integrators in the first plurality and representing the increments in the independent quantity for the integrator upon the presentation of the integrator for computation to produce signal indications representing increments in the output quantity for the integrator, and means responsive to the signal indications representing the increments in the output quantity for each of the integrators in the first plurality and the signal indications in the second register for the integrator upon the presentation of the integrator for computation to produce signal indications for insertion into the second register to represent a new value of the output quantity for the integrator.

15. The digital differential analyzer as set forth in claim 14, including, means responsive to the signal indications representing the output quantities from particular ones of the registers in the second plurality to produce signal indications representing increments in the independent quantity for integrators in the second plurality in each circulation of the signal indications in the registers in the first and second pluralities, means responsive to the signal indications representing the dependent quantity for each of the integrators in the second plurality and representing the increments in the independent quantity in each circulation of the signal indications in the registers in the first and second pluralities to produce signal indications representing increments in the output quantity for the integrator, and means responsive to the signal indications representing the increments in the output quantity for each of the integrators in the second plurality and the signal indications in the particular one of the registers in the second plurality for the integrator to produce signal indications for insertion into the particular register to represent a new value of the output quantity for the integrator.

References Cited in the file of this patent

UNITED STATES PATENTS

| | | |
|---|---|---|
| 2,717,735 | Luck | Sept. 13, 1955 |
| 2,752,091 | McKenney et al. | June 26, 1956 |
| 2,850,232 | Hagen et al. | Sept. 2, 1958 |
| 2,867,380 | Piel et al. | Jan. 6, 1959 |
| 2,900,134 | Steele et al. | Aug. 18, 1959 |
| 2,913,179 | Gordon | Nov. 17, 1959 |